(12) United States Patent
Reinhardt et al.

(10) Patent No.: US 9,781,974 B2
(45) Date of Patent: *Oct. 10, 2017

(54) SOLES FOR SPORTS SHOES

(71) Applicant: adidas AG, Herzogenaurach (DE)

(72) Inventors: Stuart David Reinhardt, Nuremberg (DE); Darren Michael Wood, Gresham, OR (US); Angus Wardlaw, Nuremberg (DE); Timothy Kelvin Robinson, Nuremberg (DE); John Whiteman, Nurnberg (DE)

(73) Assignee: Adidas AG, Herzogenaurach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/473,274

(22) Filed: Aug. 29, 2014

(65) Prior Publication Data

US 2014/0366405 A1    Dec. 18, 2014

Related U.S. Application Data

(63) Continuation of application No. 13/860,823, filed on Apr. 11, 2013.

(30) Foreign Application Priority Data

Apr. 13, 2012  (DE) .................. 10 2012 206 094
Jan. 17, 2013  (EP) ..................... 13151596

(51) Int. Cl.
*A43B 13/14*      (2006.01)
*A43B 17/00*      (2006.01)
(Continued)

(52) U.S. Cl.
CPC .......... *A43B 17/006* (2013.01); *A43B 1/0027* (2013.01); *A43B 5/00* (2013.01);
(Continued)

(58) Field of Classification Search
CPC ......... A43B 13/12; A43B 13/16; A43B 13/18; A43B 13/122; A43B 13/141; A43B 13/186; A43B 13/187; A43B 13/188
(Continued)

(56) References Cited

U.S. PATENT DOCUMENTS

D64,898   S    6/1924   Gunlock
2,131,756 A   10/1938   Roberts
(Continued)

FOREIGN PATENT DOCUMENTS

CN   1034662   8/1989
CN   1036128   10/1989
(Continued)

OTHER PUBLICATIONS

European Application No. 13151596.7, European Search Report mailed Nov. 5, 2014, 12 pages.
(Continued)

*Primary Examiner* — Jila M Mohandesi
(74) *Attorney, Agent, or Firm* — Kilpatrick Townsend & Stockton LLP

(57) ABSTRACT

Improved soles and insoles for shoes, in particular sports shoes, are described. In an aspect, a sole for a shoe, in particular a sports shoe, with at least a first and a second surface region is provided. The first surface region comprises expanded thermoplastic polyurethane ("TPU"). The second surface region is free from expanded TPU.

34 Claims, 24 Drawing Sheets

(51) Int. Cl.

| | | |
|---|---|---|
| *A43B 13/04* | (2006.01) | |
| *A43B 13/12* | (2006.01) | |
| *A43B 13/16* | (2006.01) | |
| *A43B 13/18* | (2006.01) | |
| *A43B 13/02* | (2006.01) | |
| *A43B 13/38* | (2006.01) | |
| *A43B 1/00* | (2006.01) | |
| *B29D 35/00* | (2010.01) | |
| *B29D 35/14* | (2010.01) | |
| *B29D 35/12* | (2010.01) | |
| *A43B 5/00* | (2006.01) | |
| *B29C 67/04* | (2017.01) | |
| *C08J 9/232* | (2006.01) | |
| *C08L 75/04* | (2006.01) | |
| *C08G 101/00* | (2006.01) | |
| *B29L 31/50* | (2006.01) | |
| *B29C 35/04* | (2006.01) | |
| *B29K 21/00* | (2006.01) | |
| *B29K 23/00* | (2006.01) | |
| *B29K 75/00* | (2006.01) | |
| *B29K 77/00* | (2006.01) | |

(52) U.S. Cl.
CPC ............ *A43B 13/023* (2013.01); *A43B 13/04* (2013.01); *A43B 13/122* (2013.01); *A43B 13/125* (2013.01); *A43B 13/14* (2013.01); *A43B 13/16* (2013.01); *A43B 13/188* (2013.01); *A43B 13/38* (2013.01); *B29C 67/04* (2013.01); *B29D 35/0018* (2013.01); *B29D 35/0054* (2013.01); *B29D 35/122* (2013.01); *B29D 35/142* (2013.01); *B29D 35/148* (2013.01); *C08J 9/232* (2013.01); *B29C 35/049* (2013.01); *B29K 2021/003* (2013.01); *B29K 2023/12* (2013.01); *B29K 2075/00* (2013.01); *B29K 2077/00* (2013.01); *B29L 2031/504* (2013.01); *C08G 2101/0008* (2013.01); *C08G 2410/00* (2013.01); *C08J 2300/22* (2013.01); *C08J 2375/04* (2013.01); *C08L 75/04* (2013.01)

(58) Field of Classification Search
USPC ............ 36/30 R, 30 A, 31, 25 R, 103, 43, 44
See application file for complete search history.

(56) References Cited

U.S. PATENT DOCUMENTS

| | | | |
|---|---|---|---|
| 2,968,106 A | 1/1961 | Joiner et al. | |
| 3,186,013 A | 6/1965 | Glassman et al. | |
| 3,586,003 A | 6/1971 | Baker | |
| D237,323 S | 10/1975 | Inohara | |
| 4,132,016 A * | 1/1979 | Vaccari | 36/114 |
| 4,481,727 A | 11/1984 | Stubblefield et al. | |
| 4,524,529 A | 6/1985 | Schaefer | |
| 4,546,559 A | 10/1985 | Dassler et al. | |
| 4,624,062 A | 11/1986 | Autry et al. | |
| 4,642,911 A | 2/1987 | Talarico et al. | |
| 4,658,515 A | 4/1987 | Oatman et al. | |
| 4,667,423 A | 5/1987 | Autry et al. | |
| D296,262 S | 6/1988 | Brown et al. | |
| D302,898 S | 8/1989 | Greenberg | |
| RE33,066 E * | 9/1989 | Stubblefield | A43B 7/144 36/30 R |
| 4,970,807 A | 11/1990 | Anderie et al. | |
| 5,025,573 A | 6/1991 | Giese et al. | |
| D329,731 S | 9/1992 | Adcock et al. | |
| 5,150,490 A * | 9/1992 | Busch | A43B 17/14 12/146 M |
| D333,556 S | 3/1993 | Purdom | |
| D337,650 S | 7/1993 | Thomas, III et al. | |
| D340,797 S | 11/1993 | Pallera et al. | |
| 5,283,963 A | 2/1994 | Lerner et al. | |
| 5,308,420 A | 5/1994 | Yang | |
| 5,319,866 A | 6/1994 | Foley et al. | |
| D350,016 S | 8/1994 | Passke et al. | |
| D350,222 S | 9/1994 | Hase | |
| D356,438 S | 3/1995 | Opie et al. | |
| 5,549,743 A | 8/1996 | Pearce et al. | |
| D375,619 S | 11/1996 | Backus et al. | |
| 5,617,650 A | 4/1997 | Grim | |
| 5,692,319 A | 12/1997 | Parker et al. | |
| 5,709,954 A * | 1/1998 | Lyden et al. | 428/500 |
| D389,991 S | 2/1998 | Elliott | |
| D390,349 S | 2/1998 | Murai et al. | |
| D393,340 S | 4/1998 | Doxey | |
| D395,337 S | 6/1998 | Greene | |
| D408,618 S | 4/1999 | Wilborn et al. | |
| D408,971 S | 5/1999 | Birkenstock | |
| D413,010 S | 8/1999 | Birkenstock | |
| 5,932,336 A | 8/1999 | Petrovic et al. | |
| D414,920 S | 10/1999 | Cahill | |
| D415,610 S | 10/1999 | Cahill | |
| D415,876 S | 11/1999 | Cahill | |
| 5,996,252 A * | 12/1999 | Cougar | A43B 1/0081 36/113 |
| 6,014,821 A | 1/2000 | Yaw | |
| 6,041,521 A | 3/2000 | Wong et al. | |
| D422,400 S | 4/2000 | Brady et al. | |
| D423,199 S | 4/2000 | Cahill | |
| D431,346 S | 10/2000 | Birkenstock | |
| D460,852 S | 7/2002 | Daudier | |
| 6,516,540 B2 * | 2/2003 | Seydel et al. | 36/29 |
| 6,702,469 B1 | 3/2004 | Taniguchi et al. | |
| D490,222 S | 5/2004 | Burg et al. | |
| D490,230 S | 5/2004 | Mervar | |
| D492,099 S | 6/2004 | McClaskie | |
| 6,782,640 B2 | 8/2004 | Westin et al. | |
| 6,796,056 B2 * | 9/2004 | Swigart | 36/29 |
| D498,901 S | 11/2004 | Hawker et al. | |
| 6,849,667 B2 | 2/2005 | Haseyama et al. | |
| 6,925,734 B1 | 8/2005 | Schaeffer et al. | |
| 6,948,263 B2 * | 9/2005 | Covatch | 36/30 R |
| 6,957,504 B2 | 10/2005 | Morris | |
| D517,302 S | 3/2006 | Ardissono | |
| 7,073,277 B2 | 7/2006 | Erb et al. | |
| D538,518 S | 3/2007 | Della Valle | |
| 7,202,284 B1 | 4/2007 | Limerkens et al. | |
| D554,848 S | 11/2007 | Marston | |
| D560,883 S | 2/2008 | Mcclaskie | |
| D561,433 S | 2/2008 | McClaskie | |
| D561,438 S | 2/2008 | Belley | |
| D561,986 S | 2/2008 | Horne et al. | |
| D570,581 S | 6/2008 | Polegato Moretti | |
| D571,085 S | 6/2008 | Mcclaskie | |
| D572,462 S | 7/2008 | Hatfield et al. | |
| D586,090 S | 2/2009 | Turner et al. | |
| D589,690 S | 4/2009 | Truelsen | |
| D594,187 S | 6/2009 | Hickman | |
| D596,384 S | 7/2009 | Andersen et al. | |
| D601,333 S | 10/2009 | Mcclaskie | |
| D606,733 S | 12/2009 | Mcclaskie | |
| D607,190 S | 1/2010 | Mcclaskie | |
| D611,233 S | 3/2010 | Della Valle | |
| 7,673,397 B2 | 3/2010 | Jarvis | |
| D616,183 S | 5/2010 | Skaja | |
| D617,540 S | 6/2010 | Mcclaskie | |
| D618,891 S | 7/2010 | McClaskie | |
| D631,646 S | 2/2011 | Müller | |
| D633,286 S | 3/2011 | Skaja | |
| D633,287 S | 3/2011 | Skaja | |
| D634,918 S | 3/2011 | Katz et al. | |
| D636,156 S | 4/2011 | Della Valle | |
| D636,569 S | 4/2011 | McMillan | |
| D636,571 S | 4/2011 | Avar | |
| 7,941,941 B2 * | 5/2011 | Hazenberg et al. | 36/28 |
| D641,142 S | 7/2011 | Lindseth et al. | |
| D644,827 S | 9/2011 | Lee | |
| D645,649 S | 9/2011 | Mcclaskie | |

(56) References Cited

U.S. PATENT DOCUMENTS

| | | |
|---|---|---|
| D648,105 S | 11/2011 | Schlageter et al. |
| D650,159 S | 12/2011 | Avar |
| 8,082,684 B2 | 12/2011 | Munns |
| D655,488 S | 3/2012 | Blakeslee |
| D659,364 S | 5/2012 | Jolicoeur |
| D680,725 S | 4/2013 | Avar et al. |
| D680,726 S | 4/2013 | Propét |
| D683,116 S | 5/2013 | Petrie |
| 8,479,412 B2 | 7/2013 | Peyton et al. |
| 8,490,297 B2 * | 7/2013 | Guerra ............... 36/29 |
| D693,553 S | 11/2013 | McClaskie |
| D695,501 S | 12/2013 | Yehudah |
| D698,137 S | 1/2014 | Carr |
| D707,934 S | 7/2014 | Petrie |
| D709,680 S | 7/2014 | Herath |
| 8,834,770 B2 | 9/2014 | Nakano et al. |
| D721,478 S | 1/2015 | Avent et al. |
| 9,010,157 B1 | 4/2015 | Podhajny et al. |
| D739,129 S | 9/2015 | Del Biondi |
| D739,131 S | 9/2015 | Del Biondi |
| D740,003 S | 10/2015 | Herath |
| D740,004 S | 10/2015 | Hoellmueller et al. |
| 9,212,270 B2 | 12/2015 | Künkel et al. |
| 2003/0131501 A1 | 7/2003 | Erickson et al. |
| 2003/0158275 A1 | 8/2003 | McClelland et al. |
| 2003/0172548 A1 | 9/2003 | Fuerst |
| 2003/0208925 A1 | 11/2003 | Pan |
| 2004/0032042 A1 | 2/2004 | Chi |
| 2004/0138318 A1 | 7/2004 | McClelland et al. |
| 2004/0211088 A1 | 10/2004 | Volkart |
| 2005/0065270 A1 | 3/2005 | Knoerr et al. |
| 2005/0108898 A1 | 5/2005 | Jeppesen et al. |
| 2005/0150132 A1 | 7/2005 | Iannacone |
| 2005/0241181 A1 | 11/2005 | Cheng |
| 2006/0010717 A1 | 1/2006 | Finkelstein |
| 2006/0026863 A1 * | 2/2006 | Liu ............ A43B 7/08 36/25 R |
| 2006/0083912 A1 | 4/2006 | Park et al. |
| 2006/0125134 A1 | 6/2006 | Lin et al. |
| 2006/0134351 A1 | 6/2006 | Greene et al. |
| 2006/0156579 A1 | 7/2006 | Hoffer et al. |
| 2006/0235095 A1 * | 10/2006 | Leberfinger et al. ........... 521/56 |
| 2006/0283046 A1 * | 12/2006 | Mason ............... 36/28 |
| 2007/0193070 A1 | 8/2007 | Bertagna et al. |
| 2007/0199213 A1 | 8/2007 | Campbell et al. |
| 2007/0295451 A1 | 12/2007 | Willis |
| 2008/0052965 A1 | 3/2008 | Sato |
| 2008/0244932 A1 | 10/2008 | Nau et al. |
| 2008/0250666 A1 | 10/2008 | Votolato |
| 2009/0013558 A1 | 1/2009 | Hazenberg et al. |
| 2009/0025260 A1 | 1/2009 | Nakano |
| 2009/0113758 A1 | 5/2009 | Nishiwaki et al. |
| 2009/0119023 A1 | 5/2009 | Zimmer et al. |
| 2009/0235557 A1 | 9/2009 | Christensen et al. |
| 2009/0277047 A1 | 11/2009 | Polegato et al. |
| 2009/0320330 A1 | 12/2009 | Borel et al. |
| 2010/0063778 A1 | 3/2010 | Schrock et al. |
| 2010/0122472 A1 | 5/2010 | Wilson, III et al. |
| 2010/0154257 A1 | 6/2010 | Bosomworth et al. |
| 2010/0218397 A1 | 9/2010 | Nishiwaki et al. |
| 2010/0222442 A1 * | 9/2010 | Prissok et al. ............ 521/60 |
| 2010/0242309 A1 | 9/2010 | McCann |
| 2010/0287788 A1 | 11/2010 | Spanks et al. |
| 2010/0287795 A1 | 11/2010 | Van et al. |
| 2010/0293811 A1 | 11/2010 | Truelsen et al. |
| 2011/0047720 A1 | 3/2011 | Maranan et al. |
| 2011/0067272 A1 | 3/2011 | Lin |
| 2011/0252668 A1 | 10/2011 | Chen et al. |
| 2011/0283560 A1 | 11/2011 | Portzline et al. |
| 2011/0302805 A1 | 12/2011 | Vito et al. |
| 2012/0005920 A1 | 1/2012 | Alvear et al. |
| 2012/0047770 A1 | 3/2012 | Dean et al. |
| 2012/0059075 A1 | 3/2012 | Prissok et al. |
| 2012/0177777 A1 | 7/2012 | Brown et al. |
| 2012/0233883 A1 | 9/2012 | Spencer et al. |
| 2012/0235322 A1 | 9/2012 | Greene et al. |
| 2012/0266490 A1 | 10/2012 | Atwal et al. |
| 2013/0150468 A1 | 6/2013 | Füssi et al. |
| 2013/0255103 A1 | 10/2013 | Dua et al. |
| 2013/0266792 A1 | 10/2013 | Nohara et al. |
| 2013/0269215 A1 | 10/2013 | Smirman et al. |
| 2013/0291409 A1 | 11/2013 | Reinhardt et al. |
| 2014/0017450 A1 | 1/2014 | Baghdadi et al. |
| 2014/0033573 A1 | 2/2014 | Wills |
| 2014/0066530 A1 | 3/2014 | Shen et al. |
| 2014/0075787 A1 | 3/2014 | Cartagena |
| 2014/0197253 A1 | 7/2014 | Lofts et al. |
| 2014/0223673 A1 | 8/2014 | Wardlaw et al. |
| 2014/0223776 A1 | 8/2014 | Wardlaw et al. |
| 2014/0223777 A1 | 8/2014 | Whiteman et al. |
| 2014/0223783 A1 | 8/2014 | Wardlaw et al. |
| 2014/0227505 A1 | 8/2014 | Schiller et al. |
| 2014/0366403 A1 | 12/2014 | Reinhardt et al. |
| 2014/0366404 A1 | 12/2014 | Reinhardt et al. |
| 2014/0373392 A1 | 12/2014 | Cullen |
| 2015/0089841 A1 | 4/2015 | Smaldone et al. |
| 2015/0166270 A1 | 6/2015 | Buscher et al. |
| 2015/0174808 A1 | 6/2015 | Rudolph et al. |
| 2015/0197617 A1 | 7/2015 | Prissok et al. |
| 2015/0237823 A1 | 8/2015 | Schmitt et al. |
| 2015/0344661 A1 | 12/2015 | Spies et al. |
| 2015/0351493 A1 | 12/2015 | Ashcroft et al. |
| 2016/0037859 A1 | 2/2016 | Smith et al. |
| 2016/0044992 A1 | 2/2016 | Reinhardt et al. |
| 2016/0046751 A1 | 2/2016 | Spies et al. |
| 2016/0121524 A1 | 5/2016 | Däschlein et al. |
| 2016/0128426 A1 | 5/2016 | Reinhardt et al. |
| 2016/0244583 A1 | 8/2016 | Keppeler |
| 2016/0244584 A1 | 8/2016 | Keppeler |
| 2016/0244587 A1 | 8/2016 | Gutmann et al. |
| 2016/0346627 A1 | 12/2016 | Le et al. |

FOREIGN PATENT DOCUMENTS

| | | |
|---|---|---|
| CN | 2511160 | 9/2002 |
| CN | 2796454 | 7/2006 |
| CN | 2888936 | 4/2007 |
| CN | 101107113 | 1/2008 |
| CN | 101190049 | 6/2008 |
| CN | 201223028 | 4/2009 |
| CN | 101484035 | 7/2009 |
| CN | 101611950 | 12/2009 |
| CN | 202233324 | 5/2012 |
| CN | 202635746 | 1/2013 |
| CN | 202907958 | 5/2013 |
| CN | 103371564 | 10/2013 |
| CN | 203692653 | 7/2014 |
| CN | 203828180 | 9/2014 |
| DE | 3605662 | 6/1987 |
| DE | 4236081 | 4/1994 |
| DE | 29718491 | 2/1998 |
| DE | 19652690 | 6/1998 |
| DE | 19950121 | 11/2000 |
| DE | 10010182 | 9/2001 |
| DE | 10244433 B4 | 12/2005 |
| DE | 10244435 B4 | 2/2006 |
| DE | 102004063803 | 7/2006 |
| DE | 102005050411 | 4/2007 |
| DE | 202008017042 | 4/2009 |
| DE | 102008020890 | 10/2009 |
| DE | 202010008893 | 1/2011 |
| DE | 202010015777 U1 | 1/2011 |
| DE | 112009001291 | 4/2011 |
| DE | 102010052783 | 5/2012 |
| DE | 202012005735 | 8/2012 |
| DE | 102011108744 A1 | 1/2013 |
| DE | 102012206094 | 10/2013 |
| DE | 102013208170 | 11/2014 |
| EM | 001286116-0001 | 7/2011 |
| EM | 001286116-0002 | 7/2011 |
| EM | 001286116-0003 | 7/2011 |
| EM | 001286116-0004 | 7/2011 |
| EM | 001286116-0005 | 7/2011 |
| EM | 001286116-0006 | 7/2011 |

(56) References Cited

FOREIGN PATENT DOCUMENTS

| | | |
|---|---|---|
| EP | 0165353 | 12/1985 |
| EP | 752216 | 1/1997 |
| EP | 0873061 | 10/1998 |
| EP | 1197159 | 4/2002 |
| EP | 1424105 | 6/2002 |
| EP | 1854620 | 11/2007 |
| EP | 1872924 | 1/2008 |
| EP | 2110037 | 10/2009 |
| EP | 2233021 | 9/2010 |
| EP | 2250917 | 11/2010 |
| EP | 2316293 | 5/2011 |
| EP | 2342986 | 7/2011 |
| EP | 2446768 | 5/2012 |
| EP | 2649896 | 10/2013 |
| EP | 2540184 B1 | 7/2014 |
| EP | 2792261 | 10/2014 |
| EP | 2848144 | 3/2015 |
| EP | 2939558 | 11/2015 |
| EP | 3067100 | 9/2016 |
| ES | 1073997 | 6/2011 |
| FR | 2683432 | 5/1993 |
| GB | 2258801 | 2/1993 |
| JP | 01274705 | 11/1989 |
| JP | 2000197503 | 7/2000 |
| JP | 2002361749 | 12/2002 |
| JP | 2005218543 | 8/2005 |
| JP | 2008073548 | 4/2008 |
| KR | 1020110049293 | 5/2011 |
| TW | 201012407 | 4/2010 |
| WO | 8906501 | 7/1989 |
| WO | 1994020568 A1 | 9/1994 |
| WO | 2002/008322 | 1/2002 |
| WO | 2005023920 | 3/2005 |
| WO | 2005026243 A1 | 3/2005 |
| WO | 2005066250 | 7/2005 |
| WO | 2006015440 | 2/2006 |
| WO | 2006027671 | 3/2006 |
| WO | 2006034807 | 4/2006 |
| WO | 2006090221 | 8/2006 |
| WO | 2007082838 | 7/2007 |
| WO | 2008047538 | 4/2008 |
| WO | 2008047538 A1 | 4/2008 |
| WO | 2008087078 | 7/2008 |
| WO | 2009039555 | 4/2009 |
| WO | 2009095935 | 8/2009 |
| WO | 2010010010 | 1/2010 |
| WO | 2010037028 | 4/2010 |
| WO | 2010045144 | 4/2010 |
| WO | 2010136398 | 12/2010 |
| WO | 2011134996 A1 | 11/2011 |
| WO | 2012065926 | 5/2012 |
| WO | 2013013784 | 1/2013 |
| WO | 2013168256 | 11/2013 |
| WO | 2014046940 | 3/2014 |
| WO | 2015052265 A1 | 4/2015 |
| WO | 2015052267 A1 | 4/2015 |
| WO | 2015075546 A1 | 5/2015 |

OTHER PUBLICATIONS

U.S. Appl. No. 29/464,038, filed Aug. 12, 2013, Herath.
U.S. Appl. No. 29/464,051, filed Aug. 12, 2013, Galway et al.
U.S. Appl. No. 29/464,055, filed Aug. 12, 2013, Hoellmueller et al.
U.S. Appl. No. 14/472,847, Aug. 29, 2014, Reinhardt et al.
U.S. Appl. No. 14/473,168, Aug. 29, 2014, Reinhardt et al.
European Application No. 14152903.2, European Search Report mailed on Sep. 5, 2014, 8 pages.
U.S. Appl. No. 13/860,823, Non-Final Office Action mailed Jan. 28, 2015, 10 pages.
U.S. Appl. No. 14/472,847, Non-Final Office Action mailed Jan. 27, 2015, 8 pages.
U.S. Appl. No. 14/473,168, Non-Final Office Action mailed Jan. 29, 2015, 10 pages.
U.S. Appl. No. 14/823,227, Aug. 11, 2015, Paul Leonard Michael Smith, et al.
U.S. Appl. No. 14/825,690, Aug. 13, 2015, Stuart David Reinhardt, et al.
Baur et al., "Saechtling Kunststoff Taschenbuch", Hanser Verlag, 31. Ausgabe, Oct. 2013, 18 pages (9 pages for the original document and 9 pages for the English translation).
Gunzenhausen et al., "The right turn (part 1)—Determination of Characteristic values for assembly injection molding", Journal of Plastics Technology, Apr. 2008, pp. 1-8 (English translation of Abstracted provided).
Letter from Venable LLP dated Jan. 14, 2016, 6 pages.
U.S. Appl. No. 14/981,168, Dec. 28, 2015, Reinhardt et al.
U.S. Appl. No. 29/550,418, Jan. 4, 2016, Galway et al.
U.S. Appl. No. 62/137,139, Mar. 23, 2015, Gordon et al.
U.S. Appl. No. 13/860,823, Notice of Allowance dated Nov. 18, 2015, 13 pages.
U.S. Appl. No. 29/558,138, filed Mar. 15, 2016, Hoellmueller et al.
U.S. Appl. No. 15/076,043, filed Mar. 23, 2016, Tru.
U.S. Appl. No. 15/130,012, filed Apr. 15, 2016, Kormann et al.
U.S. Appl. No. 13/860,823, Final Office Action dated Jun. 24, 2015, 12 pages.
U.S. Appl. No. 13/860,823, Non-Final Office Action dated Mar. 17, 2016, 12 pages.
U.S. Appl. No. 14/472,847, Final Office Action dated Jun. 24, 2015, 12 pages.
U.S. Appl. No. 14/472,847, Non-Final Office Action dated Mar. 21, 2016, 14 pages.
U.S. Appl. No. 14/472,847, Notice of Allowance dated Nov. 30, 2015, 5 pages.
U.S. Appl. No. 14/473,168, Final Office Action dated Jun. 24, 2015, 13 pages.
U.S. Appl. No. 14/473,168, Notice of Allowance dated Nov. 30, 2015, 5 pages.
U.S. Appl. No. 14/473,168, Non-Final Office Action dated Mar. 22, 2016, 14 pages.
Chinese Patent Application No. 201310129895.4, Office Action dated Feb. 29, 2016, 8 pages (No English translation available. A summary of the Office Action is provided in the Transmittal Letter submitted herewith).
U.S. Appl. No. 15/093,233, Wardlaw, Angus et al.
https://www.britannica.com/print/article/463684, Aug. 17, 2016, 15 pages.
Non-Final Office Action, U.S. Appl. No. 14/981,168, dated Jun. 28, 2016, 13 pages.
U.S. Appl. No. 13/860,823, Advisory Action, Nov. 3, 2016, 4 pages.
U.S. Appl. No. 13/860,823, Final Office Action, Oct. 12, 2016, 13 pages.
U.S. Appl. No. 14/472,847, Final Office Action, Oct. 21, 2016, 13 pages.
U.S. Appl. No. 14/473,168, Final Office Action, Oct. 21, 2016, 14 pages.
U.S. Appl. No. 14/981,168, Final Office Action, Dec. 21, 2016, 13 pages.
European Patent Application No. 16185866.7, Extended European Search Report, Dec. 9, 2016, 9 pages.
European Patent Application No. 16185859.2, Extended European Search Report, Dec. 9, 2016, 10 pages.
European Patent Application No. 16185862.6, Extended European Search Report, Dec. 9, 2016, 10 pages.
Chinese Patent Application No. 201310129895.4, Office Action, Dec. 9, 2016, 6 pages.
Nauta, "Stabilisation of Low Density, Closed Cell Polyethylene Foam", University of Twente, Netherlands, 2000, 148 pages.
"Colour and Additive Preparations for Extruded Polyolefin Foams", Gabriel-Chemie Group, 20 pages, available at www.gabriel-chemie.com/downloads/folder/PE%20foams_en.pdf, last accessed on Jan. 17, 2017.

(56) References Cited

OTHER PUBLICATIONS http://www.dow.com/polyethylene/na/en/fab/foaming.htm, 1 page, Dec. 7, 2011.
Third Party Submission, U.S. Appl. No. 14/981,168, Nov. 14, 2016, 44 pages.

* cited by examiner

SOLES FOR SPORTS SHOES

CROSS REFERENCE TO RELATED APPLICATION

This application is a continuation of U.S. patent application Ser. No. 13/860,823, filed on Apr. 11, 2013 ("the '823 application"), now pending, which is related to and claims priority benefits from German Patent Application No. DE 10 2012 206094.4, filed on Apr. 13, 2012, entitled SOLES FOR SPORTS SHOES ("the '094 application"), and European Patent Application No. 13151596.7, filed on Jan. 17, 2013, entitled SOLES FOR SPORTS SHOES ("the '596 application"). The '823, '094, and '596 applications are hereby incorporated herein in their entireties by this reference.

FIELD OF THE INVENTION

The present invention relates to soles for shoes, in particular soles for sports shoes, comprising expanded thermoplastic polyurethane.

BACKGROUND

By means of soles, shoes are provided with a variety of different properties that may, depending on the specific type of shoe, be realized to different extents. Primarily, shoe soles usually serve protective purposes. By means of their stiffness, which is increased when compared to the stiffness of the shoe upper, shoe soles protect the respective wearer's foot from injuries caused for example by sharp objects that the wearer of the shoe steps upon. Moreover, a shoe sole usually protects the shoe from excessive abrasion by means of its increased abrasion-resistance. Further, shoe soles may increase the grip of a shoe on the respective ground and may thus facilitate quick movements. It may be a further function of a shoe sole to provide a certain stability. In addition, a shoe sole may provide a cushioning, for example to damp the forces that occur when the shoe contacts the ground. Finally, a shoe sole may protect the foot from dirt or splash water or it may provide a multitude of further functionalities.

In order to meet this plethora of functionalities, various materials are known in the prior art out of which shoe soles may be manufactured. For example, shoe soles may be manufactured from ethylene-vinyl acetate ("EVA"), thermoplastic polyurethane ("TPU"), rubber, polypropylene ("PP") or polystyrene ("PS"). Each of these different materials provides a specific combination of different properties that are more or less well suited for soles of specific types of shoes, depending on the particular requirements of the respective type of shoe. For example, TPU is very abrasion-resistive and tear-resistant. Moreover, EVA provides a high stability and relatively good cushioning properties.

It is a common disadvantage of the aforementioned materials that shoe soles made from of these materials have to be manufactured separately and subsequently have to be attached to the shoe upper, e.g. by gluing or sewing. From WO 2008/087078, WO 2007/082838, WO 2010/136398, and WO 2005/066250, expanded TPU is known, which may be used for manufacturing shoe soles. For example, WO 2005/066250 describes that a shoe sole formed out of expanded TPU may be attached to a shoe upper without additional gluing means. Further, WO 2005/066250 discloses that the expanded TPU is foamed in a tool in contact with the shoe upper and, thus, a sole made of expanded TPU is provided that adheres to the shoe upper. In addition, WO 2005/066250 describes the possibility of pre-manufacturing an outsole of thermoplastic elastomer (e.g. polyvinyl chloride ("PVC"), thermoplastic rubber, TPU) and, after its curing, providing expandable TPU in the form of foam to a cavity between the outsole and the shoe upper. Hence, the outsole does not need to be glued to the shoe upper.

However, the disclosure of WO 2005/066250 describes the disadvantage that the properties of the sole are influenced by the sole of expanded TPU continuously over the entire surface. A fine control of the sole properties is not possible according to WO 2005/066250.

It is therefore desirable to provide improved soles for shoes, in particular sports shoes. It is further desired to provide improved possibilities to construct such soles from expanded TPU.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments, a sole for a shoe, in particular a sports shoe, comprises at least a first and a second surface region, wherein the first surface region comprises an expanded TPU, in particular randomly arranged particles comprising expanded TPU, and wherein the second surface region is free from expanded TPU.

A combination of a surface region of expanded TPU and a surface region that is free from expanded TPU, e.g. made from different materials, provides the properties of expanded TPU specifically in those locations where these properties are desired and combines these properties with different properties in a different surface region.

Expanded TPU distinguishes itself by means of its good elastic and cushioning properties. For example, expanded TPU may be particularly cushioning. Thus, external shocks that arise for example when the sole hits the ground may thus be dampened well such that a pleasant wearing comfort is achieved. In addition, expanded TPU can provide large elasticity. By means of a large elasticity, the energy that is absorbed for deforming the sole is released again by the sole. Thus, the energy is not lost. This energy may be used by for example a runner after the sole has hit the ground since the sole springs back essentially without any loss of energy.

Expanded TPU also provides a large long-term stability, i.e. even when exposed to permanent external forces it only deforms to a small extent. Therefore, this material is particularly well suited as material for shoe soles. Moreover, it turns out that the mechanical properties of expanded TPU are essentially temperature-independent over a wide range of temperatures. Thus, by means of this material, the properties of a shoe sole may be simultaneously optimized over a wide range of temperatures. Therefore, sports shoes, e.g.

jogging shoes, with a sole that comprises a first surface region of expanded TPU may be used both for winter and summer temperatures, e.g. in a range from about 0° C.-30° C. without any substantial change to its functionality, e.g. a changed cushioning. In contrast, the material EVA, which is widely used for shoe soles in the prior art, comprises a significantly larger temperature-dependence.

A further advantage of expanded TPU is that it has been found to provide up to about 30% better heat insulation as compared to conventional materials used for sole design known from the prior art. It may therefore be used in winter sports apparel, in particular winter shoes, where good heat insulting properties may be desirable.

By means of a first surface region that comprises expanded TPU, for example in the heel region of a sole, a particularly large cushioning may be achieved, whereas by means of using a stiffer material in the remaining region of the sole, an increased stability may be achieved. The advantageous material properties of the expanded TPU may in total be exactly adapted to the needs of the respective sole and, thus, a sole may be designed in an optimized manner both area-wide and modularly.

Using expanded TPU for a sole that comprises at least two surface regions is also advantageous because this material may be attached to a variety of other materials without the need for additional gluing means. It enables a combination with second surface regions made from a variety of expandable and not expandable materials, such as EVA, TPU, rubber, PP, expanded PP, PS, polyamide, polyether block amide ("PEBA"), polyoxymethylene ("POM"), polyethylene ("PE"), polyoxyethane ("POE"), ethylene propylene diene monomer ("EPDM"), etc. Hence, the design possibilities for the first and second surface regions are almost unlimited. The present invention opens up a variety of design possibilities for novel shoe soles.

A partial region of a sole, as being used herein, is an arbitrary shaped part of a sole. In contrast, a surface region specifies a specific partial region of a sole, namely a partial region that continuously extends from the lower surface of the sole to the upper surface of the sole. The term partial region of a sole comprises surface regions of the sole but also for example a sole layer or a surface region of a sole layer or other partial regions of the sole.

In certain embodiments, the surface regions of the sole are bonded to each other by a steaming process for the expanded TPU. Surprisingly, this may be carried out with a variety of materials that may be used for the second surface region, for example those specified above. The resulting bond is strong enough to resist the large forces that typically act on a shoe sole. Hence, the surface regions do not have to be additionally glued or sewed. However, in other embodiments, the surface regions may be further bonded together by a foil, such as a foil comprising TPU. Bonding the surface regions by means of the steaming process allows a less labor-intensive, faster, and, thus, also cheaper production. Moreover, the precision of the connection is significantly larger in a steaming process, as compared to for example sewing or gluing, and it may be automated more easily. In addition, a more environmentally-friendly manufacturing method with increased labor-safety is provided by avoiding gluing means since gluing means usually are hazardous to health and/or harmful to the environment.

In further embodiments, the second surface region comprises a foamed EVA. The combination with foamed EVA allows a second surface region that comprises good cushioning and that provides increased stability to the sole.

In some embodiments, the second surface region comprises a non-expanded TPU. A combination with non-expanded TPU is also advantageous since the expanded and the non-expanded TPU bond to each other particularly well. As a result, a particularly durable sole may be provided. Further, by using non-expanded TPU, the second surface region may be provided with a large tear-resistance and abrasion-resistance. In some embodiments, the non-expanded TPU serves as outsole material.

In further embodiments, the second surface region comprises rubber. By means of using rubber, the second surface region may e.g. be provided with a large slip-resistance.

In further embodiments, the second surface region comprises PP. PP allows a high hardness and simultaneously a relatively low weight of the second surface region.

In further embodiments, the second surface region comprises a polyamide ("PA"). By means of PA, a particularly stiff second surface region may be provided.

In further embodiments, the second surface region comprises PS. By means of using PS, second surface regions may be provided that are particularly hard and simultaneously comprise low weight.

In further embodiments, the second surface region comprises one or more of PEBA, POM, PE, POE and/or EPDM.

In some embodiments, the second surface region comprises expanded PP. Expanded PP is an extremely light yet stable material. It can therefore be used in combination with expanded TPU to provide a light-weight sole that provides good stability, cushioning and energy return. In certain embodiments, the complete sole has a weight of less than about 100 g and, in other embodiments, the complete shoe has a weight of less than about 100 g. In certain embodiments, the ratio of expanded PP and expanded TPU may be about 70% expanded PP to about 30% expanded TPU. In other embodiments, the expanded TPU may comprise about 10%-30% of the entire sole, and may further comprise about 15% of the entire sole.

In yet other embodiments, the second surface region may comprise one or more different materials, for example EVA or any other material discussed herein, in addition to or in place of the expanded PP. In certain embodiments, the expanded TPU may comprise about 10%-40% of the entire sole, may further comprise about 10%-30% of the entire sole, and may even further comprise about 15% of the entire sole, depending on the specific sole design and intended use of the sole. In yet other embodiments, the first surface region comprising expanded TPU may comprise less than about 40% of the entire sole, may further comprise about 10%-30% of the entire sole, and may even further comprise about 15% of the entire sole.

In some embodiments, the second surface region is arranged at a rim of the sole. Thus, for example the stability and/or the slip-resistance of the sole may be increased at the rim of the sole by means of the second surface region. Moreover, a twisting of the foot may thus be counteracted. Arranging the second surface region at a rim of the sole, in this context, allows for minimizing of the second surface region.

In further embodiments, the second surface region comprises a sole plate and/or a torsion bar and/or an outsole and/or a recess for receiving functional elements. Functional elements may for example be frames that are specifically adapted for sprinting shoes and/or a unit for supporting the cushioning of shear forces and/or an element for supporting the pronation and/or an electronic unit.

By means of using the specified elements in the second surface region, the functionality of the sole may be further improved. In certain embodiments, the elements are prefabricated. The elements are bonded in a precise manner to a first surface region by means of a steaming process for the first surface region.

In some embodiments, the first surface region comprises a varying thickness. By means of the varying thickness, the properties of the surface region may be precisely controlled. By means of a larger thickness at specific locations, e.g. an increased cushioning may be provided. Moreover, by means of varying the thickness, a specific profile of the sole may be achieved. By means of using expanded TPU, surface regions with varying thickness may be manufactured in an advantageous manner. By means of the longevity of the expanded TPU, the variation of the thickness will be permanently maintained even if the sole is heavily used.

The thickness of the first surface region may increase from the forefoot region of the sole towards the heel region. Thus, an increased stiffness may be achieved in the heel region. Moreover, that way, the weight of the sole may be increased towards the heel region in order to provide a more natural wearing feeling.

In some embodiments, the first surface region comprises at least one recess. Hence, the first surface region, in fact, only has to be provided to the extent to which it is actually needed. Weight and costs of the sole are thus reduced.

In further embodiments, the first surface region is essentially arranged at a rim of the sole. By means of arranging it at a rim of a sole, in some embodiments, essentially the entire stepping surface of the sole may be supported by means of the first surface region. To this end, the first surface region does not necessarily have to be arranged in the internal region of the sole. Thus, the surface of the first surface region may be minimized substantially without any loss of functionality.

The thickness of the first surface region may be increased at the rim of the sole. As large forces arise, for example by means of changing the direction of running, such as at the rim of the sole, an increased thickness may provide a correspondingly increased stiffness in that location.

In certain embodiments, the first surface region is arranged in the midfoot region and/or in the forefoot region of the sole. Hence, a particularly large cushioning may be provided in the midfoot region and/or the forefoot region of the sole. An increased cushioning is particularly desirable in these regions and/or in one of these regions for many types of shoes, for example for basketball shoes, since often the primary contact between sole and ground occurs in these regions and/or in one of these regions during fast movements.

In further embodiments, the sole comprises a third surface region that comprises an expanded TPU. By means of the advantageous manufacturing of expanded TPU, it is also possible to include a third surface region of this material into the sole. Thus, further design possibilities concerning the functionality and the appearance of the sole are provided.

In certain embodiments, the first surface region is located in the heel region of the sole, wherein the third surface region is arranged in the midfoot region and/or in the forefoot region of the sole. Thus, both in the midfoot region and/or the forefoot region and in the heel region of the sole, an increased cushioning may be provided without having to use the expanded TPU continuously therebetween. Rather, an intermediate region may remain free such that material, weight, and costs may be saved.

In other embodiments, it may also be desirable to have the complete heel (i.e. the full thickness and the full width of the heel) and/or the complete midfoot region comprising expanded TPU, e.g. if a particularly cushioning sole is desirable.

In other embodiments, the first surface region is arranged in the midfoot region and/or the forefoot region and the sole further comprises a partial region arranged in the heel region of the sole.

In certain embodiments, the partial region comprises a heel insert comprising an elastomer compound, for example a highly viscose EVA based compound. One example for such a highly viscose EVA based compound is described in document DE 100 10 182.9-09.

A combination of a first surface region comprising expanded TPU and such a heel insert is of particular advantage for use in a heat insulating footwear, for example a winter shoe or a hiking shoe. The expanded TPU provides a high rate of energy return, while having extreme temperature stability in high/low temperature regions and high heat insulating properties. This is of particular importance for winter footwear, where the expanded TPU can insulate the wearer's foot against the cold and increase the overall comfort while still providing a good feel of the ground. The heel insert, in particular a heel insert comprising an elastomer compound can absorb the energy that is applied to the sole with the first impact of the foot on the ground. The absorption of this shock energy is important to prevent injuries and a heel insert comprising an elastomer compound, such as for example a highly viscose EVA based compound, is particularly well suited for this purpose. Another advantageous effect of a heel insert as described above is to provide better stability on uneven surfaces.

In certain embodiments, the first surface region and/or the third surface region and/or the partial region are surrounded by the second surface region. Thus, for example the stability of the first surface region and/or the third surface region and/or the partial region may be increased. Moreover, the functionality of the first surface region and/or the third surface region and/or the partial region may thus be influenced since for example the possible extension of the first surface region and/or the third surface region and/or the partial region may be limited by the second surface region.

In further embodiments, the sole comprises a reinforcement material, for example to improve the stability of the sole. The reinforcement material may be a fiber-like reinforcement material or a textile reinforcement material. The textile reinforcement material may be woven or non-woven, layered, or knitted. The reinforcement material can further be non-stretchable; it may be tear resistant and may comprise strong fibers and/or a strong textile material. In some embodiments, the reinforcement material is attached to at least a part of one of the surface regions and/or a part of the partial region. In other embodiments, the reinforcement material is glued to at least a part of the surface regions and/or a part of the partial region. In yet other embodiments, the reinforcement material is attached to at least a part of the surface regions and/or a part of the partial region by the use of a foil, in particular a foil comprising TPU, as further described below.

The use of a reinforcement material, in particular a textile reinforcement material, facilitates the construction of an extremely light-weight sole. For example, instead of a frame, the textile reinforcement material may be used to provide the necessary stability to the sole in combination with a second surface region comprising a light-weight material, such as expanded polypropylene.

In further embodiments, one or more surface regions and/or the partial region are at least partially surrounded by a foil, in particular a plastic foil. The foil may comprise a TPU, PA, polycarbonate and/or carbon fiber and/or other material. By means of using foils, on the one hand, the external appearance of the one or more surface regions and/or the partial region may be modified. The foil provides the surface regions and/or the partial region e.g. with a specific color and/or a specific texture. Moreover, the foil may also modify a functionality of the one or more surface regions and/or the partial region. For example, the foil may be designed such that its geometry limits the extension and thus the cushioning properties of e.g. the first surface region. On the other hand, the foil may influence the surface properties of the one or more surface regions and/or the partial region, for example their hydrophobicity or their stiction. In addition, the foil may serve as decoration, as outsole, as sole plate, and/or as connecting element. The foil may have a thickness of about 0.05 mm to about 1 mm. In some cases, the foil may have a thickness of several millimeters.

In certain embodiments, the foil is bonded to at least a part of the one or more surface regions and/or a part of the partial region by partially melting at least a part of the foil and/or a part of the one or more surface regions and/or a part of the partial region. In some embodiments, the foil is bonded to at least a part of the surface regions and/or a part of the partial region by a chemical reaction.

By bonding the foil and the surface regions and/or the partial region through a chemical reaction, the bond is of particular durability and cannot be separated through mechanical influence, e.g. during running.

In further embodiments, the foil is imprinted on the side of the foil facing the one or more surface regions and/or the partial region. By imprinting the foil on this side, the printing is protected against mechanical or chemical influences while wearing the shoe and increases durability of the printing. Additionally, or alternatively, the foil may also be imprinted on the side facing away from the one or more surface regions and/or the partial region.

In yet other embodiments, the foil is used to attach one or more further inner sole elements to one or more surface regions and/or the partial region. An inner sole element is a functional element that is disposed between at least one surface element and/or the partial element and the foil. By disposing the functional element between the at least one surface element and/or the partial element on the one side and the foil on the other side, the functional element is further secured in its position and protected against mechanical or chemical influences. This is of particular importance for easily damageable functional elements, e.g. electrical elements.

In further embodiments, the foil can act as a means to attach further outer sole elements to the midsole. Outer sole elements are functional elements that are bonded to the midsole by use of the foil and are disposed on top of the foil.

In further embodiments, the foil may be used in combination with both inner and outer sole elements as described above.

In some embodiments, an inner sole element and/or an outer sole element comprises one of a sole plate, an outsole element, a torsion bar, and a textile reinforcement material.

In other embodiments, the foil and the inner and/or outer sole elements comprise a similar material, in particular TPU, such that they may be bonded together very well by a chemical bond without the use of additional adhesives. This provides for the advantageous effects already discussed above.

Further embodiments comprise coloring part of the sole comprising TPU, in particular one or more surface regions comprising TPU and/or a foil comprising TPU, with a color comprising TPU. By using a color comprising TPU to color these parts, the coloring is extremely durable and inseparably bonded to the respective parts of the sole through a chemical reaction.

In certain embodiments, a sole for a shoe, in particular a sports shoe is provided comprising a partial region, wherein the partial region comprises an expanded TPU. The sole in addition comprises a surface region that is free from expanded TPU. Also this aspect may be combined with embodiments that are described herein.

In further embodiments, a problem of the present invention is solved by means of a sole for a shoe, in particular a sports shoe, comprising a first partial region that comprises a first expanded TPU and a second partial region that comprises a second expanded TPU, wherein the first expanded TPU and the second expanded TPU are manufactured using a different steaming process and/or using a different base material.

Such a sole comprises the advantageous properties of expanded TPU that may, in addition, be locally adapted to the specific requirements at a first and a second partial region. The advantageous properties of the expanded TPU, such as for example large cushioning and temperature-independence, may thus be used and at the same time a flexible design of the sole with different properties in at least a first and a second partial region may be provided.

Using a different steaming process for the first and the second expanded TPU allows manufacturing two partial regions with different properties out of a single base material. Therein, by means of gradual changes in the steaming process (for example of the pressure, the density or the temperature), the properties of the corresponding expanded TPU may be fine controlled. Hence, different properties may be achieved without having to provide different materials.

Also using different base materials for the first and the second partial region allows different properties of the respective expanded TPU. Thus, the first and second partial regions may also be provided with different properties without having to change parameters of the steaming process.

The first expanded TPU may comprise a first particle size, wherein the second expanded TPU may comprise a second particle size that differs from the first particle size. The different particle sizes for example may provide different cushioning of the first and second TPU. The different particle size may be achieved by means of different particle sizes of the base material and/or a different steaming process.

In other embodiments, the sole further comprises a reinforcement material as described above.

In further embodiments, one or more partial regions are at least partially surrounded by a foil, in particular a plastic foil. The foil may be bonded to the one or more partial regions in a steaming process for the one or more partial regions, in particular through a chemical reaction. By means of using the foil, the properties of the one or more partial regions may be further differentiated with respect to each other. In addition, a foil allows further differentiating the external appearances of the one or more partial regions. Additionally, the foil may be used in combination with further inner and/or outer sole elements as described above.

In some embodiments, the partial regions are bonded to each other by a steaming process for the first expanded TPU and/or the second expanded TPU. Also, when using two partial regions with a first and a second TPU, the sole elements may thus be bonded to each other in a labor-saving, fast, and cost-efficient manner. In addition, the precision of the bonding of two partial regions of expanded TPU is particularly high since the partial regions expand in an almost identical manner and thus the adaptation of the partial regions to each other is ensured particularly well.

In further embodiments, the first partial region comprises a first sole layer and a second partial region comprises a second sole layer. Thus, a sole may be provided that comprises different functionalities in different sole layers. For example, it may be particularly advantageous to provide a sole layer that is located close to the foot of the wearer of the shoe in a particularly cushioning manner, whereas for example an outer sole layer may be provided with more strength and/or abrasion-resistance.

In certain embodiments, the sole comprises a third sole layer that is free from expanded TPU. Thus, the sole may be combined with specific properties of other materials. According to some embodiments, the third sole layer is bonded to at least one of the first and the second sole layers in a steaming process for at least one of the first and the second sole layers. The third sole layer may for example be an outsole that comprises high slip-resistance and/or high abrasion-resistance. The outsole may comprise non-expanded TPU, in particular transparent TPU. Thus, there are various possibilities for creating designs since the transparent outsole may be printed on, foils may be arranged on their back side or they may be colored. Hence, different designs and/or ornamentations may be arranged on the outsole.

In further embodiments, the third sole layer is arranged between the first and second sole layer. For example, in a first sole layer that is arranged close to the shoe upper a high cushioning may be provided in order to achieve a pleasant wearing comfort. At the same time, in a second sole layer, which is arranged such that it faces the bottom area of the sole, a high elasticity may be provided. Both sole layers may be stabilized by means of the third sole layer.

In some embodiments, the first partial region comprises a first surface region and the second partial region comprises a second surface region. Thus, the different possible advantageous properties of expanded TPU may be combined advantageously in a first and a second surface region.

In certain embodiments, the first surface region is arranged essentially on the medial side of the sole. Thus, for example the elasticity may be increased in that region. This facilitates fast lateral movements of the foot since that region of the sole often has to bear particular loads when fast lateral movements are carried out. Returning the energy that is used for the loading by means of high elasticity when cushioning the load is thus particularly desirable in that region.

In further embodiments, the first surface region is arranged essentially on the medial side of the sole and the second surface region is essentially arranged on the lateral side of the sole. Thus, lateral movements of the foot may be supported and/or balanced particularly well.

In further embodiments, at least one of the partial regions comprising TPU and/or the foil comprising TPU may be colored with a color comprising liquid TPU to provide the advantageous effects discussed above.

In certain embodiments, the sole is constructed in such a way that the sole has a weight of less than about 100 g. By providing such a light sole, an extremely light-weight shoe may be provided that is beneficial e.g. to the performance of an athlete wearing the shoe. In other embodiments, the complete shoe has a weight of less than about 100 g.

In yet other embodiments, an insole for arrangement within an upper of a shoe, in particular a sports shoe, comprises expanded TPU.

By means of providing an insole with expanded TPU, insoles may be equipped with the specific properties of this material. The expanded TPU is particularly suitable for insoles since insoles require particularly good cushioning properties as well as elastic properties. Since the properties of the expanded TPU, as already discussed, are variable, insoles with different specifications may be provided that may be exchanged easily. For example, a soft insole may be used for practicing purposes and a harder sole may be used for competitions. The respective desired properties may thus be achieved by simply inserting a suitable insole made from expanded TPU. The properties of the insole may in this context be varied without having to vary the thickness of the insole. The extensive temperature-independence of the properties of expanded TPU renders expanded TPU advantageous particularly for insoles. In spite of warming the insole to the body temperature of the foot during the course of time, the properties of the insole remain constant.

By means of using expanded TPU for an insole, for example, enough cushioning functionality may be provided such that an additional intermediate sole is not necessary. Hence, the manufacturing of a shoe may be simplified. Moreover, the user therefore has the possibility to change the functionality that would normally be provided by an intermediate sole—which is not exchangeable—by means of changing the insole.

In addition, by means of expanded TPU a particularly elastic insole may be provided that returns the energy used for compressing the insole with only minimal losses when springing back. Further, by means of expanded TPU a particularly light insole may be provided.

In certain embodiments, the insole is at least partially surrounded by a foil, in particular a plastic foil. In that way, as already explained, the functionality of the expanded TPU as well as its external appearance and its texture may be changed. In the context of insoles in particular also a change of the haptics of the insole is of advantage. It is also of importance that the effect of for example water or dirt on the insole may be affected by the foil. The foil may further be used in a number of additional ways described above to provide the further benefits already discussed.

In other embodiments, the insole may further comprise a textile reinforcement material, e.g. to increase the stability of the sole.

In further embodiments, the insole and/or the foil may be colored with a color comprising liquid TPU.

In further embodiments, a shoe, in particular a sports shoe, comprises a sole according to one of the aforementioned embodiments.

The shoe may comprise an upper wherein the sole is bonded to the upper in a steaming process without gluing means. Thus, a gluing or sewing of the shoe sole to the upper is avoided.

In further embodiments, a method for manufacturing a shoe sole, in particular a shoe sole for a sports shoe comprises loading a mold with an expanded TPU for a first surface region. In addition, the mold is loaded with a material that is free from expanded TPU for a second surface region. Moreover, steam is fed to the expanded TPU. In that way, the expanded TPU may be melted and bonded to a foam structure. By means of this method an advantageous sole may be manufactured efficiently. In particular, the method allows a large degree of automation and at the same time design freedom. An arbitrary first surface region with expanded TPU and a surface region free from expanded TPU may be bonded to form a sole in one manufacturing method. Steps such as cutting or gluing are unnecessary.

In other embodiments, a method for manufacturing a shoe sole, in particular a shoe sole for a sports shoe, is provided, comprising a loading of a mold with a first expanded TPU for a first partial region and a loading of the mold with a second expanded TPU for a second partial region. The first and the second expanded TPU comprise different densities and/or different base materials. In addition, steam is fed to the first and second expanded TPU. Thus, soles that include the advantageous material properties of expanded TPU and also enable varying the properties of the expanded TPU within the sole may be provided in an efficient manufacturing process.

In some embodiments, the expanded TPU and/or the first and the second expanded TPU comprise particles. These particles may be loaded into a mold in a simple manner. They may be compressed in the mold and recast into a continuous foam structure. The particle shape allows manufacturing expanded TPU with different properties in a simple manner.

In some embodiments, the method further comprises the partial melting of the surface of the particles. In these embodiments, the particles are heated by means of applying steam, wherein the surface of the particles partially melts, such that the particles may chemically bond to each other. This leads to a foam structure of the expanded TPU.

In other embodiments, the expanded TPU or the first and/or the second expanded TPU is compressed after the loading of the mold. The densification may be provided by a reduction of the volume of the mold, for example by closing the mold to a predetermined extent. Therein, the density may be varied, which allows different weights and stabilities of an expanded TPU. For example, the density may be varied by means of varying the extent to which the mold is opened prior to the loading while at the same time the geometry is maintained. The more the expanded TPU is compressed, the more stable it will for example be in its final state. Moreover, the densification may be locally varied. Thus, by means of densification, a desired locally-varying stability of the expanded TPU may be achieved. In that way, a large design freedom and variability is obtained with which different expanded TPU may be provided when using only a single base material.

In yet other embodiments, the loading of the expanded TPU or the first and/or the second expanded TPU is carried out under pressure. Expanded TPU is thus loaded into the mold in a pressurized manner. Thus, a faster manufacturing method may be provided.

In further embodiments, a method for manufacturing a shoe sole further comprises a relaxation of the expanded TPU or the first and second expanded TPU. Subsequent to loading the mold with compressed, expanded TPU, the pressure within the mold is relaxed. In these embodiments, the compressed, expanded TPU particles re-expand essentially to their original size. Thus, a continuous foam structure may be provided.

In further embodiments, a method for manufacturing a shoe sole additionally comprises a curing of the expanded TPU or the first and second expanded TPU. By means of a curing step, the structure of the expanded TPU may be stabilized.

BRIEF DESCRIPTION OF THE DRAWINGS

In the following detailed description, embodiments of the invention are described referring to the following figures:

FIG. 2b is a partial perspective view of the shoe of FIG. 2a.

FIG. 2c is a bottom perspective view of the shoe of FIG. 2a.

FIG. 3b is an exploded view of the sole of the shoe of FIG. 3a.

FIG. 4b is a side view of the shoe of FIG. 4a.

FIG. 5b is a side view of the sole of the shoe of FIG. 5a.

FIG. 7b is a side view of the shoe of FIG. 7a.

FIG. 8b is a bottom view of the shoe of FIG. 8a.

FIG. 9b is a rear view of a portion of the shoe of FIG. 9a.

FIG. 10b is a top view of the sole of the shoe of FIG. 10a.

FIG. 12b is a top view of the insole of FIG. 12a.

FIG. 12c is a side view of the insole of FIG. 12a.

FIG. 13b is a top view of the insole of FIG. 13a.

FIG. 13c is a side view of the insole of FIG. 13a.

FIG. 18b is another perspective view of the sole of FIG. 18a.

FIG. 19b is another perspective view of the sole of FIG. 19a.

FIG. 20b is a bottom perspective view of the sole of FIG. 20a.

FIG. 20c is a side perspective view of the sole of FIG. 20a.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In the subsequent detailed description, presently preferred embodiments of the present invention are described with respect to sports shoes. However, it is emphasized that the present invention is not limited to these embodiments. For example, the present invention may also be applied to shoes for work, leisure shoes or other shoes.

Figure 1A:
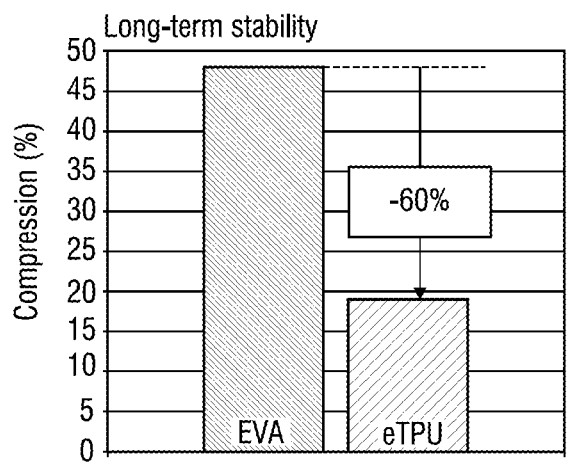
FIG. 1a is a graph comparing long-term stability properties of expanded TPU and EVA.
Figure 1B:
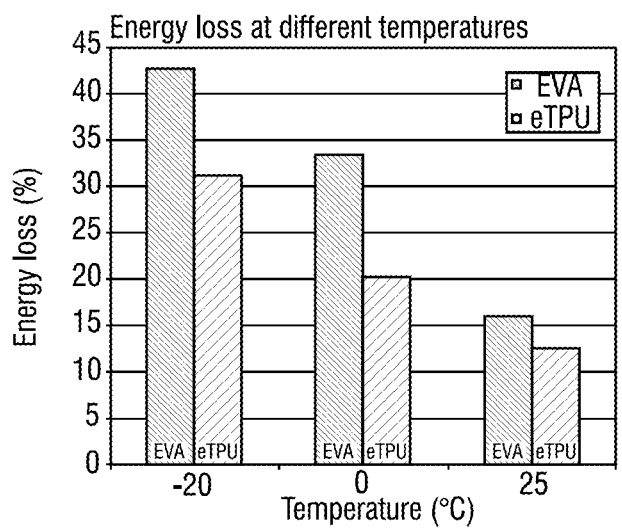
FIG. 1b is a graph comparing energy loss properties of expanded TPU and EVA at different temperatures.
Figure 1C:
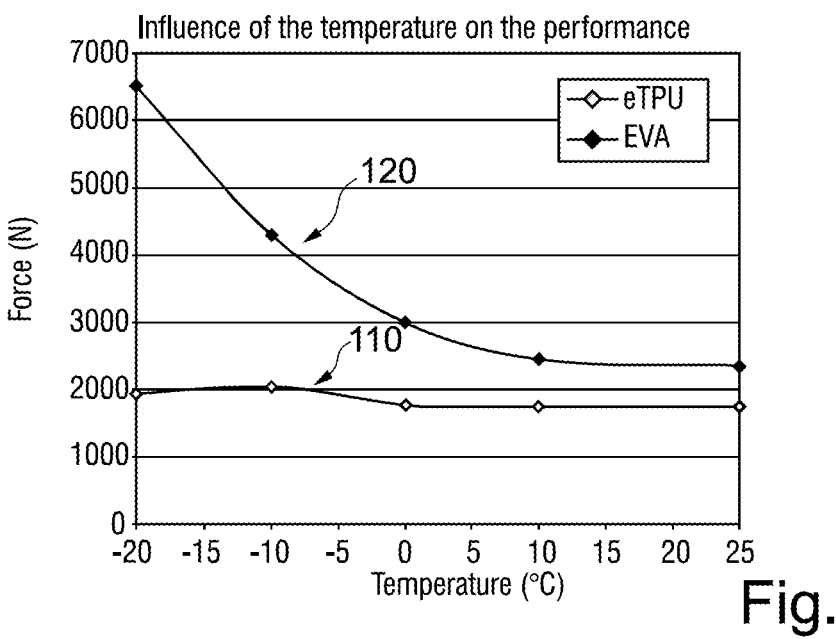
FIG. 1c is a graph comparing influence of temperature on performance of expanded TPU and EVA.

FIGS. 1a-c show a comparison of the properties of expanded TPU ("eTPU") and foamed EVA.

FIG. 1a shows the long-term stability of both materials. It may be seen that expanded TPU, when compared to foamed EVA, is compressed about 60% less for the same long-term load of approximately 100,000 compression cycles. Thus, expanded TPU is more dimensionally stable. Even when forces are applied continuously, it is only compressed to a small extent and therefore, to a large degree, maintains its shape. Thus, it is very well suited for soles that are exposed to such high long-term loadings. By means of the longevity of expanded TPU, waste due to worn-out shoes and shoe soles, respectively, is also avoided in the long run. Thus, more environmentally-friendly shoes may be provided. As already mentioned, expanded TPU is very durable and it is also very soft. Its cushioning range is up to about 80%, meaning that for example a 10 mm thick sole may be compressed down to about 2 mm during usage. The material therefore provides good cushioning to, e.g., a runner and the runner has to use less energy during running, resulting in improved running efficiency.

FIG. 1b shows the energy loss of EVA and expanded TPU for different temperatures. The energy loss in percent indicates the amount of energy used for compressing the material that is lost during the subsequent expansion, which for example is converted to heat. This fraction of the energy is not returned, for example, to a sprinter when the sole springs back after hitting the ground and compressing. Therefore, an energy loss that is as small as possible is usually desirable. As is shown in FIG. 1b, the energy loss is substantially smaller in expanded TPU as compared to foamed EVA in all typical temperature ranges. The energy loss of expanded TPU is reduced compared to foamed EVA by at least about 25% at 25° C. At 0° C., it is reduced by at least about 40% and at −20° C., it is reduced by at least about 28%.

FIG. 1c shows the force that has to be applied for a predetermined compression of expanded TPU and foamed EVA in a temperature-dependent comparison. It may be seen that the curve 110 for expanded TPU is essentially constant in a temperature range from about −20° C. to about +30° C. Therefore, the compressibility of expanded TPU is essentially temperature-independent. Further, FIG. 1c shows that expanded TPU stays softer than EVA (cf. curve 120 for EVA) in all temperature ranges, i.e. it may have a stronger cushioning effect. In particular, expanded TPU, in contrast to EVA, avoids the disadvantage of becoming hard at low temperatures. Furthermore, since the material characteristics of expanded TPU are temperature-independent (within the temperature range of interest for footwear), expanded TPU is more durable and maintains its good performance characteristics in every situation. Expanded TPU therefore avoids the disadvantage of becoming hard, stiff, brittle or damaged.

Figure 21:
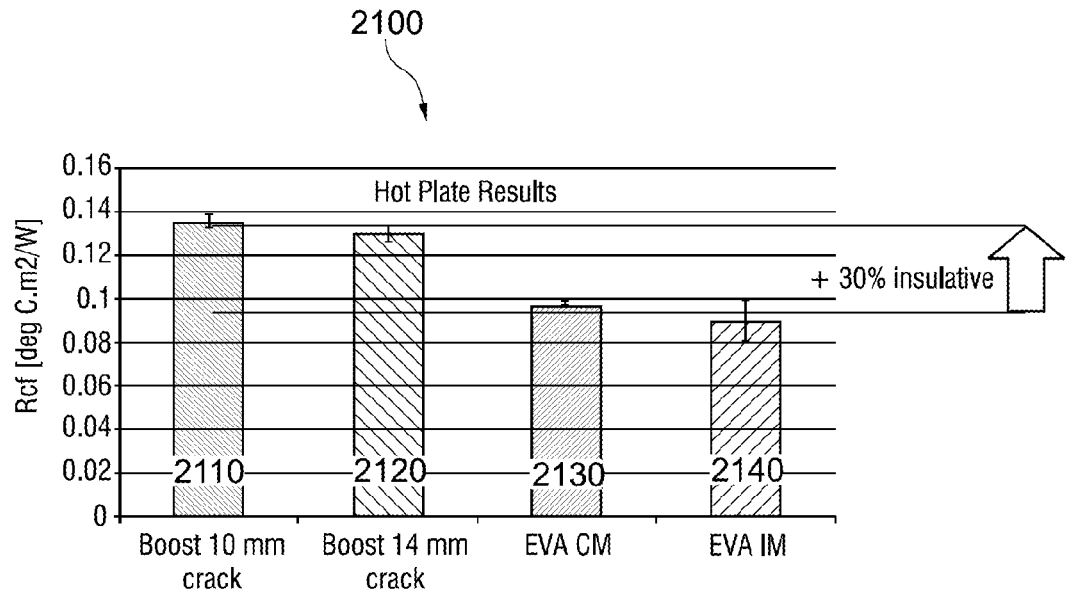
FIG. 21 is a diagram illustrating the heat insulating properties of expanded TPU compared to EVA.

Furthermore, FIG. 21 shows the results of measurements of the heat insulating properties of expanded TPU (cf. measurements 2110 and 2120) compared to EVA (cf. measurements 2130 and 2140). Measurement 2110 relates to expanded TPU manufactured with approximately a 10 mm crack, wherein the crack is the opening of the mold while filling and before compression and steaming of the expanded TPU (for more details on the manufacturing process, cf. below). Measurement 2120 relates to expanded TPU manufactured with approximately a 14 mm crack. Measurement 2130 relates to compression molded EVA material, and measurement 2140 relates to injection molded EVA material. As can be seen from FIG. 21, independent from manufacturing details, expanded TPU provides up to about 30% better heat insulation as EVA. This is based on the fact that every particle of the expanded TPU captures air and a sole comprising expanded TPU therefore provides various barriers against thermal exchange leading to better heat insulating properties. Another related advantage of the use of particles comprising expanded TPU for manufacturing a heat insulating sole is that these particles do not have to be arranged in a particular direction or pattern in order to form such thermal barriers. Instead, the particles can essentially be arranged randomly, greatly simplifying the production process.

The extensive temperature-independence of the mechanical properties of expanded TPU and the better heat insulating properties as compared to other materials leads to a new variety of using expanded TPU as sole material. Besides the known fields of indoor and summer sports, new possible applications for example in the field of winter sports or novel shoe concepts such as running shoes for the winter season may be found. Expanded TPU may be used irrespective of winter or summer seasons and independent from regional circumstances. Thus, substantially more versatile shoes may be provided.

Figure 2A:
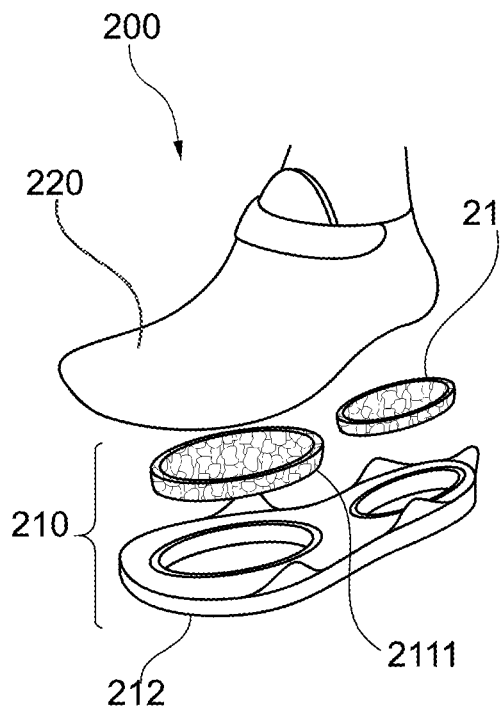
FIG. 2a is an exploded perspective view of a shoe with a first surface region and a second surface region, wherein the first surface region comprises an expanded TPU and wherein the second surface region is free from expanded TPU according to certain embodiments of the present invention.

FIG. 2a shows a principle for certain embodiments of a shoe 200 that comprise an upper 220 and a sole 210. The sole comprises a first surface region 211, wherein the first surface region 211 comprises an expanded TPU.

The first surface region 211 is arranged in the heel region, in particular, in the region below the calcaneus. In addition, the sole 210 comprises a third surface region 2111, which is arranged in the forefoot region. The first surface region 211 and the third surface region 2111, respectively, ensure a particularly good cushioning in the heel region and in the forefoot region. In these regions, in particular in the region underneath the calcaneus, the first contact to ground is to be expected for regular running or walking movements. A particular cushioning is therefore desirable in these regions in order to dampen the impact of the foot hitting the ground. In addition, within these regions, in particular within the forefoot region, often the last contact of the sole with the ground occurs, before the foot is lifted off of the ground. A particularly elastic cushioning by means of the expanded TPU is therefore particularly desirable in these regions such that the energy that is lost due to the impact of the foot on the ground is recovered when the foot lifts off of the ground. Thus, during the impact the foot, and therefore for example also the runner during running, only loses a minimal amount of energy.

In other embodiments, a different arrangement of the surface regions 211, 2111 may be advantageous. In particular, the sole 210 may, in other embodiments, also only comprise a first surface region 211 or more than two surface regions 211, 2111.

In addition, the sole 210 comprises a second surface region 212, which is free from expanded TPU. The second surface region 212 is arranged around the outer rim of the sole as well as between the forefoot region and the calcaneus. Especially for quick lateral movements, the outer rim of the sole experiences large loadings. Moreover, for example by means of supination or overpronation, depending on the wearer of the shoe, a large loading of the sole may occur at the medial or lateral sides of the sole. By means of a second surface region 212 at the outer rim of the sole, an increased stability may be provided in that location. Further, by means of arranging the second surface region 212 between the forefoot region and the calcaneus, the stability of the sole as a whole may be increased. In other embodiments, a different arrangement of a second surface region 212 may be advantageous.

The second surface region 212 comprises EVA. In other embodiments, the second surface region 212, however, may also comprise different materials. In other embodiments, the second surface region comprises expanded PP. Expanded PP is an extremely light weight yet stable material and the combined use of expanded TPU for the first and third surface regions and expanded PP for the second surface region provides for an extremely light yet stable sole and shoe with good cushioning and energy return properties. In some embodiments, the sole has a weight of less than about 100 g and, in a certain embodiments, the complete shoe has a weight of less than about 100 g.

The second surface region 212 surrounds the first surface region 211 and third surface region 2111. This provides the surface regions 211 and 2111 with additional stability. Moreover, by surrounding the surface regions, the extension of the first and third surface regions is limited and hence their cushioning is restricted.

In certain embodiments, the first surface region 211 and the third surface region 2111 may comprise a first and a second expanded TPU, respectively. Thus, different functionalities may be provided for example in the forefoot region and the heel region. For example, the first surface region 211 may comprise a first expanded TPU with a higher strength such that a higher strength is provided in the heel region.

Figure 2C:
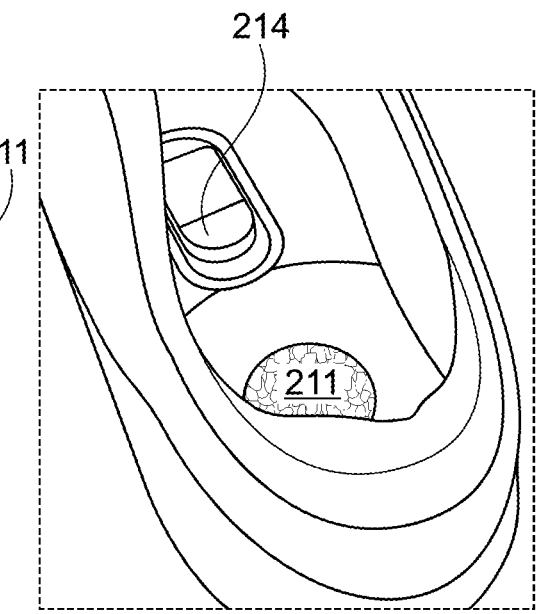
Figure 2B:
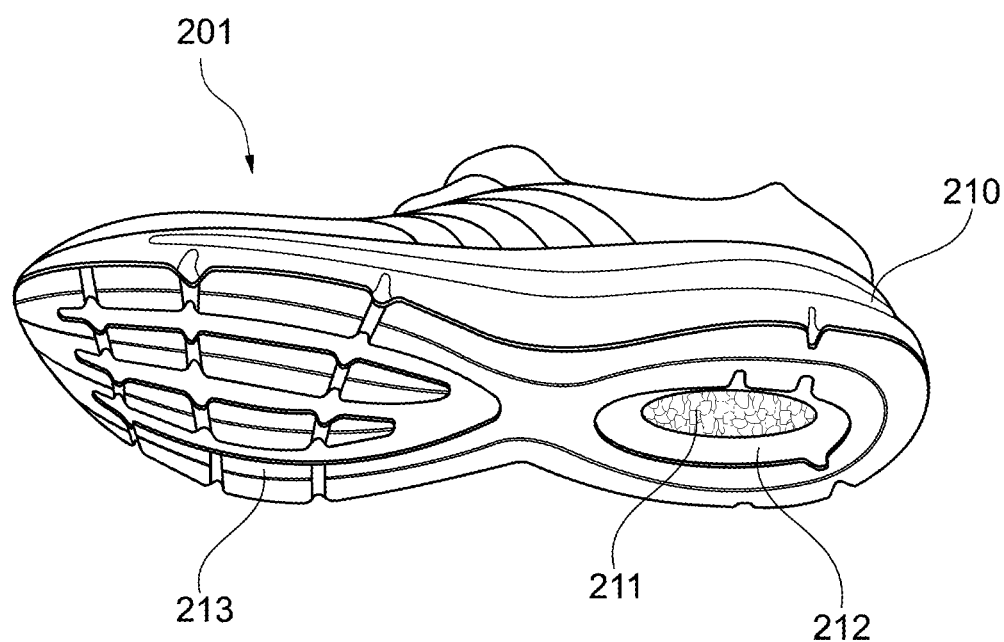

FIG. 2b shows a view of certain embodiments of a shoe 201 that is modified relative to the shoe 200. In particular, in these embodiments, the sole 210 comprises an additional outsole 213. In some embodiments, the outsole 213 provides the sole 210 with an improved slip-resistance and/or abrasion-resistance. In other embodiments, the outsole 213 comprises rubber or TPU. In these embodiments, the outsole may not be arranged area-wide. Thus, the abrasion-resistance and/or slip-resistance of the sole may be optimized, wherein at the same time the weight of the sole is minimized. In some embodiments, the outsole provides the sole with a specific profile. In other embodiments, the shoe does not comprise an outsole or an outsole that is designed differently and that covers the first surface region 211 partly or entirely.

In further embodiments, different and/or additional layers or partial layers may be included with the sole. In addition, as shown in FIG. 2c, the sole 210 comprises a recess 214 for an electronic unit that may provide the user of the shoe 201 with functionalities such as speed measurement or distance measurement. In certain embodiments, all components of the sole 210 are bonded to each other by means of the steaming process for the expanded TPU. As a result, no further gluing means are necessary in order to connect the parts of the sole 210. In addition, the parts may be connected in an automatized and particularly precise manner. Hence, a fast, high-quality and cost-effective production may be provided.

FIG. 2c shows the region of the first surface region 211 that is arranged underneath the calcaneus in top view. By means of the strong cushioning of the first surface region 211, the latter may be in direct contact with the foot. For example, this may be achieved by means of an opening in a sole of the Strobel type that is arranged on top of the first surface region. In FIG. 2c, the opening is arranged circularly. In other embodiments, however, it may for example also be arranged annularly or in a star-shaped manner. It may also be possible that slits are incorporated into the sole of the Strobel type, which also minimize the tensile force of the sole of the Strobel type in the heel region, similar to an opening therein. Thus, a pleasant wearing comfort may be achieved at the foot. In addition, the extensive temperature-independence of the cushioning of the first surface region 211 allows a direct contact with the foot. No substantial change of the cushioning takes place when the first surface region 211 is warmed to the body temperature of the foot. In certain embodiments, midsoles or insoles may be entirely unnecessary.

Figure 3A:
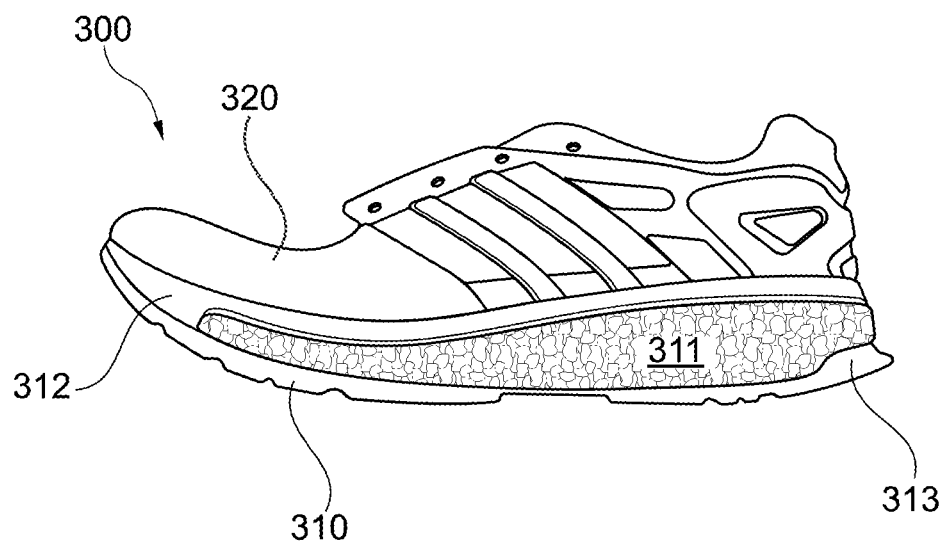
FIG. 3a is a side view of a shoe comprising a sole with a first surface region and a second surface region, wherein the first surface region comprises an expanded TPU and wherein the second surface region is free from expanded TPU according to certain embodiments of the present invention.

FIG. 3a shows further embodiments for a shoe 300. It comprises an upper 320 and a sole 310. The sole 310 comprises a first surface region 311, wherein the first surface region 311 comprises an expanded TPU. In the front toe region, the shoe 300 also comprises a second surface region 312, which is free from expanded TPU. Thus, an increased strength of the sole may be provided in the toe region. This is particularly desirable since, especially in the region of the toe tips, a sole that is too soft and a slipping of the shoe associated therewith may be perceived as displeasing and for example may lead to a formation of blisters on the foot. In the remaining regions of the sole, a particularly large cushioning is achieved by means of a first surface region 311. Therein, the thickness of the first surface region 311 increases from the toe region towards the heel region. Thus, the sole provides an increased strength in the heel region. On the one hand, this increased strength provides the sole with increased stability. On the other hand, the cushioning properties of the first surface region 311 are adapted to the larger forces that occur in the heel region. There, the larger forces lead to a larger loading as compared to the forefoot region. The damping is equally adapted across the entire area of the first surface region 311 via the increased thickness of the first surface region in the heel region.

In addition, the sole 310 optionally comprises an outsole 313. In some embodiments, the outsole comprises rubber or non-expanded TPU. The outsole 313 provides the sole 310 with additional slip-resistance and abrasion-resistance. The outsole 313 may be bonded to the first surface region 311 in a steaming process for the expanded TPU. In some embodiments, an outsole is not included.

When compared to sole 210 of FIG. 2b, it can be seen from FIG. 3a that it is not necessary to arrange the second surface region 312 along the outer rim of the sole. In some embodiments of sole 310, the first surface region 311 comprises a large part of the outer rim of the sole. In these embodiments, the expanded TPU comprises a strength that is able to resist the loading at the outer rim.

Figure 3B:
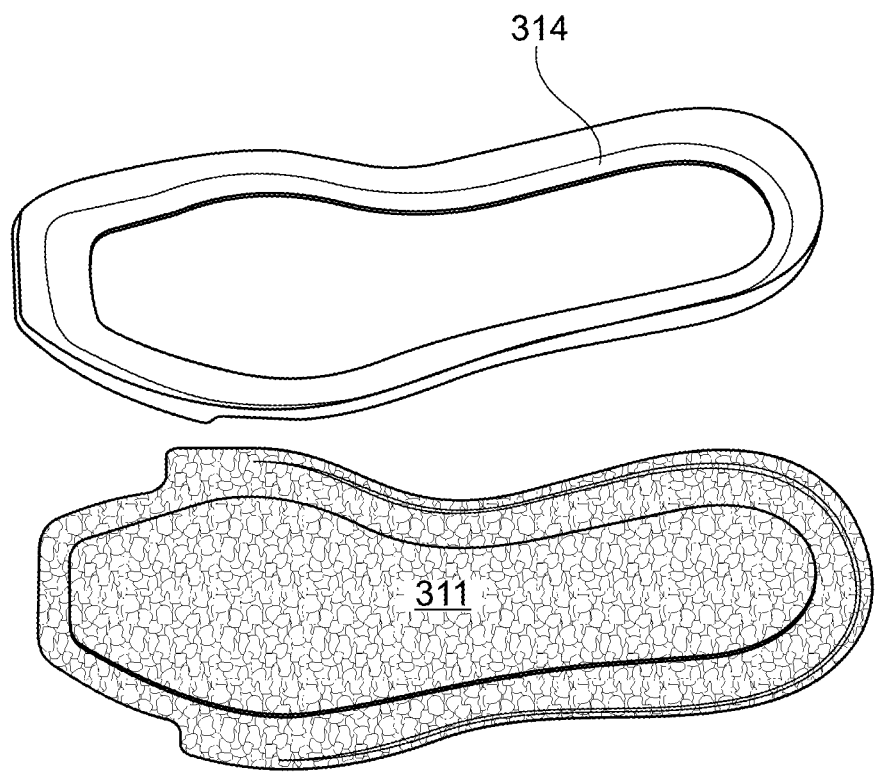

FIG. 3b shows a top view of the first surface region 311. Moreover, the intermediate sole 314 can be seen. The first surface region 311 is arranged such that it may be precisely fitted into the intermediate sole 314. In other embodiments, the intermediate sole 314, which for example comprises EVA, may comprise a different shape, and the first surface region 311 may correspondingly be designed differently. The first surface region 311 and the intermediate sole 314 may be bonded to each other in a steaming process for the expanded TPU. The intermediate sole 314 is in particular arranged in the second surface region 312 to which it provides increased stability. Moreover, the intermediate sole 314 is also arranged along the outer rim of the sole such that the stability is increased in that location. In some embodiments, the intermediate sole is an intermediate element, such as a frame. In certain embodiments, it may comprise non-expanded TPU or essentially consist of non-expanded TPU, which optimizes the bonding to expanded TPU and also improves the bonding to the upper. In other embodiments, the upper is directly sewed to the TPU intermediate element such that no gluing means are required.

Figure 4A:
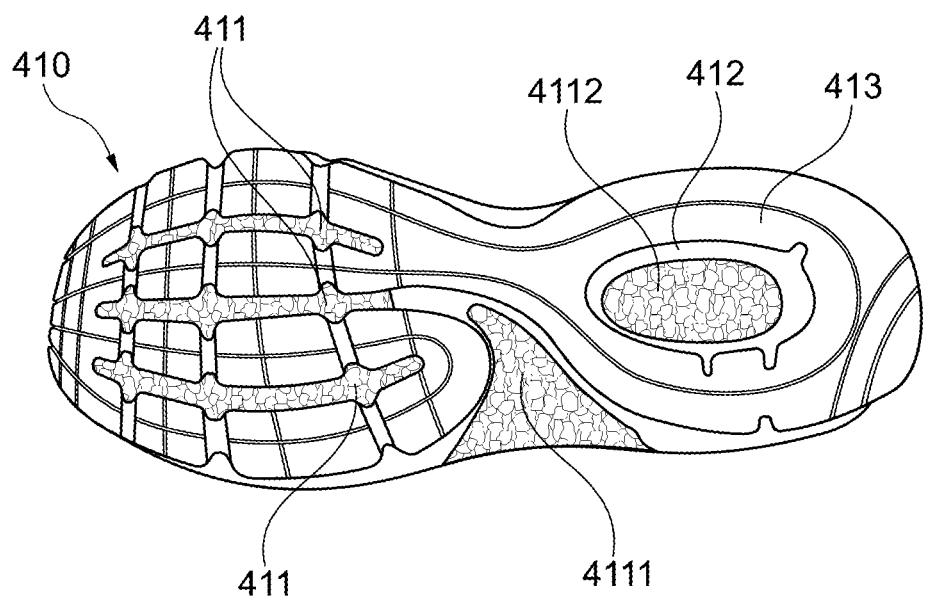
FIG. 4a is a bottom view of a shoe comprising a sole with a first surface region and a second surface region, wherein the first surface region comprises an expanded TPU and wherein the second surface region is free from expanded TPU according to certain embodiments of the present invention.

FIG. 4a shows certain embodiments of a sole 410 for a shoe 400. It comprises a first surface region 411, wherein the first surface region 411 comprises an expanded TPU, and a second surface region 412, which is free from expanded TPU. Moreover, the sole 410 optionally comprises an outsole 413. Further, the sole 410 optionally comprises a recess for an electronic unit. In addition, the sole 410 optionally comprises a third surface region 4111 and a fourth surface region 4112, which comprise expanded TPU.

The first surface region 411 is located in the forefoot region. The third surface region 4111 is located medially as well as laterally between the forefoot region and the heel region. Moreover, the fourth surface region 4112 is located in the heel region. Thus, a particularly high flexibility of the sole 410 and thus a pleasant wearing comfort is provided in the forefoot region, midfoot region, and the heel region. In the remaining regions of the sole 410, the second surface region 412 is arranged. In particular, the arrangement along the outer rim of the sole 410 in the forefoot and heel regions increases the stability of the sole to suitable extent. The second surface region 412 comprises EVA but may also comprise different and/or further materials.

In certain embodiments, the outsole 413 does not entirely cover the first surface region 411. The outsole 413 may provide the sole with a specific profile. For example, in some embodiments, the first surface region 411 is provided with a continuous outsole. In other embodiments, the shoe does not comprise an outsole 413 or a differently designed outsole 413. In particular, for indoor shoes, the expanded TPU already provides a sufficient slip-resistance such that this aspect does not require an additional outsole 413.

In order to increase the abrasion-resistance and/or the slip-resistance of the surface of the first surface region, it may be modified, in certain embodiments, by means of suitable surface treatment instead of providing it with an outsole. The surface of a surface region and/or a partial region of expanded TPU may be partially melted and/or embossed and/or treated by means of a laser. Moreover, the surface may be manufactured in a correspondingly designed shape that provides an increased abrasion-resistance and/or slip-resistance. Further, different materials, for example particles of different materials, which increase the abrasion-resistance, may be included in the manufacturing process in regions close to the surface of the expanded TPU.

Figure 4B:
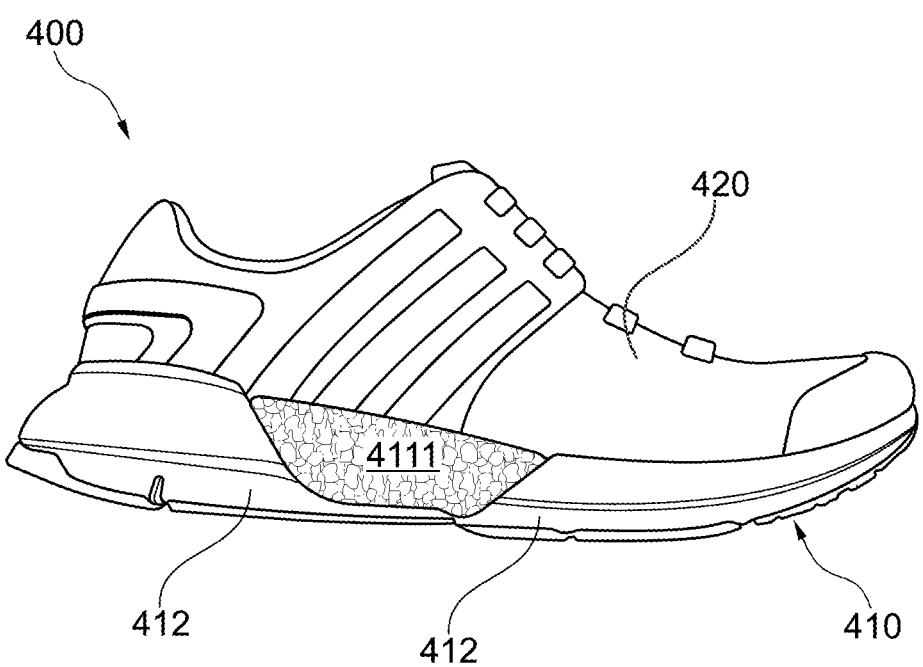

FIG. 4b shows a sole 410 on an upper 420. FIG. 4b illustrates how the third surface region 4111 and the second surface region 412 are located along the outer rim of the sole. In the forefoot and heel regions, the second surface region 412 is arranged along the outer rim where it increases the stability of the sole. In the region that lies therebetween, an increased flexibility of the sole is desirable in order to support the natural rolling of the foot. Correspondingly, the second surface region 412 is not arranged there. Instead, a surface region 4111, which comprises expanded TPU, is arranged there. Thus, an increased flexibility may be provided there.

In addition, the thickness of the surface region 4111 increases from the forefoot region towards the heel region. Thus, the functionality of the surface region 411 may be gradually adapted to the different requirements in the specific regions.

In some embodiments, the surface regions 411, 4111, and 4112 comprise only one expanded TPU. In other embodiments, at least the first surface region 411 and the third surface region 4111 comprise a first and a second expanded TPU, respectively.

Figure 5A:
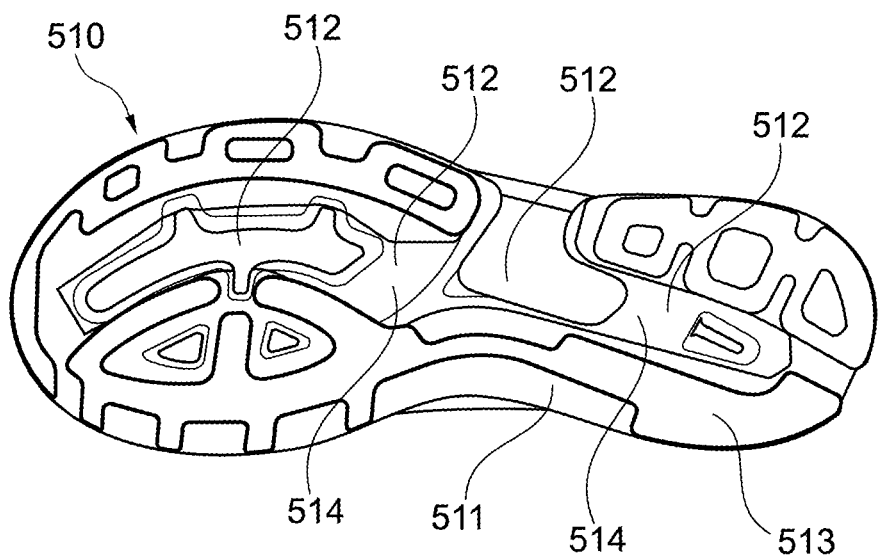
FIG. 5a is a bottom view of a sole for a shoe, in particular a sports shoe, comprising a first surface region and a second surface region, wherein the first surface region comprises an expanded TPU and wherein the second surface region is free from expanded TPU according to certain embodiments of the present invention.

FIG. 5a shows further embodiments of a sole 510. It comprises a first surface region 511, wherein the first surface region 511 comprises an expanded TPU, as well as a second surface region 512, which is free from expanded TPU. The first surface region 511 is arranged along the outer rim of the sole, wherein the lateral outer rim between heel region and forefoot region is not covered by the first surface region 511. The first surface region 511 is optionally strengthened with an outsole 513, which increases the slip-resistance and/or abrasion-resistance of the sole 510. The outsole 513 may only cover a part of the first surface region 511. In some embodiments, the outsole 513 comprises rubber or TPU. Optionally, the sole 510 also comprises a partial region 514, which, in some embodiments, provides the sole 510 with increased stability. In some embodiments, the partial region 514 comprises EVA. However, the partial region 514 is not included in all embodiments. By means of the increased strength of the expanded TPU, in some embodiments, the partial region 514 may not be necessary. In particular, the sole may thus be manufactured in a material-saving manner and, thus, a lighter sole may be provided. At the same time, the large elasticity of the TPU ensures that the energy is optimally returned to the runner/walker when the sole springs back.

Compared to many other materials, for example EVA, a first surface region 511 may be more precisely manufactured by means of expanded TPU since this material only slightly expands during the steaming process. Hence, smaller structures may be manufactured, which in total allows a functionality that is adjusted in an improved manner. Further, this enables a minimalistic design such that a large amount of material may be saved since only small amounts of expanded TPU that are reduced to the required minimum are used. Thus, as shown in some embodiments of sole 510 (without the optional partial region 514), a large second surface region 512 of the sole may remain free. In particular, the first surface region 511 may comprise recesses, such as large-area recesses.

In certain embodiments, the first surface region 511 may also serve to modify the functionality of the partial region 514. In these embodiments, the first surface region 511 is not located in the entire region of the partial region 514. Thus, the functionality of the partial region 514 is changed only locally. For example, the cushioning is locally increased. From an opposite point of view, the partial region 514 may increase the stability of the first surface region 511, which comprises expanded TPU. According to some embodiments, the sole 510 comprises a sole plate. The latter may provide the sole with increased stability. The sole plate may connect the sole to the upper. The first surface region 511 and the optional partial region 514 may be arranged underneath the sole plate.

Figure 5B:
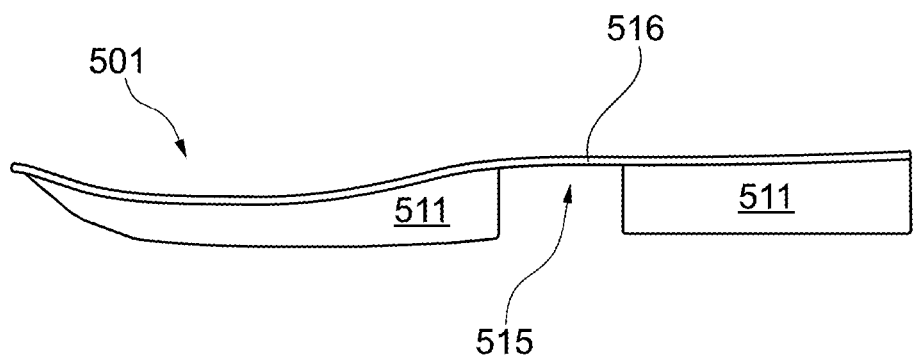

FIG. 5b shows slightly modified embodiments of sole 501, which is manufactured on a sole plate 516, similar to sole 510. The sole plate 516 ensures the basic stability of the sole and serves to distribute the forces that act on the sole. Moreover, it may serve as a carrier for a multitude of functional elements that are bonded to each other with the steaming process for the TPU. The thickness of the first surface region 511 increases from the toe region towards the heel region. Thus, the strength of the sole is gradually adjusted to the expected forces in the respective regions.

Moreover, FIG. 5b shows that the first surface region 511 may also be designed such that the region 515 between forefoot region and heel region is free from the first surface region 511. Thus, the flexibility of the sole may be optimized to support the natural rolling of the foot. Depending on the foot type of the wearer of the shoe, the first surface region 511 may also comprise a medial or lateral outer rim of the sole such that the flexibility of the sole is adjusted to a supination or overpronation.

Figure 20A:
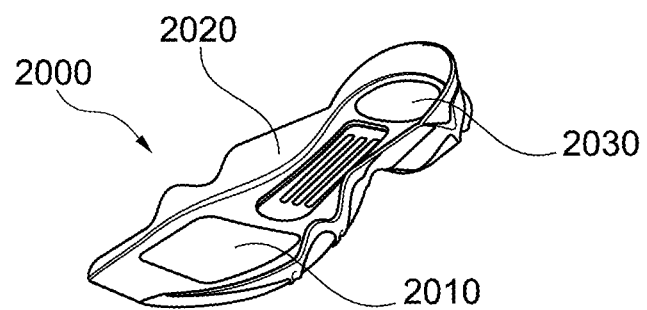
FIG. 20a is a top perspective view of a sole, in particular a sole for a heat insulating shoe such as a winter shoe or a hiking shoe, comprising a first surface region comprising expanded TPU arranged in the forefoot region of the sole, and a second surface region, as well as a partial region comprising a heel insert, comprising a highly viscose EVA based compound according to certain embodiments of the present invention.
Figure 20B:
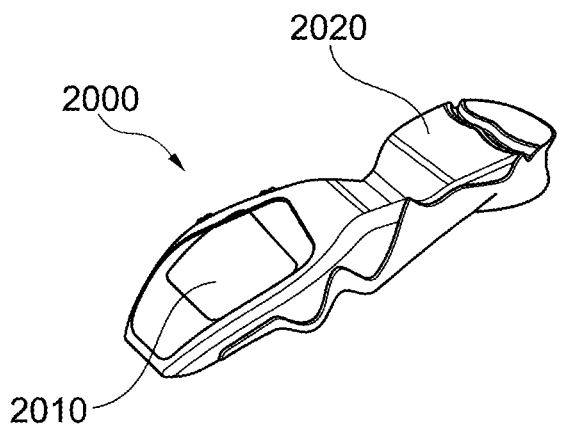
Figure 20C:
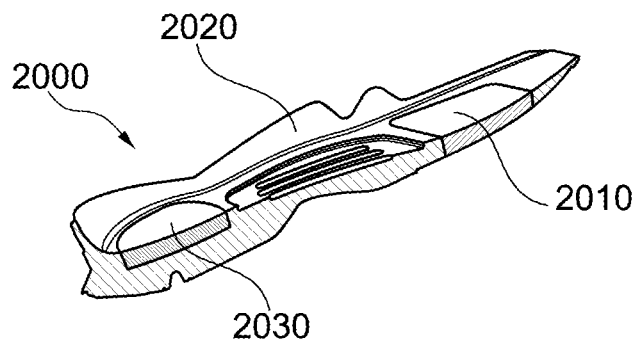

FIGS. 20a-c show other embodiments of a sole 2000 for a shoe, in particular a heat insulating shoe, for example a winter shoe or a hiking shoe. The sole 2000 is also particularly well suited for a shoe used in uneven terrain. The sole 2000 comprises a first surface region 2010 comprising expanded TPU arranged in the forefoot region, surrounded by a second surface region 2020. In other embodiments, the second surface region 2020 is free from TPU. The sole 2000 further comprises a partial region 2030 arranged in the heel region. In some embodiments, the partial region 2030 comprises a heel insert comprising an elastomer compound, for example a highly viscose EVA based compound.

Figure 22:
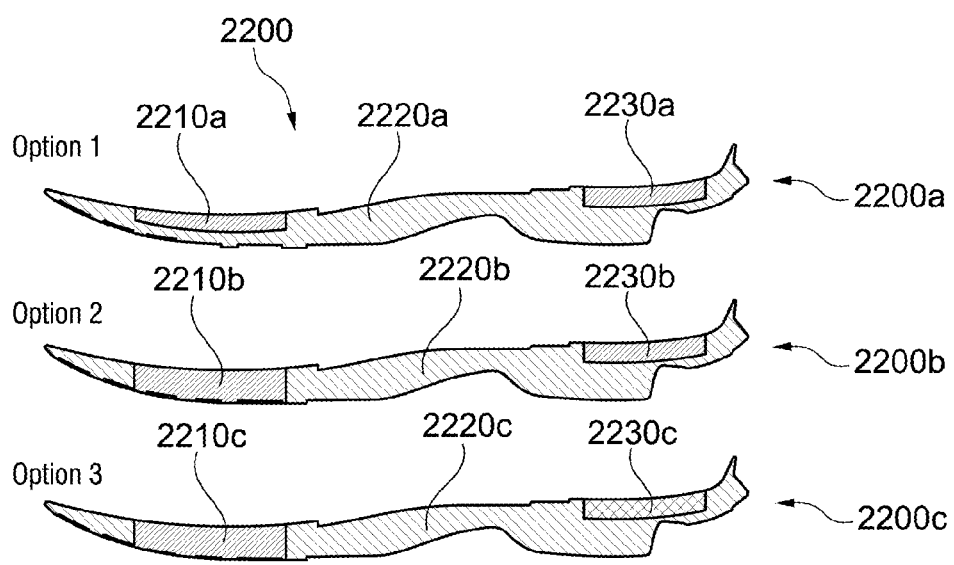
FIG. 22 are multiple side views of a sole for a shoe, in particular a winter shoe or a hiking shoe, according to certain embodiments of the present invention.

FIG. 22 shows further embodiments 2200 of soles for the use in shoes, in particular outdoor shoes. According to certain embodiments, a sole 2200*a* includes the profile of a sole comprising a surface region 2220*a*, which may be free from TPU, and a first partial region 2210*a* arranged in the forefoot region, as well as a second partial region 2230*a* arranged in the heel region. In some embodiments, the first and second partial regions 2210*a* and 2230*a* comprise expanded TPU.

In some embodiments, a sole 2200*b* includes the profile of a sole comprising a first surface region 2210*b* and a second surface region 2220*b*, wherein the first surface region 2210*b* is arranged in the forefoot region and comprises expanded TPU, and wherein the second surface region 2220*b* may be free from TPU. The sole further comprises a partial region 2230*b* arranged in the heel region, which may also comprise expanded TPU. In other embodiments, a sole 2200*c* of a sole includes a first surface region 2210*c* arranged in the forefoot region and comprising expanded TPU as well as a second surface region 2220*c* free from TPU. The sole 2200*c* further comprises a partial region 2230*c* arranged in the heel region of the sole comprising an elastomer compound, for example a highly viscose EVA based compound. In further preferred embodiments, the surface regions 2220*a*, 2220*b*, and 2220*c* surround the other surface regions and/or partial regions of the sole.

The use of expanded TPU for a surface region and/or a partial region arranged in the forefoot region of the foot allows for a high amount of energy return to the wearer of the shoe, thus improving performance. If used as a surface region, the expanded TPU can at the same time provide a better feel of the ground and, combined with the good heat insulating properties of the expanded TPU as shown in diagram 2100 of FIG. 21, increase the overall comfort of the shoe, in particular a winter shoe or a hiking shoe. The use of an elastomer compound, for example a highly viscose EVA based compound, as a heel insert in certain embodiments, helps to absorb the shock energy delivered through the wearer's foot when the foot impacts the ground, thereby helping to prevent injuries and overstraining of the wearer's musculoskeletal system. It is to be understood that other materials that provide good absorption of the shock energy could also be used for the heel insert instead of or in combination with an elastomer compound.

Furthermore, by providing the heel insert as a partial region rather than a surface region and surrounding it with a surface region comprising a more stable and resistant material, the wearer's foot is furthermore well protected from dangerous impediments like stones or glass or other sharp objects when first impacting the ground with the wearer's full weight on the heel during a step, e.g. during running. This helps to further avoid injuries of the wearer's foot, in particular during outdoor use. The use of a material free of TPU, such as EVA or PP or expanded PP, for a surface region surrounding the other surface/partial regions of the sole made from expanded TPU and/or an elastomer compound, for example a highly viscose EVA based compound, further helps to improve the stability of the sole, which is especially important for winter or hiking shoes. It can also help to reduce the weight of the sole, in particular if expanded PP is used.

Figure 6:
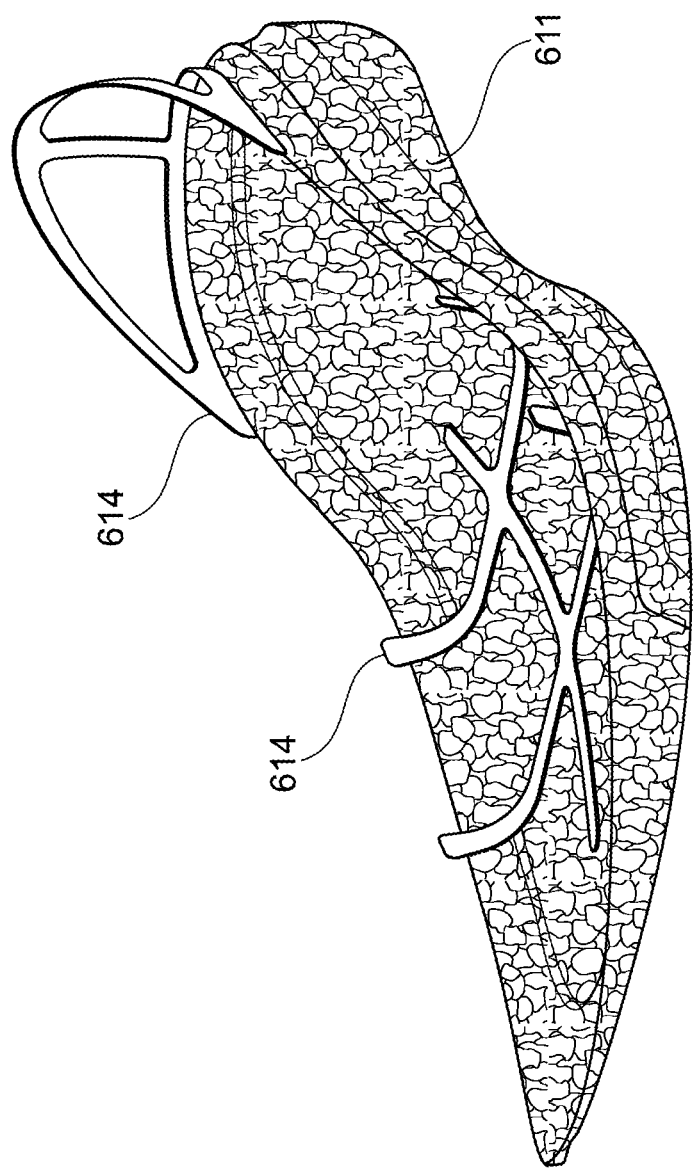
FIG. 6 is a perspective view of an example for an expanded TPU with a functional element, wherein the expanded TPU surrounds at least two opposing surface areas of the element according to certain embodiments of the present invention.

FIG. 6 shows an example for an expanded TPU 611. The expanded TPU 611 may form a surface region or a partial region. A functional element 614, for example a frame element, is integrated into the expanded TPU 611. A frame element may serve for stabilizing and/or optimizing the correct fit of the shoe. In these embodiments, the functional element 614 is bonded to the expanded TPU 611 in a steaming process for the expanded TPU 611. A partial region of the functional element 614 is entirely surrounded by the expanded TPU 611, i.e. embedded therein. Other partial regions of the functional element 614 protrude from the expanded TPU 611.

In some embodiments, a partial region for a sole is provided that comprises expanded TPU, wherein a partial element that is free from TPU is integrated into the expanded TPU. In some embodiments, the functional element is integrated such that it is surrounded by the expanded TPU proximate at least two opposing surface areas. In other embodiments, the functional element is entirely surrounded by the expanded TPU. In further embodiments, the functional element is arranged at a surface of the expanded TPU. The functional element may be bonded to the expanded TPU in a steaming process for the expanded TPU.

In other embodiments, the functional element comprises a reinforcement material. The reinforcement material may be a fiber-like reinforcement material or a textile reinforcement material, such as a textile reinforcement material. The textile reinforcement material may be woven or non-woven, layered or knitted. The reinforcement material can further be non-stretchable; it may be tear resistant and comprise strong fibers or a strong textile material. The use of a textile reinforcement instead of e.g. a frame element helps to stabilize the sole while at the same time saving weight in order to provide a lighter shoe. The textile reinforcement material may be attached to at least a part of the one or more surface and/or partial regions of the sole. In an optional aspect it may also be integrated and/or embedded in the one or more surface/partial regions. In a preferred aspect, the textile reinforcement material is bonded to the expanded TPU in a steaming process for the expanded TPU.

The described embodiments of an expanded TPU with an integrated functional element or a reinforcement material may also comprise a second or several further expanded TPU. For example, the functional element and/or reinforcement material may be surrounded by a first and a second expanded TPU. The first and the second expanded TPU may border on a first and a second surface area of the element, respectively. Moreover, it may comprise further functional elements. As a result, a large degree of design freedom is obtained. Almost arbitrary functional elements may be connected with the advantageous properties of expanded TPU. Moreover, a multitude of different design possibilities is at hand. By bonding the elements in a steaming process for one or more TPU, in addition, a large degree of automation may be achieved. Moreover, a labor-saving, fast, and waste-avoiding manufacturing process is possible.

Figure 7A:
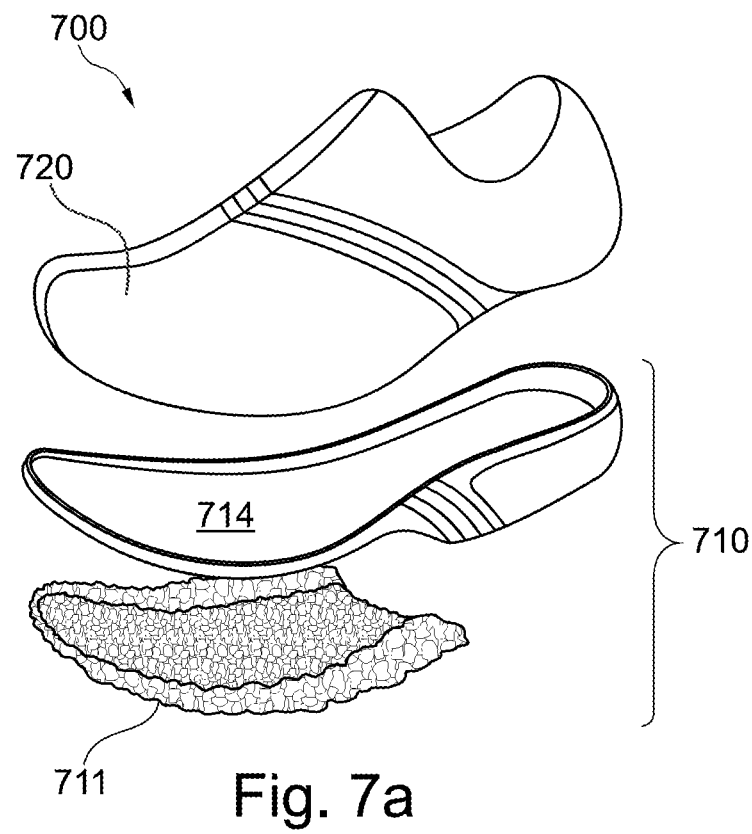
FIG. 7a is an exploded perspective view of a shoe comprising a sole with a first surface region and a second surface region, wherein the first surface region comprises an expanded TPU and wherein the second surface region is free from expanded TPU according to certain embodiments of the present invention.
Figure 7B:
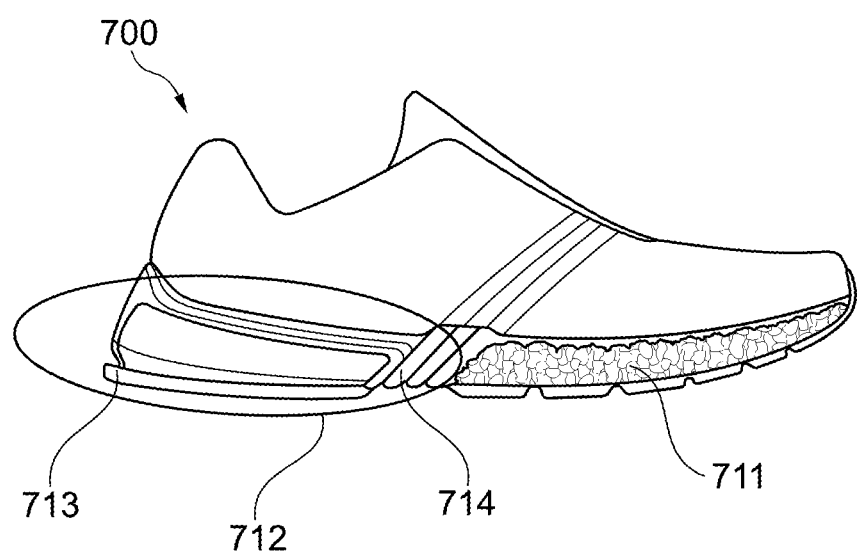

FIGS. 7*a-b* show further embodiments for a shoe 700 with an upper 720 and a sole 710. The sole 710 comprises a first surface region 711, which comprises an expanded TPU. In addition, the sole 710 comprises a second surface region 712, which is free from expanded TPU. The sole comprises an intermediate sole 714. Optionally, the sole comprises an outsole 713.

The first surface region 711 is located in the forefoot region. Thus, a particularly large cushioning may be provided, there. The second surface region 712, which is free from expanded TPU, is arranged in the heel region. The second surface region 712 may comprise EVA and/or non-expanded TPU and/or further materials. Thus, an increased strength of the sole may be provided in the heel region. Hence, the sole may be adapted to the loadings that occur for specific applications. The shoe 700, for example, is adapted to cross country running. For that purpose, an increased strength is required in the heel region in order to counteract a twisting of the foot. On the other hand, particularly in the forefoot region, an increased cushioning is desirable. This is provided by means of the first surface region 711, which comprises an expanded TPU. The large elasticity of the expanded TPU additionally ensures that an optimized energy transmission takes place. When lifting up the toes from the ground and when the first surface region 711 springs back in that instance, the energy that is used for compressing the sole is returned to the runner, with only minimal losses.

The first surface region 711 is moreover raised at the outer rim of the sole. There, it comprises an increased thickness. Alternatively or additionally, the expanded TPU of the first surface region comprises an increased thickness at the outer rim of the sole. That way, an increased strength may be provided within the first surface region 711 at the outer rim of the sole. This design additionally counteracts a twisting of the foot. Moreover, the thickness of the first surface region 711 increases from the toe region towards the heel region and the midfoot region, respectively. Thus, the strength of the sole is adapted to the loadings that typically occur. By means of the expanded TPU, a particularly gradual adaptation may be achieved. In further embodiments, the first surface region 711 and/or the second surface region 712 may also be arranged differently. For example, it may be advantageous in some embodiments to arrange the first surface region 711 in the heel region and the second surface region 712 in the forefoot region. This could be for example the case for basketball shoes for which an increased strength in the forefoot region may be desirable.

In some embodiments, the second surface region 712 of the shoe 700 is mainly formed by a part of the intermediate sole 714. The intermediate sole 714 is essentially arranged above the expanded TPU of the first surface region 711, and its shape is adapted to the expanded TPU. In these embodiments, the intermediate sole 714 is bonded to the expanded TPU in a steaming process for the expanded TPU. The intermediate sole 714 may, in other embodiments, also be adapted such that it is arranged underneath the expanded TPU of the first surface region 711. In other embodiments, the intermediate sole 714 is arranged next to the expanded TPU of the first surface region 711 or only partially above or only partially below the latter.

Moreover, the shoe 700 optionally comprises an outsole 713, which may only partially cover the first surface region 711. The outsole 713 is also arranged in the second surface region 712. This region of the outsole may be connected to the outsole on the first surface region 711 or it may be arranged as a separate outsole.

Figure 8A:
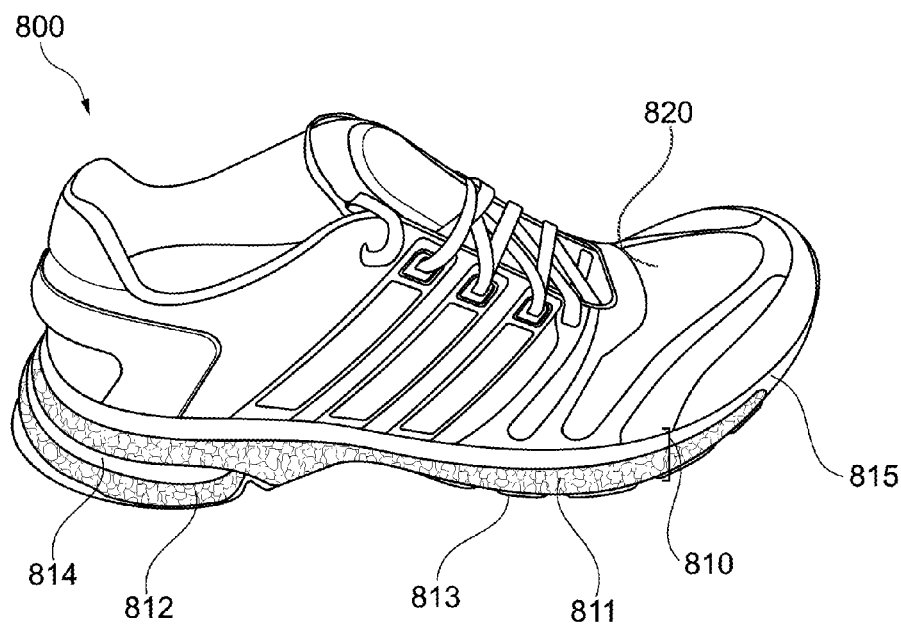
FIG. 8a is a perspective view of a shoe comprising a sole with a first partial region which comprises a first expanded TPU and a second partial region, which comprises a second expanded TPU according to certain embodiments of the present invention.
Figure 8B:
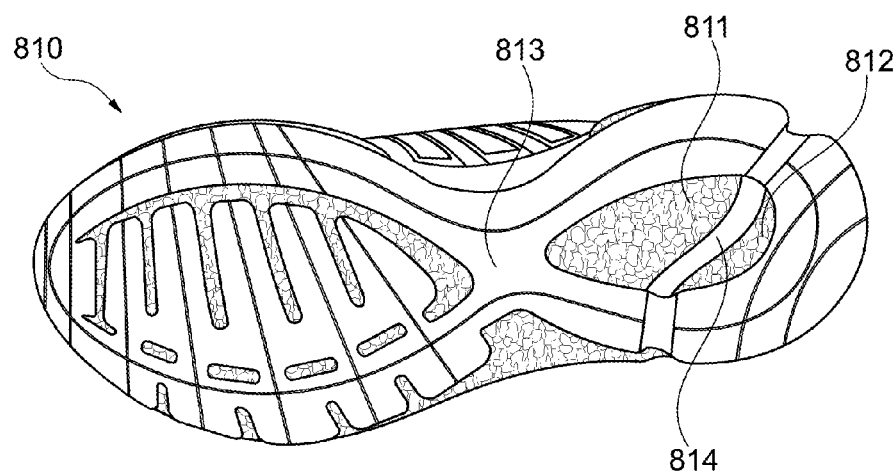

FIGS. 8a and 8b show a shoe 800 with an upper 820 and a sole 810 with a first partial region 811, which comprises a first expanded TPU, and a second partial region 812, which comprises a second expanded TPU. The first expanded TPU and the second expanded TPU are manufactured in a different steaming process. To this end, at least one parameter, for example density, temperature, pressure, duration of the expansion, steam saturation, cooling speed, curing duration, curing temperature etc., is modified in the manufacturing process of the second expanded TPU compared to the first expanded TPU. The first and the second expanded TPU may, in certain embodiments, be simultaneously manufactured in the same mold, wherein the at least one different parameter is applied locally. In other embodiments, the first and the second expanded TPU are manufactured in the same mold subsequently. In other embodiments, the first and the second TPU may be manufactured from different base materials. Moreover, the first and the second TPU may also be manufactured separately in different molds.

In some embodiments, the first and the second expanded TPU comprise different properties. The different properties may be of a functional nature. For example, the strength of the second expanded TPU may be increased as compared to the strength of the first TPU. This may for example be achieved by applying a larger pressure when manufacturing the second expanded TPU. Thus, the second expanded TPU may comprise a higher density and a higher strength. Thus, the properties of an expanded TPU may be varied gradually and they may be combined by means of a first partial region and a second partial region. The different properties may also be of optical nature, for example they may provide different colors.

The first partial region 811 of the sole 810 extends across a larger surface region of the sole 810. However, the sole 810 also comprises a surface region 815 at which the first partial region 811 is not located. In some embodiments, the sole 810 does not comprise any material at all in the surface region 815. In other embodiments, the surface region comprises a material that is free from expanded TPU. In yet other embodiments, the sole 810 does not comprise such a surface region 815.

The second partial region 812 is located in the heel region of the sole. The first partial region 811 comprises corresponding recesses for this purpose. Thus, the thickness of the sole 810 and thus the strength of the sole 810 may be increased by means of a second partial region 812 in the heel region. This is particularly desirable for running shoes such as the shoe 800 since, during running, usually particularly large forces occur in the heel region. In these embodiments, the second expanded TPU of the second partial region 812 is designed such that it provides a larger strength than the first expanded TPU of the first partial region 811. Thus, the strength is particularly increased in the heel region. Moreover, the desired strength may thus be obtained by means of a smaller amount of material. Thus, the sole is lighter and more cost-effective. The second partial region may be bonded to the first partial region in a steaming process for the first and/or the second expanded TPU. However, also other bonding methods may be used. In some embodiments, a first expanded TPU is up to about 25% softer than a second expanded TPU. In other embodiments, a first expanded TPU is about 25% to 100% softer than a second expanded TPU. In yet other embodiments, the hardness of a first expanded TPU varies with respect to a second expanded TPU in the range of about ±150%.

In some embodiments of the sole 810, an additional functional element 814 is arranged between the first partial region 811 and the second partial region 812. In some embodiments, it provides a cushioning of shear forces. In other embodiments, the element 814 may also increase the strength of the sole and/or only serve for optical purposes. The sole 810 may additionally comprise an optional outsole 813 of rubber or TPU. In other embodiments, the sole 810 does not comprise an outsole or comprises a different outsole.

In other embodiments of the sole 810, the second partial region 812 comprises an EVA. Thus, an increased stability may be provided in the heel region of the sole 810. Further, the second partial region 812 may be free from expanded TPU.

Figure 9A:
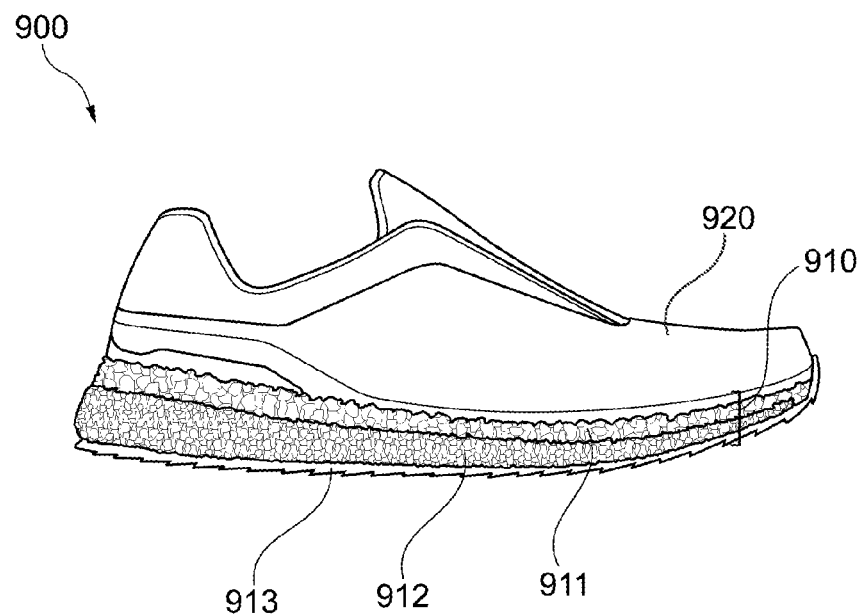
FIG. 9a is a side view a shoe comprising a sole with a first partial region which comprises a first expanded TPU and a second partial region which comprises a second expanded TPU according to certain embodiments of the present invention.
Figure 9B:
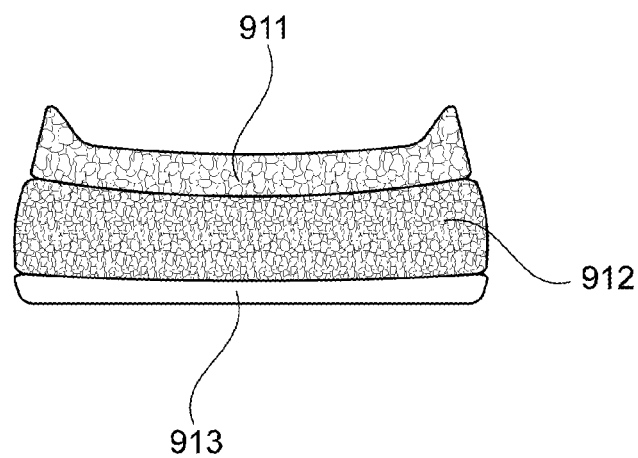

FIGS. 9a-b show further embodiments of a shoe 900 with an upper 920 and a sole 910 with a first partial region 911, which comprises a first expanded TPU, and a second partial region 912, which comprises a second expanded TPU. The first expanded TPU and the second expanded TPU are manufactured from different base materials. The base materials for the first and the second TPU differ from each other by means of at least one parameter, for example degree of addition of a blowing agent, addition of other materials, and/or particle size of the material. The first partial region 911 is arranged above the second partial region 912. The first partial region 911 comprises a first sole layer and the second partial region 912 comprises a second sole layer. The first sole layer of the first partial region 911, and second sole layer of the second partial region 912, respectively, extend essentially across the entire sole area. In other embodiments, a surface region of the sole 910 may be free from expanded TPU.

In some embodiments, the strength of the second partial region 912 is increased as compared to the first partial region 911. Thus, in the contact region with the foot, a large cushioning and a pleasant wearing comfort may be achieved. By means of the increased strength in the contact area with the ground, a good stability of the shoe 900 is achieved. In some embodiments, the partial regions 911, 912 differ in color.

In both partial regions 911, 912, the thickness increases from the toe region towards the heel region of the sole 910. In addition, the thickness also increases toward the outer rim of the sole 910. Thus, at the outer rims of the sole 910 and in the heel region, an increased strength is provided. In other embodiments, the thickness of the first and/or the second partial region may be constant or varied in a different manner. The sole 910 comprises an optional outsole 913 in the form of a continuous sole layer. The outsole 913 may increase the slip-resistance and/or abrasion-resistance of the sole 910 and/or its water-repelling properties. In other embodiments, the outsole 913 is not arranged area-wide in order to minimize the weight of the sole 910. The outsole 913 may be bonded to the second partial region 912 in a steaming process for the second expanded TPU. In further embodiments, no outsole 913 is provided.

In other embodiments, the first expanded TPU and the second expanded TPU are manufactured with a different steaming process. In further embodiments, the sole 910, in addition, may comprise further partial regions that comprise the first and/or the second and/or further expanded TPU.

In certain embodiments, the outsole 913 may constitute a third partial region, which comprises an expanded TPU. In particular, the outsole 913 may comprise a particularly abrasion-resistive TPU. Thus, the outsole may be manufactured and/or bonded in the same process as the partial regions 911 and 912. The partial regions may be individually arranged and may comprise different properties depending on the requirements of the shoe and its sole, respectively. They may vary in the base material used, in their properties (which are determined by the manufacturing process), as well as in their geometry. In other embodiments, the outsole 913 essentially consists of expanded TPU.

In further embodiments, the sole 910, alternatively or additionally to outsole 913, comprises a third partial region that comprises a third sole layer, which is free from expanded TPU. Thus, the sole 910 may be provided with additional stability. In these embodiments, the third sole layer is arranged between the first and the second sole layer of the first and the second partial regions 911, 912. That way, the first and the second expanded TPU may be separated easily such that for example an improved manufacturing of the first and the second expanded TPU in a steaming process may be achieved.

In other embodiments, the sole 910 is bonded to the upper 920 in a steaming process for the first partial region 911. No additional fixing means are required. In these embodiments, the sole 910 may also be attached to the upper 920 by means of other fixing means. The upper may comprise knit materials, woven materials, non-woven materials, materials comprising layered fibers and/or fabrics, and/or elastomer compounds. The upper may be provided as one integral piece or it can comprise several elements. The upper can further comprise a frame structure, one or more heel counters, one or more closure systems and essentially any other element.

Figure 10A:
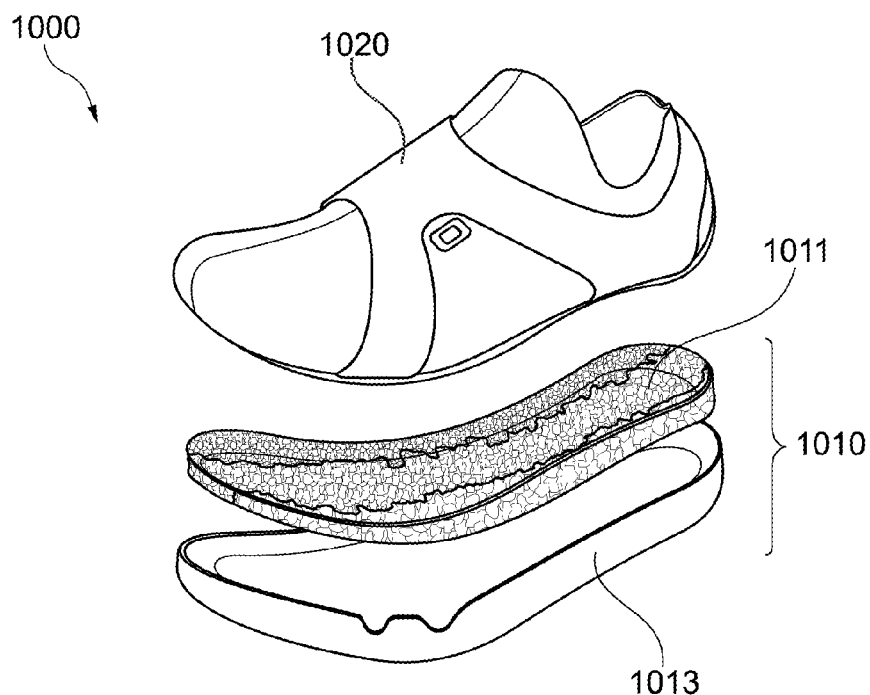
FIG. 10a is an exploded perspective view of a shoe comprising a sole with a first partial region which comprises a first expanded TPU and a second partial region which comprises a second expanded TPU according to certain embodiments of the present invention.
Figure 10B:
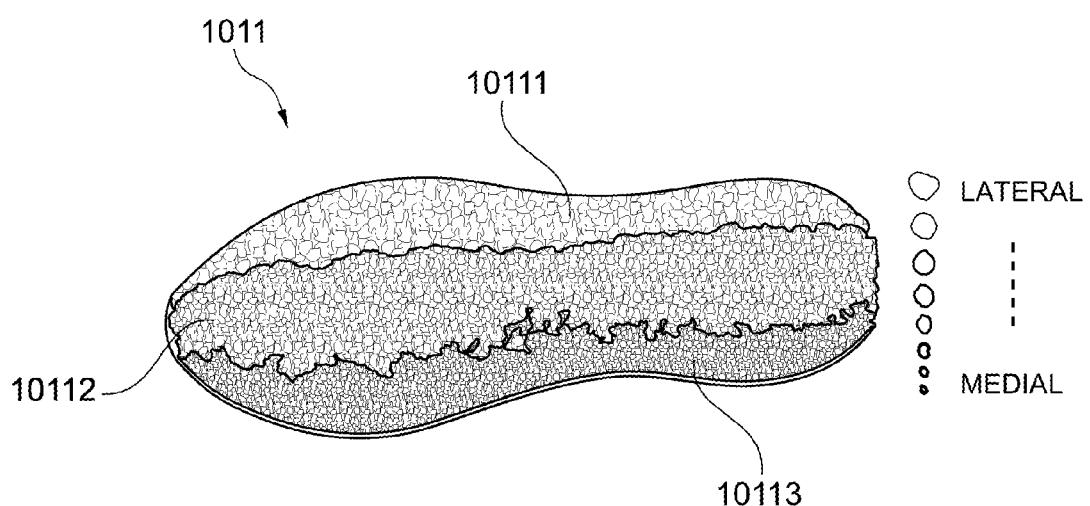

FIGS. 10*a-b* show further embodiments for a shoe 1000 comprising an upper 1020, and a sole 1010 comprising a first partial region 10111, which comprises a first expanded TPU, a second partial region 10112, which comprises a second expanded TPU, and an optional third partial region 10113, which comprises a third expanded TPU.

The first, second and third expanded TPU is each made from a different base material. The expanded TPU differ in their particle sizes. Therein, the strength of the TPU is, by trend, higher, for smaller particle sizes. In other embodiments, the different particle sizes may also be achieved by means of using a different steaming process.

In certain embodiments, the partial regions are bonded to each other in a steaming process for the first and/or second and/or third TPU. For example, the first, second and third TPU may be manufactured at the same time. Thus, in one manufacturing step different partial regions of a sole with different advantageous material properties may be manufactured and bonded. As a result, a locally adapted sole may be manufactured quickly, precisely and cost-effectively.

The partial regions 10111, 10112, 10113 are parts of the sole element 1011. Optionally, the sole 1010 in addition comprises an outsole 1013 that surrounds the sole element 1011 from below as well as laterally. In other embodiments, the outsole may be arranged differently. The outsole 1013 may be directly bonded to the upper 1020. The outsole may be a housing made of TPU, EVA, rubber and/or foil.

The partial regions 10111, 10112, 10113 are arranged longitudinally along the sole, wherein the first partial region 10111 may be arranged laterally, the third partial region 10113 may be arranged medially and the second partial region 10112 may be arranged therebetween. The strength increases from the first partial region 10111 via the second partial region 10112 towards the third partial region 10113. Thus, for example the strength of the sole 1010 may be adapted to an overpronation. In other embodiments, the strength of the sole may also be adapted to a supination. Then, the strength of the sole 1010 increases from medially to laterally. However, a variety of further embodiments of the first partial region 10111, the second partial region 10112, and the optional third partial region 10113 may be provided. Moreover, alternatively or additionally, further partial regions, which comprise a first and/or a second and/or further expanded TPU, may be provided. Moreover, also the thickness of the partial regions may vary. As a further variation, the partial regions may also be arranged transversely, diagonally or in zones as well as in an overlapping manner. As yet other embodiments, the expanded TPU materials used for the one or more partial regions may change in a direction from front to back or in a combined direction from front to back and from the medial to the lateral side.

Figure 11A:
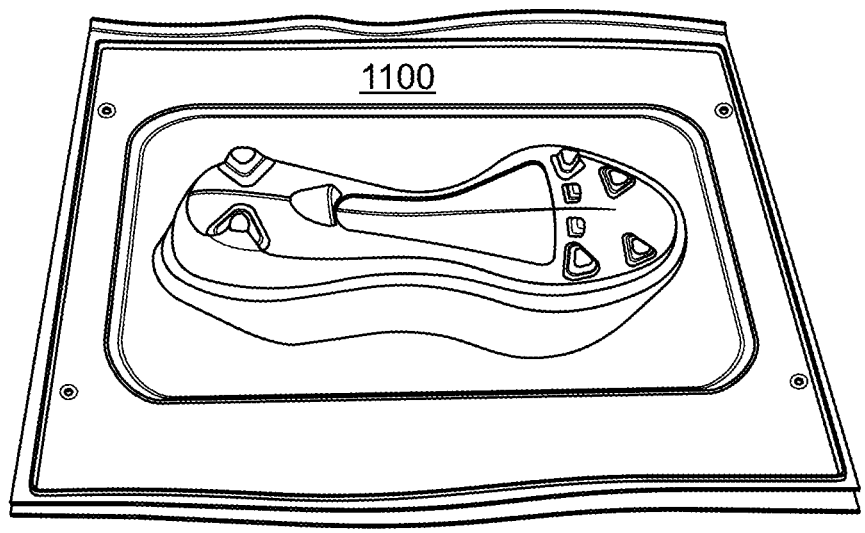
FIG. 11a is a perspective view of a foil which may at least partially surround at least a surface region and/or at least a partial region of expanded TPU according to certain embodiments of the present invention.

FIG. 11*a* shows a plastic foil 1100 with which a partial region and/or a surface region made of expanded TPU may be surrounded at least partially. Thus, the expanded TPU may be provided with a specific texture, haptics and/or color. Moreover, the lifetime of the surface region and/or partial region may be increased. The plastic foil 1100 for example prevents water or dirt from acting on the expanded TPU such that it is attacked to a smaller extent. In addition, the plastic foil 1100 may also influence the functionality of the expanded TPU. For example, the foil 1100 may comprise a larger tensile strength than the expanded TPU. Thus, the foil may limit the expansion of the expanded TPU when springing back after shocks. Moreover, the foil 1100 may also limit the compression of the expanded TPU in case it for example fully surrounds the expanded TPU. The plastic foil 1100 may be manufactured from a variety of materials. For example, the foil may comprise a TPU. By means of such a foil, an optimized chemical bond between the foil and the expanded TPU may be achieved. In some embodiments, the foil essentially consists of TPU. In other embodiments, the foil comprises PA, polycarbonate and/or carbon fiber.

In certain embodiments, the foil 1100 is bonded to the expanded TPU in a steaming process for the latter, for example in the form of a surface region or a partial region. In other embodiments, the foil is bonded to the expanded TPU after a steaming process for the expanded TPU, for example wrapped around the expanded TPU. In further embodiments, also any other functional element of the sole may be manufactured from such a foil and integrated into the manufacturing process of the sole.

In some embodiments, the foil 1100 serves for shaping purposes. Expanded TPU may be arranged within, outside of or around the foil. The foil may serve as carrier material for elements such as for example a torsion bar or other elements that are to be connected to the expanded TPU or that are to be fully surrounded by expanded TPU. In other embodiments, the foil is pre-formed in a deep-drawing process. The foil may be deep-drawn or pressed or injected.

Figure 11B:
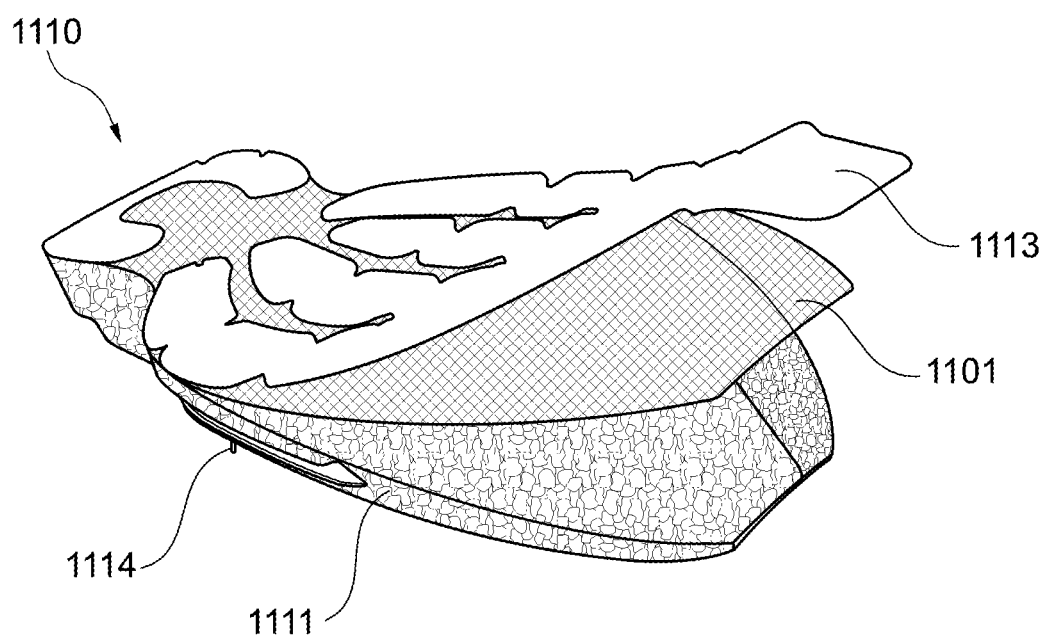
FIG. 11b is an exploded perspective view of a sole comprising a foil according to certain embodiments of the present invention.

FIG. 11*b* shows certain embodiments of a sole 1110. It comprises a first partial region, which comprises an expanded TPU. A surface region of the sole in the toe region is free from expanded TPU. In addition, the sole 1110 comprises an outsole 1113, which may comprise rubber or a non-expanded TPU. In addition, the sole 1110 optionally comprises a foil 1101 by means of which the outsole 1113 is connected to a first surface region 1111. In this context, the foil serves as carrier material and/or compound material and/or stabilizing element. Further, the sole 1110 optionally comprises a frame element 1114.

Figure 17:
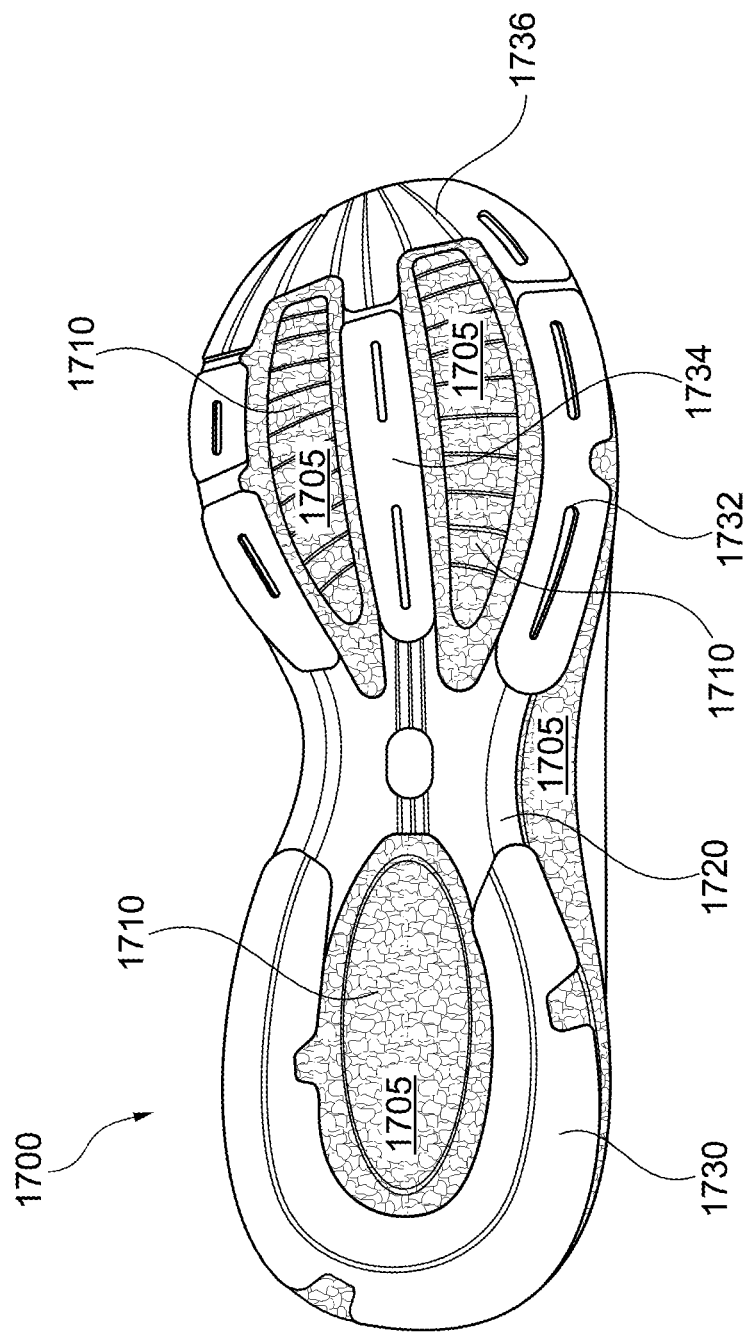
FIG. 17 is a bottom view of a shoe comprising a foil that acts as a means to attach outer sole elements to the midsole according to certain embodiments of the present invention.

FIG. 17 shows other embodiments of a shoe 1700 with a sole comprising at least a first partial region 1705 covered by a foil 1710 by means of which a torsion bar or reinforcement element 1720 as well as outsole elements 1730, 1732, 1734 and 1736 are attached to the midsole. The foil may only cover the bottom surface or parts of the bottom surface of the midsole, as described in more detail with reference to FIGS. 19*a*-*b* below, or it may further extend around the outer rim of the sole or parts thereof, as also described in more detail with reference to FIGS. 18*a*-*b* below, for example to provide further stability to the sole or midsole. The outsole elements 1730, 1732, 1734 and 1736 may also partially cover the torsion bar or reinforcement element 1720. This helps to avoid slipping of the foot that could occur otherwise in case the sole makes contact with the ground on the hard reinforcement element 1720. In other embodiments, the torsion bar or reinforcement element 1720 could also be disposed between the partial region 1705 and the foil 1710 in order to secure the element 1720 in its place and to protect it against mechanical and/or chemical influences. If disposed in such a way under the foil, the risk of slipping might be reduced, even without further outsole elements if the foil itself provides enough friction. The foil could, for example, be made of high friction TPU. Another option would be to structure the midsole on its bottom surface so the foil adapts that shape to increase the friction of the sole. A combination of both options is also possible. This could help to save weight in the construction of a light-weight sole, e.g. for a sports or running shoe.

Figure 18A:
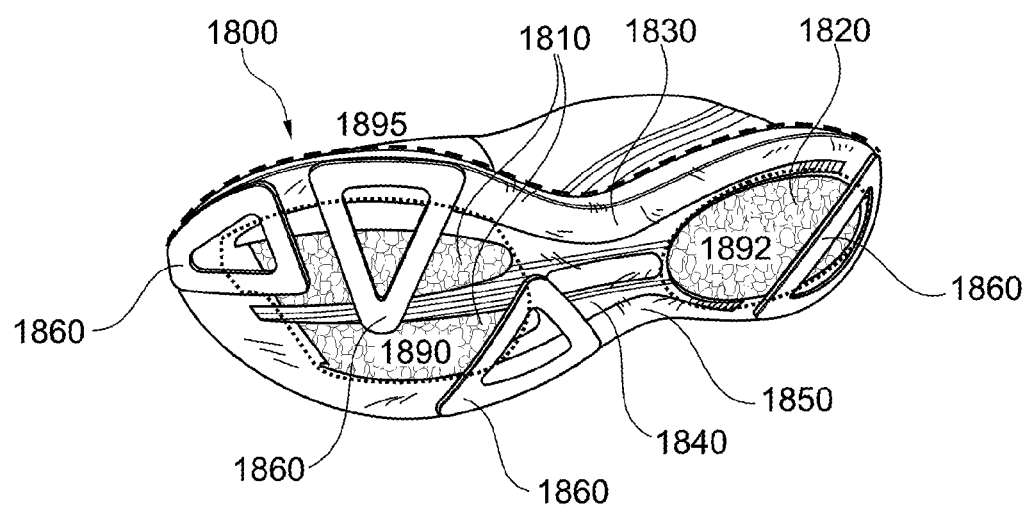
FIG. 18a is a bottom perspective view of a sole comprising a first and a third surface region comprising expanded TPU that are surrounded by a second surface region comprising expanded PP and an inner sole element, wherein all three surface regions are at least partially covered with a foil and the inner sole element is attached to the surface regions by the foil according to certain embodiments of the present invention.
Figure 18B:
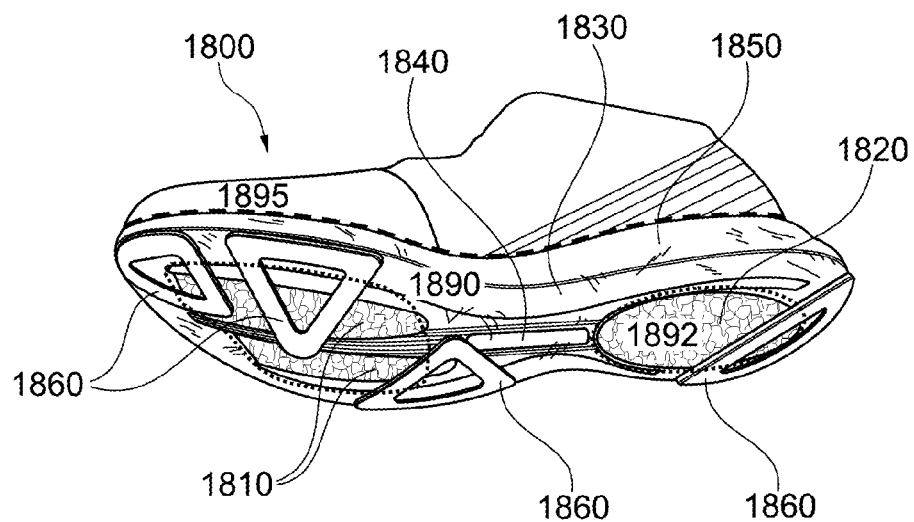

FIGS. 18*a*-*b* show embodiments of a shoe 1800 comprising a midsole comprising a first surface region 1810 arranged in the forefoot region and a third surface region 1820 arranged in the heel region, both comprising expanded TPU, as well as a second surface region 1830 comprising expanded PP. Dotted line 1890 indicates the approximate extension of the first surface region 1810 and dotted line 1892 indicates the approximate extension of the third surface region 1820. As already discussed, in certain embodiments, the ratio of expanded PP and expanded TPU may be about 70% expanded PP to about 30% expanded TPU. In other embodiments, the expanded TPU comprises about 10%-40% of the entire sole, depending on the specific sole design and intended use of the sole. As can furthermore be seen, the first surface region 1810 placed in the midfoot and/or forefoot region may be shaped to provide a cushioning underneath the big toe. This results in more energy being applied to the push off movement of the foot, e.g. during running, and provides more energy to the overall movement of the foot. This assistance of the push off movement over the big toe also helps to improve the running/walking efficiency. It is to be appreciated, however, that the lines 1890 and 1892 merely serve illustrative purposes in order to give a person skilled in the art an idea of an exemplary extension of the first and third surface elements, respectively.

They may not be construed as detailed constructional specifications. Also shown is a textile reinforcement element 1840 provided to increase the stability of the sole while saving most of the weight of e.g. a torsion bar. The textile reinforcement element may be made of a number of materials as already discussed above. The textile reinforcement material may be attached to at least a part of the first, second and/or third surface region. In general, such a textile reinforcement element may be attached to at least a part of one or more surface and/or partial regions of a sole in a number of different ways beneficial to the stability of the sole. As a further option, the textile reinforcement material may also be sandwiched between two or more layers of the sole or midsole comprising TPU and this multi-layer laminate may then be used in a sole for a shoe. The first, third and second surface regions 1810, 1820 and 1830, as well as the textile reinforcement material 1840 are covered by a foil 1850. In the embodiments shown in FIGS. 18*a*-*b*, the foil covers the bottom as well as the sides or outer rim of the midsole. In this configuration, the foil protects the bottom of the midsole and also helps to stabilize the shape of the second surface region comprising expanded PP. The edge of the foil is indicated by the dashed line 1895. Again, this line only serves illustrative purposes and may not be construed as a detailed constructional specification. In some embodiments, the foil comprises TPU. The foil 1850 also helps to secure the textile reinforcement element 1840 in its place and to further protect the first, third and second surface regions 1810, 1820 and 1830 and the textile reinforcement material 1840 against mechanical and/or chemical influences as already mentioned above. Outsole elements 1860 are disposed on the foil in order to help avoid slipping of the shoe. In other embodiments not shown, further inner or outer sole elements like a torsion bar or another textile reinforcement material may additionally be disposed beneath the foil or on the outside of the foil to further modify the functionality and characteristics of the sole. The foil may also be colored, such as with a color comprising liquid TPU such that a particularly durable coloring may be achieved. In an additional aspect, one or more of the surface regions comprising TPU may be colored, such as using a color comprising liquid TPU.

Figure 19A:
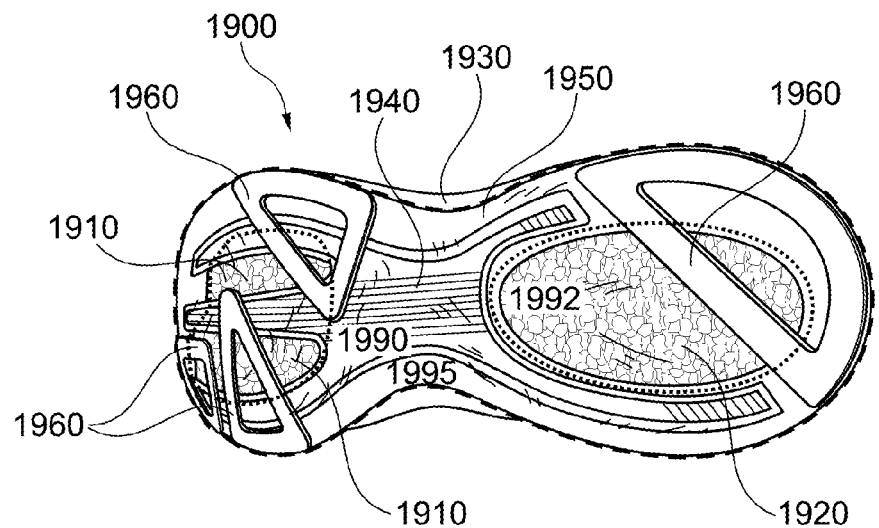
FIG. 19a is a bottom perspective view of a sole comprising a first and a third surface region comprising expanded TPU that are surrounded by a second surface region comprising EVA and an inner sole element, wherein all three surface regions are at least partially covered with a foil and the inner sole element is attached to the surface regions by the foil according to certain embodiments of the present invention.
Figure 19B:
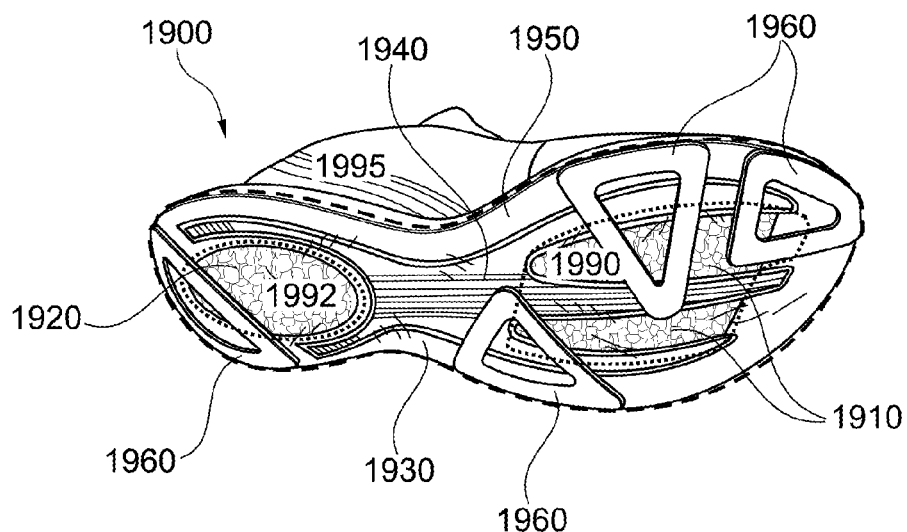

FIGS. 19a-b show other embodiments of a shoe 1900 comprising a midsole comprising a first surface region 1910 arranged in the forefoot region and a third surface region 1920 arranged in the heel region, both comprising expanded TPU, as well as a second surface region 1930 comprising EVA, such as light weight EVA so that the entire sole has a weight of less than about 100 g. Although such a light weight EVA material might not be suitable for the construction of a complete midsole because of its performance parameters, it may be used advantageously together with one or more inserts and/or surface regions and/or partial regions comprising expanded TPU. Dotted line 1990 indicates the approximate extension of the first surface region 1910 and dotted line 1992 indicates the approximate extension of the third surface region 1920. As already discussed, in certain embodiments, the expanded TPU comprises about 10%-40% of the entire sole, depending on the specific sole design and intended use of the sole. As can furthermore be seen, the first surface region 1910 placed in the midfoot and/or the forefoot region may be shaped to provide a cushioning underneath the big toe. This results in more energy being applied to the push off movement of the foot, e.g. during running, and provide more energy to the overall movement of the foot. This assistance of the push off movement over the big toe also helps to improve the running/walking efficiency. It is to be appreciated, however, that the lines 1990 and 1992 merely serve illustrative purposes in order to give a person skilled in the art an idea of an exemplary extension of the first and third surface elements, respectively. They may not be construed as detailed constructional specifications. Also shown is a textile reinforcement element 1940 provided to increase the stability of the sole while saving most of the weight of e.g. a torsion bar. The textile reinforcement element may comprise a number of materials as already discussed above. The first, third and second surface regions 1910, 1920 and 1930, as well as the textile reinforcement element 1940 are covered by a foil 1950. In the embodiments shown in FIGS. 19a-b, the foil only covers the bottom but not the sides of the midsole, since the foil is not needed to stabilize the shape of the second surface region comprising EVA in this case. The edge of the foil is indicated by the dashed line 1995. Again, this line only serves illustrative purposes and may not be construed as a detailed constructional specification. In some embodiments, the foil comprises TPU. The foil 1950 helps to secure the textile reinforcement element 1940 in its place and to further protect the first, third and second surface regions 1910, 1920 and 1930 and the textile reinforcement element 1940 against mechanical and/or chemical influences. Outsole elements 1960 are disposed on the foil in order to help avoid slipping of the shoe. In other embodiments not shown, further inner or outer sole elements like a torsion bar or another textile reinforcement material may additionally be disposed beneath the foil or on the outside of the foil to further modify the functionality and characteristics of the sole. In a further optional aspect the foil or one or more surface regions of the midsole may be colored, such as using a color comprising liquid TPU.

Figure 12A:
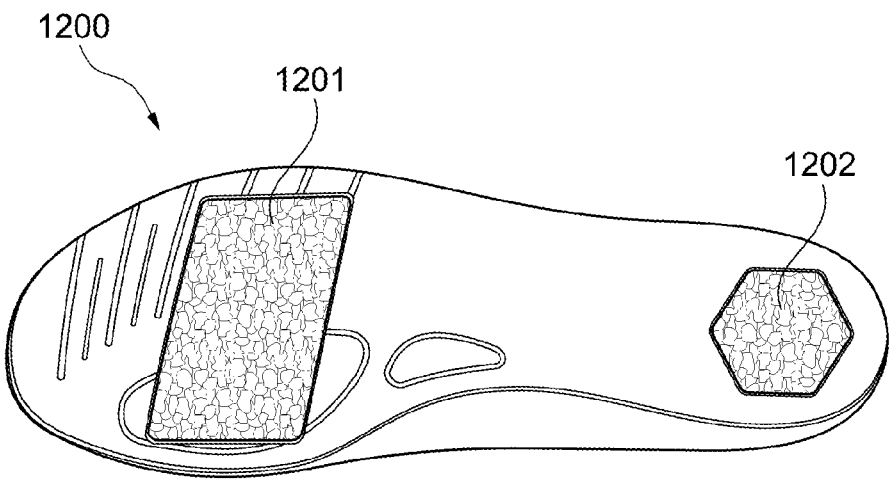
FIG. 12a is a bottom view of an insole for arrangement within an upper of a shoe, wherein the insole comprises expanded TPU according to certain embodiments of the present invention.
Figure 12B:
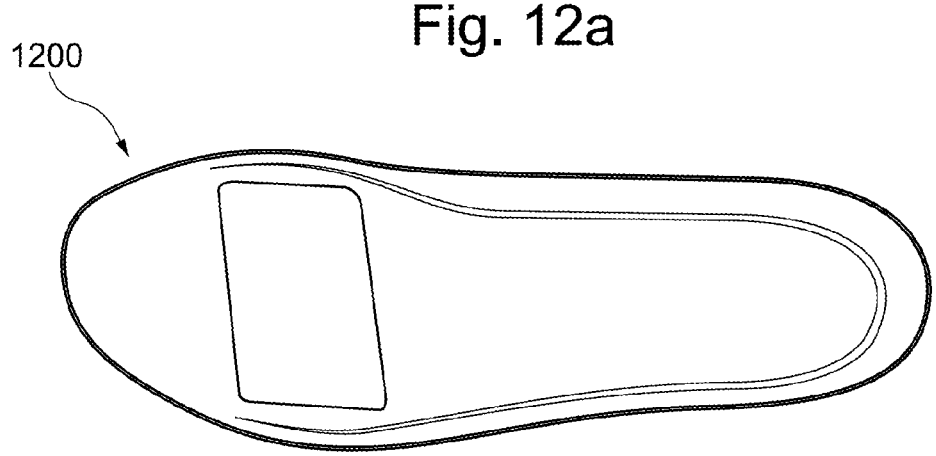
Figure 12C:

FIGS. 12a-c show embodiments for an insole 1200 for a shoe, wherein the insole comprises expanded TPU. The insole comprises a first partial region 1201 with a first expanded TPU and an optional second partial region 1202 with a second expanded TPU. The first expanded TPU 1201 is arranged in the region of the balls of the toes. The second partial region 1202 is arranged in the region underneath the calcaneus. Thus, an insole is provided that is particularly cushioning in the mentioned region. Hence, a particularly pleasant wearing comfort is achieved. The first and the second expanded TPU in the partial regions 1201 and 1202 may be glued to the remaining part of the insole or connected to the remaining part of the insole by other means. In other embodiments, the first and/or second partial regions are bonded to the remaining parts of the insole in a steaming process for the first and/or second expanded TPU.

In other embodiments, the first partial region 1201 and/or the second partial region 1202 may be arranged differently than in FIGS. 12a-c. The first and second expanded TPU may be manufactured from different base material and/or with a different steaming process. A variety of design possibilities for an improved insole is obtained. Since an insole may be easily replaced for example by an insole of a different type, the cushioning properties of a sole may be substantially changed by simply exchanging the insole 1200. Thus, one and the same shoe may be adapted to different types of sports by means of differently adapted insoles. For example, a running shoe that is actually adapted for sprinting and therefore comprises a sole with a rather high strength may also be used for long-distance running with an insole that comprises expanded TPU. Particularly, due to its long-term stability, expanded TPU is very well suited to provide insoles with large cushioning.

The insole 1200 may be coated at its upper face with known means in order to provide a surface that is pleasant for contacting the foot. The insole 1200 may, in some embodiments, at least partially be surrounded by a foil, in particular a plastic foil. The latter may improve the functionality of the insole. In particular, it may reduce the effect of dirt and water on the insole and thus further increase the lifetime of the insole 1200. Moreover, the foil may modify further functional properties of the expanded TPU of the insole 1200 such as for example the cushioning, in a similar manner as already discussed above. Alternatively or additionally, the foil may provide the insole 1200 with a desired texture, haptics and/or color.

Figure 13A:
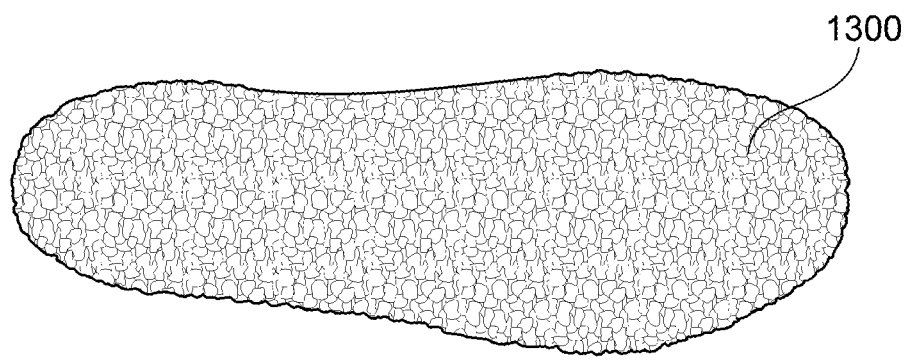
FIG. 13a is a bottom view of an insole for arrangement within an upper of a shoe, wherein the insole comprises expanded TPU and the insole is manufactured from expanded TPU area-wide according to certain embodiments of the present invention.
Figure 13B:
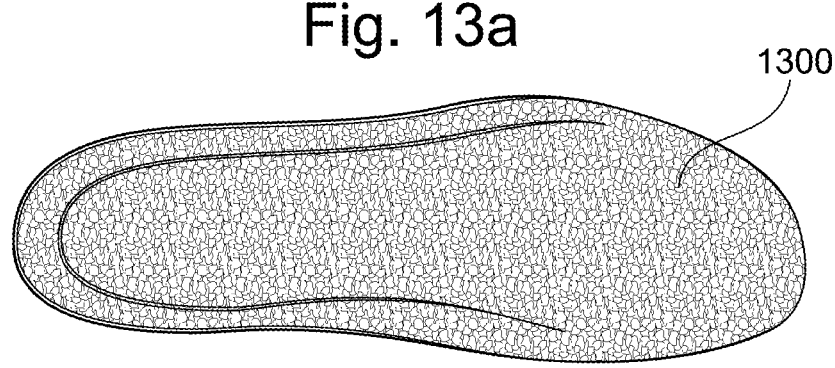
Figure 13C:
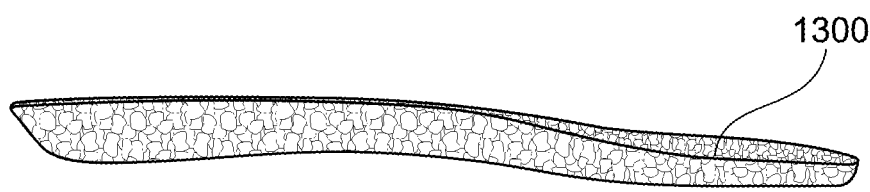

FIGS. 13a-c show other embodiments of an insole 1300 for a shoe, wherein the insole comprises expanded TPU. The insole 1300 may be manufactured in a steaming process for the expanded TPU. The expanded TPU of the insole 1300 may be designed differently according to the specific needs. Thus, by means of changing the insole, different functionalities may be achieved. For example, the cushioning of the sole may be varied by means of different insoles. In this context, on the one hand, the large cushioning and the long-term stability that may be achieved by means of expanded TPU are advantageous. On the other hand, by means of expanded TPU, an insole may be provided with different properties even if it has the same dimensions, particularly the same thickness. Thus, for example the cushioning of the sole may be modified without the foot having to adapt to a changed geometry of the shoe.

Moreover, for example also the weight of the insole or the cushioning of the insole may be adapted to the weight of the wearer accordingly. In some embodiments, the insole 1300 comprises a first and a second partial region with a first a second expanded TPU. Also more than two partial regions with two or more expanded TPU may be included.

In addition, by means of an insole, which comprises expanded TPU, the sole of a shoe may be designed thinner and thus more cost-effective and lighter since already by means of the insole a strong cushioning is provided such that the requirements to the sole of the shoe are lower. By means of a thin sole and the proximity to the ground which is associated therewith, a particularly natural wearing comfort may be achieved.

In certain embodiments, a shoe with an insole that comprises expanded TPU is provided. By means of the large cushioning that is provided by the insole, an additional intermediate sole of the shoe is unnecessary. Thus, the wearer of the shoe has the possibility to exchange the functionality that is usually provided by an intermediate sole—and which cannot be exchanged—by means of exchanging the insole.

In addition, in some embodiments for a shoe, the outsole may be arranged in such a minimalistic manner that it only comprises a layer that is directly attached to the bottom of the shoe upper. The layer may comprise rubber or TPU and only partially covers the lower face of the upper. Thus, a particularly flat shoe with a natural walking and running feeling due to proximity to the ground may be provided. The layer may be melted onto the upper.

The insole 1300 may be precisely shaped by means of a steaming process for the expanded TPU. Thus, the insole 1300 may be provided with a varying thickness. In addition, the shape of the insole 1300 may be designed in an anatomically optimized manner.

In particular in the context of insoles, a lower temperature-dependence of the material properties is desirable. Typically, an insole heats up in the course of usage to the body temperature of the foot. At the beginning of the usage, however, it is colder—for normal outside temperatures. Thus, the temperature of the insole usually strongly changes while wearing it. By means of the lower temperature-dependence of the properties of expanded TPU, an insole may be provided that only minimally changes its properties in the course of time. A shoe with an insole that comprises expanded TPU thus immediately provides the desired properties.

Figure 13D:
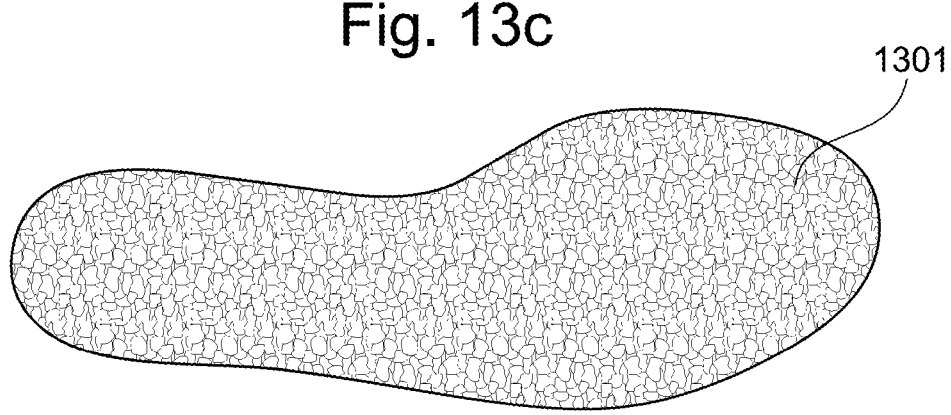
FIG. 13d is a bottom view of an insole for arrangement within an upper of a shoe, wherein the insole comprises expanded TPU and the insole is manufactured from expanded TPU area-wide according to certain embodiments of the present invention.

FIG. 13d show different embodiments of an insole 1301 for a shoe, wherein the insole 1301 comprises expanded TPU. The insole 1301 is manufactured from a block that comprises expanded TPU. For example, the insole 1301 may be cut or die-cut. The insole 1301 comprises a particularly simple and cost-effective way for providing an insole with a large cushioning and long-term stability as well as low temperature-dependence. In certain embodiments, the insole 1301 comprises a plastic foil and/or a different cover, such as for example sweat absorbing textile or a textile reinforcement material.

In further embodiments, one of the described insoles or one of the described partial regions of a sole/insole or one of the described surface regions of a sole/insole may comprise an expanded TPU that is manufactured from expanded TPU particles with different properties. For example, a first type of TPU particles with a first particle size and a second type of TPU particles with a second particle size may be used to manufacture an expanded TPU. Alternatively or additionally, the first type of TPU particles may differ from the second type of TPU particles by one or more other properties, for example color. In addition, the insole may be colored, such as using a color comprising liquid TPU.

Additional elements, such as a foil and/or a textile reinforcement material and/or color comprising liquid TPU, may furthermore be used in combination with an insole in essentially the same way as already described in previous embodiments to the beneficial effects already discussed.

Figure 14A:
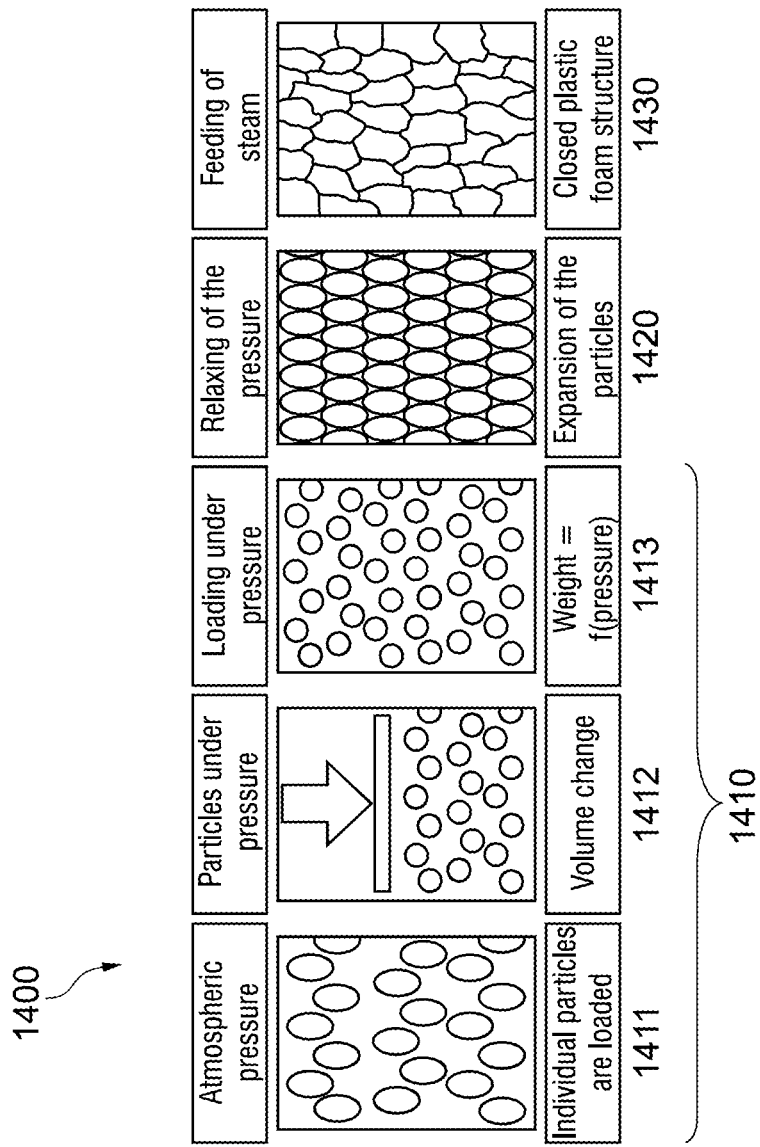
FIG. 14a is a diagram illustrating a method of manufacturing a sole for a shoe according to certain embodiments of the present invention.

FIG. 14a shows a method 1400 for manufacturing a shoe sole, in particular a shoe sole for a sports shoe. It comprises loading 1410 a mold with an expanded TPU. In addition, it optionally comprises relaxing 1420 of the TPU. The method further comprises feeding of steam 1430 to the expanded TPU. The feeding of steam heats the expanded TPU. The surface of the expanded TPU melts such that the expanded TPU is bonded to a closed plastic foam structure.

The loading 1410 with expanded TPU may comprise the loading with expanded TPU in the form of expanded particles. These may be provided in the form of loose material. The size of the particles is designed such that they comprise diameters of about 0.5 mm to about 25 mm. The diameters of the particles may further comprise about 2 mm to about 10 mm, and may even further comprise about 3 mm to about 8 mm.

An advantage of the use of expanded particles is that these particles may be bonded together in a random arrangement. They do not have to be aligned or oriented in a particular way during manufacturing to provide the advantageous effects discussed herein.

In some embodiments, the loading 1410 comprises the steps 1411 and 1412. The particles are loaded into the mold with atmospheric pressure in step 1411. Subsequently, they are pressurized within the mold in step 1412. To this end, a variety of different methods may be used. For example, it may be achieved by reducing the volume of the mold. In some embodiments, to this end, a moveable part of the mold is moved such that the volume of the mold is reduced. In further embodiments, the mold is designed such that the pressure within the mold is locally varied.

In other embodiments, the loading 1410 comprises the step 1413. The particles are loaded into the mold already under pressure—if desired with a locally varying pressure. That way, the manufacturing method may be accelerated.

The pressure to which the particles are compressed in method 1400 essentially influences the density and the strength of the expanded TPU. The diameter of the particles reduces by means of applying the pressure. For higher pressures, the particles are compressed and densified more strongly. By reducing the pressure 1420, the particles of the expanded TPU essentially re-expand to their original diameters.

By means of the feeding of steam 1430 to the expanded TPU, the latter is heated. The surface of the particles is partially melted or melted. Thus, the particles may chemically bond to each other. They bond to a granular but closed plastic foam structure.

In some embodiments, the method in addition comprises the loading of the mold with a material that is free from expanded TPU, for a second surface region, wherein the expanded TPU is provided for a first surface region. Thus, the expanded TPU may be bonded to a variety of other materials without additional gluing means in a steaming process. For example, the material that is free from expanded TPU is loaded into the mold first, wherein the expanded TPU is loaded into the mold subsequently. In other embodiments, this sequence may however also be changed. In addition, also several loading steps with expanded TPU or with different expanded TPU and/or several loading steps with material that is free from expanded TPU may be carried out. Therein, the sequence of the steps may be optimized differently in different embodiments.

In other embodiments, the method comprises the loading of the mold with a second expanded TPU for a second partial region, wherein the already mentioned first TPU is provided for a first partial region. In addition, the feeding of steam further comprises feeding the steam to the second expanded TPU. The first and the second expanded TPU are compressed differently or comprise different pressures and/or different base materials. Thus, several partial regions that comprise different properties may be precisely manufactured in one fabrication method. For example, the partial regions may be bonded to each other by means of the feeding of steam. Steam may be fed to both partial regions simultaneously. In other embodiments, the first partial region may be fed with steam first and the second partial region may be fed with steam subsequently. The subsequent feeding of steam and the merging of individual partial regions may be carried out in a suitable mold. For example, after the melting of a first partial region in a designated region, the mold is opened only to an extent such that a loading and a further melting of expanded TPU particles is enabled, which may for example form a further partial region.

In some embodiments, already expanded partial regions of expanded TPU may be loaded into a mold. By means of feeding steam, also then partial regions may be bonded to each other.

The described methods may be automated to a large degree that allows a cost-effective and efficient production. Moreover, the problematic usage of glue is unnecessary and may harm the environment and the workers in the shoe production. Only steam is added in the production process. In some embodiments, the steam is essentially free from additives.

Figure 14B:
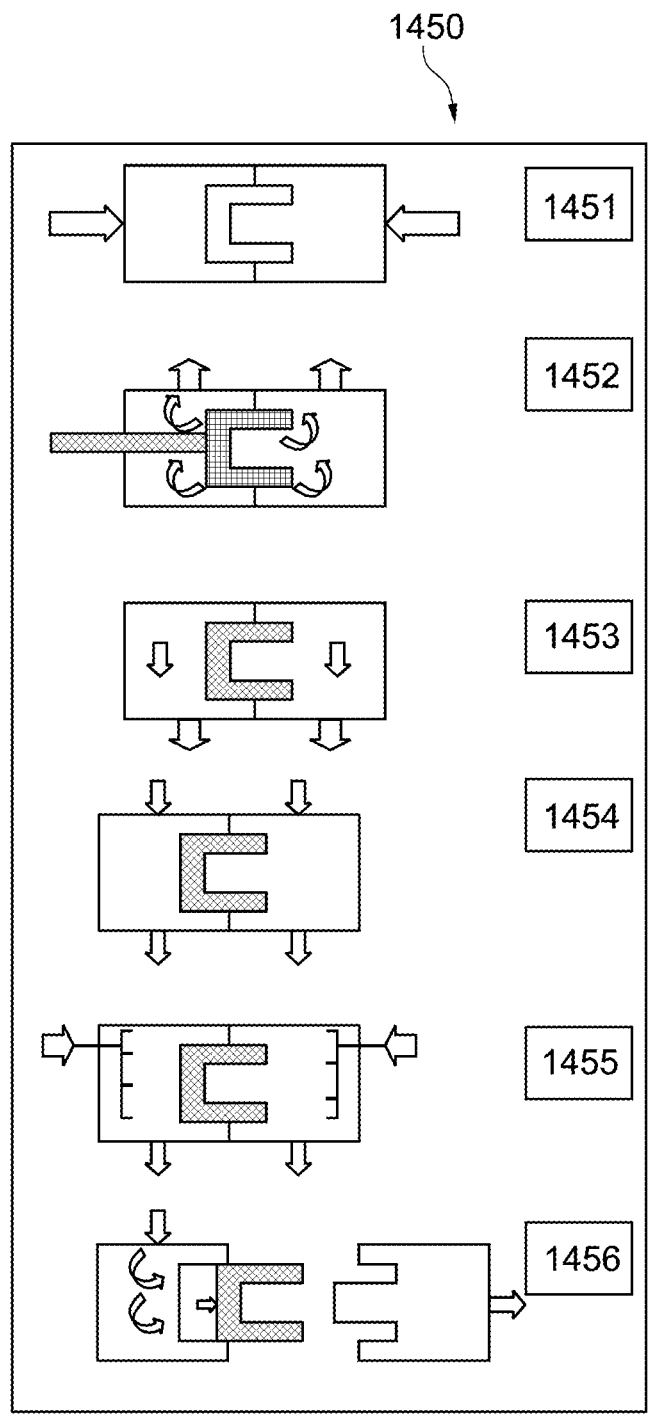
FIG. 14b is a diagram illustrating a method of manufacturing a sole for a shoe according to certain embodiments of the present invention.

FIG. 14b shows further embodiments for a method 1450 for manufacturing a shoe sole that comprises a loading of a mold with expanded TPU under increased pressure. In step 1451, the mold is closed and pre-treated with steam. Thus, for example the mold may be cleaned. In step 1452, the mold is loaded with expanded TPU particles, wherein the loading is carried out under pressure. In step 1453 the pressure relaxes within the mold. In step 1454 steam is fed to the expanded TPU such that the surfaces of the particles partially melt and the particles chemically bond to each other. In addition, the method comprises, in step 1455, a cooling of the mold with water and/or air that are fed through the mold. Thus, the expanded TPU is cooled indirectly via the mold. Thus, the bonding process is stopped and the expanded TPU acquires the closed plastic foam structure. Finally, the mold is re-opened in step 1456 and the sole, which comprises expanded TPU, is removed from the mold.

Figure 14C:
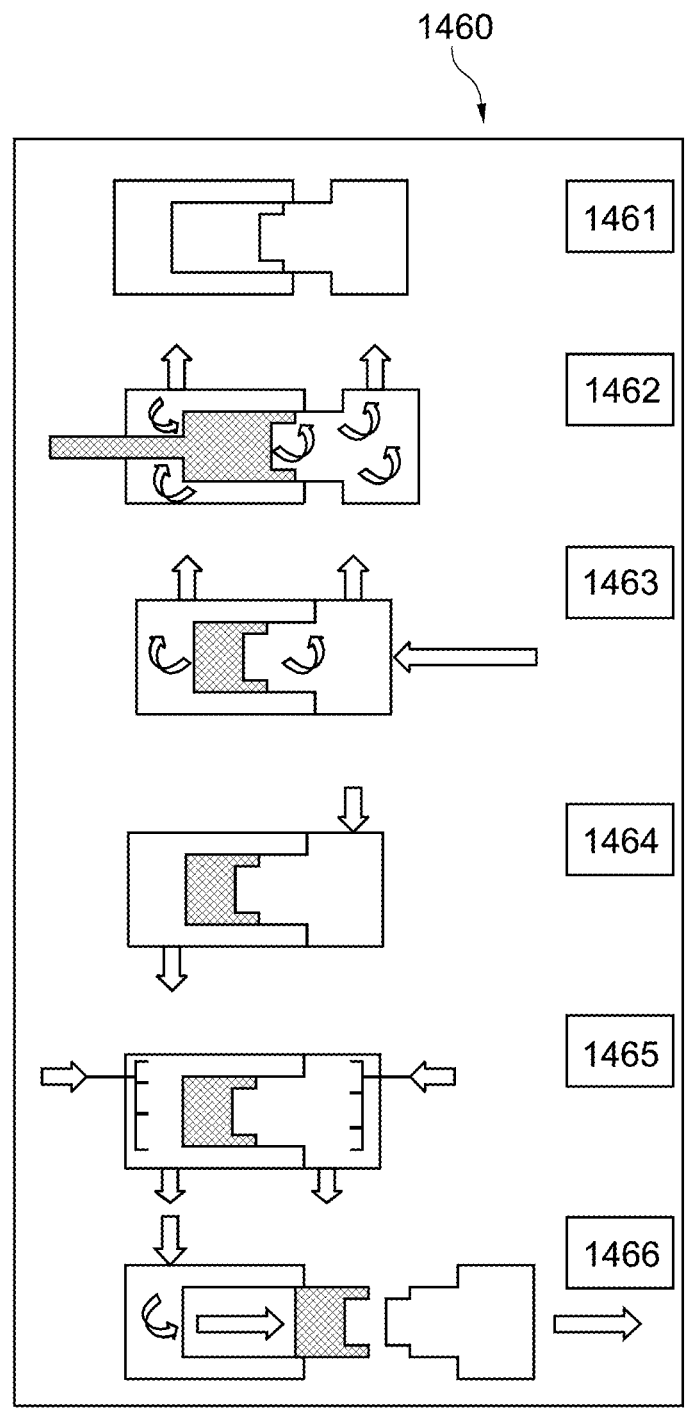
FIG. 14c is a diagram illustrating a method of manufacturing a sole for a shoe according to certain embodiments of the present invention.

FIG. 14c shows further embodiments for a method 1460 for manufacturing a shoe sole that comprises a loading of a mold with expanded TPU under atmospheric pressure.

In step 1461, the mold, which comprises a movable part, is opened to a predetermined extent. The mold is loaded with expanded TPU particles at atmospheric pressure in step 1462. In step 1463, the volume of the mold is reduced according to the predetermined shape of the element that is to be manufactured and which comprises expanded TPU. Thus the expanded TPU is compressed. The extent to which the mold is opened and, thus, the amount of particles that are available for the compression of the particles is essential for the mechanical properties of the element. That way, the weight, the strength and the elasticity of the expanded TPU may be determined. The extent to which the mold is opened is also correspondingly adapted to the size of the shaped part. In some embodiments, the mold is opened to a height of about 14 mm for loading. Thus, a medium weight and a medium strength of the expanded TPU are achieved. If the weight of the expanded TPU—for the same geometry—is to be reduced and/or it is to be designed softer, the mold is opened, in some embodiments, in the range of for example about 10 mm to about 14 mm. For a larger weight and a harder element, the mold may, in some embodiments, be opened up to about 20 mm. In other embodiments, the height of the opening of a mold depends on the shoe size for which the expanded TPU, which is to be manufactured, is provided. For larger shoe sizes, by trend, larger forces are to be expected, such that the expanded TPU correspondingly may be arranged with higher strength. Correspondingly, the mold is opened to a larger extent for larger shoe sizes.

In step 1464, steam is fed to the expanded TPU. The expanded TPU is partially melted. In these embodiments, steam is fed to the expanded TPU already during the process of closing the mold. In other embodiments, the steps 1463 and 1464 may also be carried out subsequently. In step 1465, the mold is cooled by means of water and/or air and thus the expanded TPU is cooled indirectly. In step 1466 the mold is finally opened and the sole is removed from the mold.

In other embodiments the steps of the mentioned methods for manufacturing a sole for a shoe may be combined. Also, individual method steps may be left out or may be carried out in a different order.

FIGS. 15a-e show embodiments for molds that may be used for one of the mentioned methods for manufacturing a sole for a shoe, in particular a sports shoe.

Figure 15A:
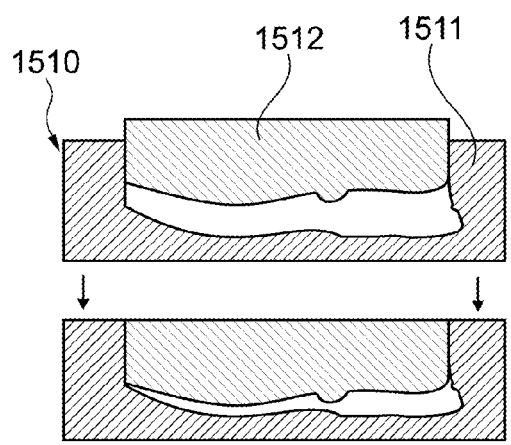
FIG. 15a are side views of a mold in an open state and closed state, respectively, for use in various embodiments of a method for manufacturing a shoe sole, according to certain embodiments of the present invention.

FIG. 15a shows an example for a mold 1510 in an opened and a closed state. The mold 1510 comprises a fixed element 1511 and a movable element 1512. In some embodiments, the mold is opened to a predetermined extent and loaded with expanded TPU. Subsequently, the moveable element 1512 is moved towards the fixed element 1511 such that the expanded TPU is compressed. The mold is closed to a predetermined extent, which determines the thickness of the shaped element that comprises expanded TPU. In these embodiments, steam is fed to the expanded TPU during the process of closing. The two elements 1511 and 1512 are arranged such that their shape determines the geometry of the shaped element that comprises expanded TPU.

Figure 15B:
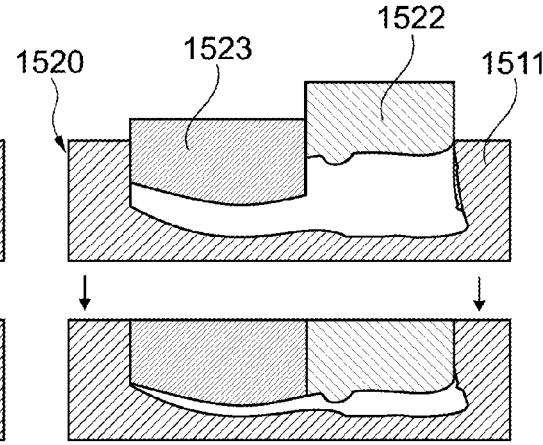
FIG. 15b are side views of a mold in an open state and closed state, respectively, for use in various embodiments of a method for manufacturing a shoe sole, according to certain embodiments of the present invention.
Figure 15C:
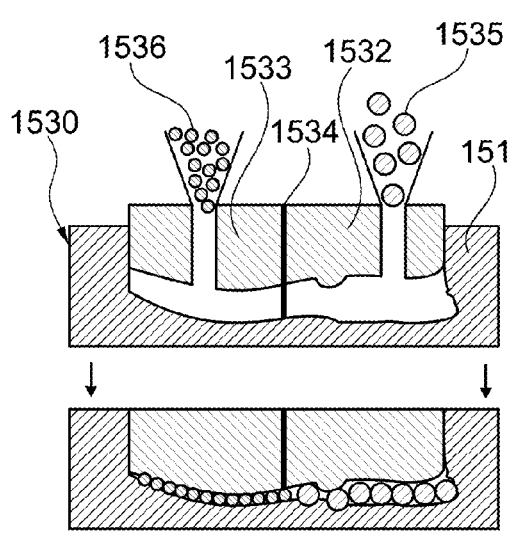
FIG. 15c are side views of a mold in an open state and closed state, respectively, for use in various embodiments of a method for manufacturing a shoe sole, according to certain embodiments of the present invention.

FIG. 15b shows a further example for a mold 1520. In addition to the fixed element 1511, the mold 1520 comprises a first moveable element 1522 and a second moveable element 1523. The number of two moveable elements in FIGS. 15b-c is only an example and other molds may comprise more than two moveable elements. The different moveable elements 1522 and 1523 allow opening the mold to different extents in different regions. Thus, for example in the region below the element 1522, which is opened to a larger extent than element 1523, a higher density may be provided after closing the mold than in the region below the element 1523. Thus, for example a surface region or a partial region of a sole may be provided with a higher mass and a higher strength in the heel region than a partial region or a surface region in the toe region.

FIG. 15c shows a mold 1530 which, in addition to the fixed element 1511, also comprises two moveable elements 1532 and 1533. Moreover, the mold 1530 comprises a separating element 1534 that separates the regions below the elements 1532 and 1533. Thus, the regions below the elements 1532 and 1533 may be advantageously loaded with different base materials, for example a first expanded TPU 1535 and a second expanded TPU 1536. The first and the second expanded TPU may for example comprise a different particle size and/or color and/or composition. The separating element 1534 prevents the first and second TPU 1535 and 1536, respectively, from mixing during the loading. In some embodiments, the separating element 1534 is removed prior to compressing in order to connect the regions below the elements 1532 and 1533. In other embodiments, the separating element is removed after compressing. In both embodiments, the first and second TPU 1535 and 1536, respectively, may be merged such that a bonding between the first and the second TPU is provided. In some embodiments, the moveable elements 1532 and 1533 may also be opened to different extents prior to loading.

Figure 15D:
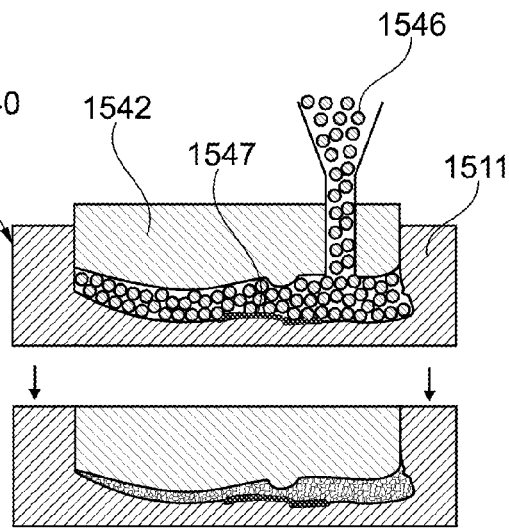
FIG. 15d are side views of a mold in an open state and closed state, respectively, for use in various embodiments of a method for manufacturing a shoe sole, according to certain embodiments of the present invention.

FIG. 15d shows a further example 1540 of a mold that comprises a fixed element 1511 and a moveable element 1542. In addition to an expanded TPU 1546, the mold may also be loaded with a material 1547, which is free from expanded TPU. This may for example be a functional element for example a torsion bar.

Also, the molds 1510, 1520 and 1530 may be loaded with such elements. In these embodiments, the material that is free from TPU is loaded into the mold prior to the expanded TPU. In some embodiments, several materials or elements that are free from expanded TPU may be loaded into the mold. After the merging, the mold may also be opened and loaded once again. Thus, a further or several further steaming processes may be carried out subsequently in order to provide further partial regions that comprise expanded TPU or which are free from expanded TPU on top of each other.

Figure 15E:
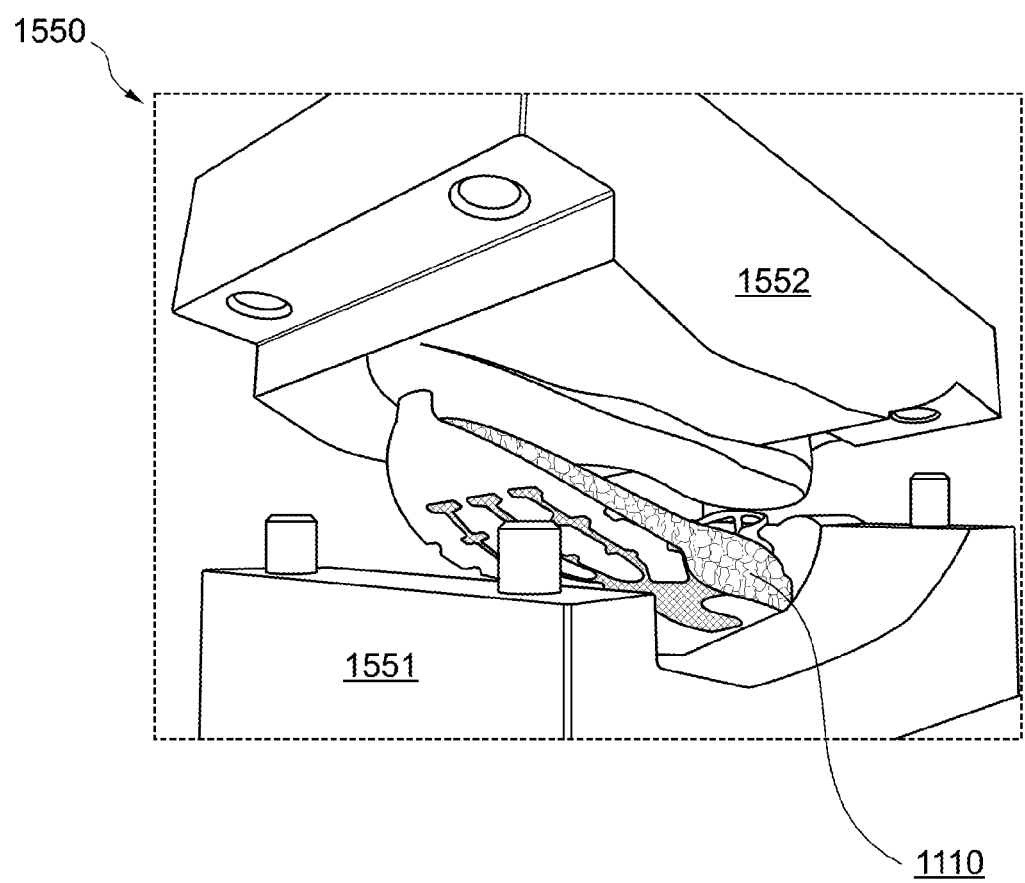
FIG. 15e is a perspective view of a mold in an open state for use in various embodiments of a method for manufacturing a shoe sole, according to certain embodiments of the present invention.

FIG. 15e shows a three-dimensional view of a mold 1550. The latter comprises a fixed element 1551 and a moveable element 1552. Moreover, FIG. 15e shows the sole 1110 that is manufactured within the mold 1550. As described above with respect to FIG. 11b, the sole 1110 comprises the first surface region 1111 that comprises an expanded TPU, the outsole 1113 and the frame element 1114, as well as the optional foil 1101. In some embodiments of a method, first, the outsole 1113, the optional foil 1101, and subsequently the frame element 1114 are loaded into the mold. Then, the mold is then loaded with an expanded TPU. The mold is closed and steam is fed to the expanded TPU such that the expanded TPU is partially melted in order to bond with the frame element 1114, the outsole 1113 and/or optionally the foil 1101.

The features of the molds 1510, 1520, 1530, 1540, 1550 and the method steps associated therewith may, in some embodiments, also be combined in an arbitrary manner.

Figure 16:
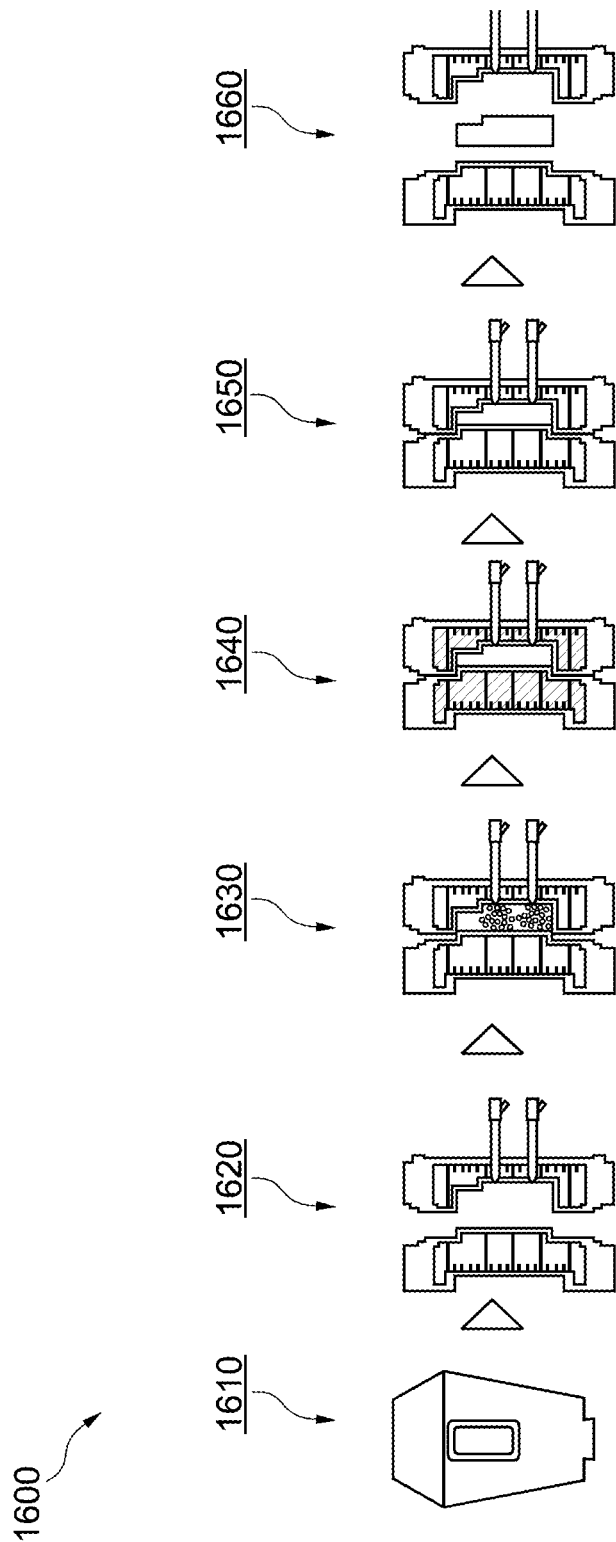
FIG. 16 is a diagram illustrating a method of manufacturing a sole for a shoe according to certain embodiments of the present invention.

FIG. 16 shows another example of a process 1600 for steam molding for example a sole for a shoe, comprising the steps of (1) loading material to a hopper vessel 1610, (2) closing the mold 1620, (3) filling the mold cavities via pressure and/or through a crack via crack fill with the material to be molded, for example expanded PP or expanded TPU, 1630, (4) steaming the material within the mold 1640, (5) cooling and stabilizing the steamed material 1650, and (6) demolding 1660.

It is to be appreciated that the material loaded into the mold may also comprise more than one base material, e.g. expanded PP and expanded TPU, or expanded TPU comprising different particle sizes and/or color or the like, and that these different components may be fused together by the steam energy under pressure to welt together and form one unique component by the methods and processes described above.

Each of the mentioned methods for manufacturing a sole for a shoe may also comprise a curing of an expanded TPU. Thus, the properties of the expanded TPU may be improved. In particular, the curing may stabilize the structure of the expanded TPU.

For example, the properties of an expanded TPU may be influenced by parameters of the added steam. First, the temperature of the added steam influences the strength of the melting of the particle surfaces. Higher steam temperatures create stronger bonding of the particles. Additionally, the strength of the bonding may be controlled via the duration of the steaming process.

In certain embodiments, the duration of the method comprises about 3-15 minutes. The duration may further comprise about 3-6 minutes for less elaborate methods, wherein only a few different materials and/or elements are used. For methods that involve a plurality of materials and/or elements, the duration may comprise up to about 15 minutes.

A higher initial pressure, which is used for compressing the expanded TPU particles, by trend, leads to a larger density of the expanded TPU. The densities of the expanded TPU may vary from about 30 to about 300 grams/liter, and may further vary from about 70 to about 250 grams/liter.

By means of a slower cooling of the expanded TPU, its structure may be stabilized. Thus, a higher long-term stability is achieved. Also, by means of curing the expanded TPU, its structure may be stabilized, wherein the curing temperature and curing duration influence the stabilization of the structure.

The properties of an expanded TPU may also be influenced by the choice of the base material. For example, expanded TPU particles of different sizes may be used. By trend, the larger the particles, the more porous the foam structure of the expanded TPU will be. Moreover, with increasing particle size, the expanded TPU will, by trend, be less dense, lighter, and softer. In addition, a plethora of additives may be added to the base material of the expanded TPU, which may control the properties of the expanded TPU. For example, a different expanded material may be added to the expanded TPU as a base material. To make the material lighter, for example, expanded PP or expanded PS may be added. To make the material stronger, for example, expanded PA may be added. For specific applications, materials of very different kinds may be combined. Thus, the properties of the expanded TPU may be precisely changed in order to provide particular predetermined properties.

In total, a large flexibility for controlling the properties of the expanded TPU is provided. Flexibility may be achieved by both changing the base material and by changing the manufacturing parameters as well as by adjusting the base materials and the manufacturing parameters to each other. In particular, the manufacturing parameters, such as the extent of opening the mold, the temperature and pressure, may be changed very easily and quickly such that the manufacturing process may be provided in a very flexible and quickly changeable manner.

In the following, further examples are described to facilitate the understanding of the invention:

1. Sole (210; 310; 410; 510; 710; 810) for a shoe (200; 300; 400; 700; 800), in particular a sports shoe, comprising
   a. at least a first (211; 311; 411; 511; 711; 811) and a second (212; 312; 412; 512; 712; 815) surface region,
   b. wherein the first surface region (211; 311; 411; 511; 711; 811) comprises an expanded thermoplastic polyurethane (TPU) and
   c. wherein the second surface region (212; 312; 412; 512; 712; 815) is free from expanded TPU.
2. Sole (210; 310; 410; 510; 710; 810) according to example 1, wherein the surface regions (211; 212; 311; 312; 411; 412; 511; 512; 711; 712; 811; 815) are bonded to each other by a steaming process for the TPU.
3. Sole (210; 310; 410; 510; 710; 810) according to any of examples 1 or 2, wherein the second surface region (212; 312; 412; 512; 712; 815) comprises a foamed ethylene-vinyl acetate and/or non-expanded TPU and/or rubber and/or polypropylene and/or polyamide and/or polystyrene.

4. Sole according to example 3, wherein the second surface region comprises expanded polypropylene.

5. Sole (210; 310; 410; 510; 710; 810) according to one of the preceding examples, wherein the second surface region (212; 312; 412; 512; 712; 815) is arranged at a rim of the sole (210; 310; 410; 510; 710; 810).

6. Sole (210; 310; 410; 510; 710; 810) according to one of the preceding examples, wherein the second surface region (212; 312; 412: 512; 712; 815) comprises a sole plate (516) and/or a torsion bar and/or an outsole (213; 313; 413; 713; 813) and/or a recess (214) for receiving functional elements.

7. Sole (310; 510; 710; 810) according to one of the preceding examples, wherein the first surface region (311; 511; 711; 811) comprises a varying thickness.

8. Sole (310; 510; 710) according to example 7, wherein the thickness of the first surface region (311; 511; 711) increases from the forefoot region towards the heel region.

9. Sole (510) according to one of the preceding examples, wherein the first surface region (511) comprises at least one recess.

10. Sole (310; 510; 710; 810) according to one of the preceding examples, wherein the first surface region (311; 511; 711; 811) is arranged at a rim of the sole (310; 510; 710; 810).

11. Sole (710) according to example 10, wherein the thickness of the first surface region (711) is increased at the rim of the sole.

12. Sole (310; 410; 510; 710; 810) according to one of the preceding examples, wherein the first surface region (311; 411; 511; 711; 811) is arranged in the midfoot region and/or in the forefoot region of the sole (310; 410; 510; 710; 810).

13. Sole (210; 410) according to one of the preceding examples, wherein the sole comprises a third surface region (2111; 4112) that comprises an expanded TPU.

14. Sole (210) according to example 13, wherein the first surface region (211) is arranged in the heel region of the sole (210) and wherein the third surface region (2111) is arranged in the midfoot region and/or in the forefoot region of the sole (210).

15. Sole according to example 12, wherein the sole further comprises a partial region that is arranged in the heel region of the sole.

16. Sole according to example 15, wherein the partial region comprises a heel insert comprising an elastomer compound.

17. Sole according to one of the preceding examples, wherein the first surface region and/or the third surface region and/or the partial region are surrounded by the second surface region.

18. Sole according to one of the preceding examples further comprising a textile reinforcement material.

19. Sole according to example 18, wherein the textile reinforcement material is attached to at least a part of the one or more surface regions and/or a part of the partial region.

20. Sole according to one of the preceding examples, wherein the one or more surface regions and/or the partial region are at least partially surrounded by a foil, in particular a plastic foil.

21. Sole according to example 20, wherein the foil comprises TPU.

22. Sole according to one of the examples 20 or 21, wherein the foil is bonded to at least a part of the one or more surface regions and/or a part of the partial region by partially melting at least one of the foil or a part of the one or more surface regions and/or a part of the partial region.

23. Sole according to one of the examples 20-22, wherein the foil is bonded to at least a part of the one or more surface regions and/or a part of the partial region by a chemical reaction.

24. Sole according to one of the examples 20-23, wherein the foil is imprinted on the side of the foil that is facing the one or more surface regions and/or the partial region.

25. Sole according to one of the examples 20-24, wherein the foil serves to attach at least one inner sole element to at least one of the surface regions and/or the partial region.

26. Sole according to one of the examples 20-25, wherein at least one outer sole element is affixed to the side of the foil that is facing away from the one or more surface regions and/or the partial region.

27. Sole according to examples 25 or 26, wherein the at least one inner sole element and/or the at least one outer sole element comprise a sole plate and/or an outsole element and/or a torsion bar and/or a textile reinforcement material.

28. Sole according to one of the preceding examples, wherein at least one of the surface regions comprising TPU and/or the foil comprising TPU is colored with a color comprising liquid TPU.

29. Sole (810; 910; 1010; 210; 410) for a shoe (800; 900; 1000; 200; 400), in particular a sports shoe, comprising
 a. a first partial region (811; 911; 10111; 211; 411), which comprises a first expanded thermoplastic polyurethane (TPU),
 b. a second partial region (812; 912; 10112; 2111; 4112), which comprises a second expanded TPU,
 c. wherein the first expanded TPU and the second expanded TPU are manufactured using a different steaming process and/or using a different base material.

30. Sole (810; 910; 1010; 210; 410) according to example 29, wherein the first expanded TPU comprises a first particle size and wherein the second expanded TPU comprises a second particle size that differs from the first particle size.

31. Sole (810; 910; 1010) according to any of the examples 29 or 30, wherein the partial regions (811; 812; 911; 912; 10111; 10112) are bonded to each other by a steaming process for the first expanded TPU and/or the second expanded TPU.

32. Sole (910) according to any of the examples 29-31, wherein the first partial region (911) comprises a first sole layer and the second partial region (912) comprises a second sole layer.

33. Sole (910) according to example 32, wherein the sole comprises a third sole layer (913) that is free from expanded TPU.

34. Sole according to example 33, wherein the third sole layer is arranged between the first and second sole layer.

35. Sole (210; 410) according to any of the examples 29-31, wherein the first partial region (211; 411) comprises a first surface region and/or the second partial region (2111; 4112) comprises a second surface region.

36. Sole according to example 35, wherein the first surface region is arranged essentially on the medial side of the sole.
37. Sole according to example 36, wherein the second surface region is arranged essentially on the lateral side of the sole.
38. Sole according to one of the examples 29-37 further comprising a textile reinforcement material.
39. Sole according to example 38, wherein the textile reinforcement material is attached to at least a part of the one or more partial regions.
40. Sole according to one of the examples 29-39, wherein one or more partial regions are at least partially surrounded by a foil, in particular a plastic foil.
41. Sole according to example 40, wherein the foil comprises TPU.
42. Sole according to one of the examples 40 or 41, wherein the foil is bonded to at least a part of the one or more partial regions by partially melting at least one of the foil or a part of the one or more partial regions.
43. Sole according to one of the examples 40-42, wherein the foil is bonded to at least a part of the one or more partial regions by a chemical reaction.
44. Sole according to one of the examples 40-43, wherein the foil is imprinted on the side of the foil that is facing the one or more partial regions.
45. Sole according to one of the examples 40-44, wherein the foil serves to attach at least one inner sole element to at least one of the partial regions.
46. Sole according to one of the examples 40-45, wherein at least one outer sole element is affixed to the side of the foil that is facing away from the one or more partial regions.
47. Sole according to examples 45 or 46, wherein the at least one inner sole element and/or the at least one outer sole element comprise a sole plate and/or an outsole element and/or a torsion bar and/or a textile reinforcement material.
48. Sole according to one of the examples 29-47, wherein at least one of the partial regions comprising TPU and/or the foil comprising TPU is colored with a color comprising liquid TPU.
49. Sole according to one of the preceding examples, wherein the sole has a weight of less than about 100 g.
50. Insole (1200; 1300) for arrangement within the upper of a shoe, in particular a sports shoe, wherein the insole (1200; 1300) comprises an expanded thermoplastic polyurethane (TPU).
51. Insole according to example 50 further comprising a textile reinforcement material.
52. Insole (1200; 1300) according to examples 50 or 51, wherein the insole (1200; 1300) is at least partially surrounded by a foil, in particular a plastic foil.
53. Insole according to example 52, wherein the foil comprises TPU.
54. Insole according to one of the examples 52 or 53, wherein the foil is bonded to the insole by partially melting at least one of the foil or the insole.
55. Insole according to one of the examples 52-54, wherein the foil is bonded to the insole by a chemical reaction.
56. Insole according to one of the examples 52-55, wherein the foil is imprinted on the side of the foil that is facing the insole.
57. Insole according to examples 50-56, wherein at least one of the insole and/or the foil comprising TPU is colored with a color comprising liquid TPU.
58. Shoe (200; 300; 400; 700; 800; 900; 1000), in particular sports shoe, comprising a sole (210; 310; 410; 510; 710; 810; 910; 1010; 1110) according to one of the preceding examples.
59. Shoe (200; 300; 400; 700; 800; 900; 1000) according to example 58 comprising an upper (220; 320; 420; 720; 820; 920; 1020), wherein the sole (210; 310; 410; 510; 710; 810; 910; 1010; 1110) is bonded to the upper in a steaming process without gluing means.
60. Method (1400; 1450; 1460) for manufacturing a shoe sole, in particular a shoe sole for a sports shoe, comprising:
    loading (1411; 1413; 1452; 1462) a mold with an expanded thermoplastic polyurethane (TPU), for a first surface region;
    loading the mold with a material that is free from expanded TPU, for a second surface region;
    feeding steam (1430; 1454; 1464) to the expanded TPU.
61. Method (1400; 1450; 1460) for manufacturing a shoe sole, in particular a shoe sole for a sports shoe, comprising:
    loading (1411; 1413; 1452; 1462) a mold with a first expanded thermoplastic polyurethane (TPU), for a first partial region;
    loading the mold with a second expanded TPU, for a second partial region;
    feeding steam (1430; 1454; 1464) to the first and second expanded TPU;
    wherein the first and second expanded TPU comprise a different density and/or a different base material.
62. Method according to any of the examples 60 or 61, wherein the expanded TPU or the first and/or the second expanded TPU comprises particles.
63. Method according to example 62, further comprising: partially melting the surface of the particles.
64. Method according to any of the examples 60-63, further comprising:
    compressing (1412; 1463) the expanded TPU or the first and/or the second expanded TPU.
65. Method according to any of the examples 60-63, wherein the loading (1413; 1452) of the expanded TPU or the first and/or the second expanded TPU is carried out under pressure.
66. Method according to any of the examples 60-65, further comprising:
    relaxing (1420) the expanded TPU or the first and second expanded TPU.
67. Method according to any of the examples 60-66, further comprising:
    cooling (1455; 1465) the expanded TPU or the first and second expanded TPU.
68. Method according to any of the examples 60-67, further comprising:
    curing the expanded TPU or the first and second expanded TPU.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A sole comprising
a first component and a second, separately formed, component, wherein the first component and the second component are combined to form at least a portion of the sole;
wherein the first component comprises at least a first surface region of the sole, and the second component comprises at least a second surface region of the sole;
wherein the first surface region comprises expanded thermoplastic polyurethane in the form of expanded thermoplastic polyurethane particles, wherein adjacent expanded thermoplastic polyurethane particles are directly bonded to one another at their surfaces to form a granular but closed plastic foam structure, wherein the closed plastic foam structure of the first surface region of the sole is free of gaps passing therethrough;
wherein the first surface region comprises greater cushioning properties than the second surface region;
wherein the second surface region is free from expanded thermoplastic polyurethane;
wherein the second surface region is stiffer than the first surface region such that, under shear, the second surface region increases stability of the first surface region;
wherein at least a first portion of the first surface region forms a first portion of an outer rim of the sole; and
wherein at least a portion of the second surface region forms a second portion of the outer rim of the sole and at least another portion of the second surface region is arranged above the first surface region.

2. The sole according to claim 1, wherein the first surface region is arranged in at least one of a forefoot region or a heel region.

3. The sole according to claim 1, wherein a portion of an outer perimeter of the first surface region comprises an increased thickness that forms the first portion of the outer rim of the sole.

4. The sole according to claim 1, wherein the first surface region is shaped to extend from at least a toe region through a midfoot region of the sole, wherein a thickness of the first surface region increases from the toe region to the midfoot region.

5. The sole according to claim 1, further comprising an intermediate sole arranged proximate the first surface region and shaped to conform to a surface shape of the first surface region, wherein the intermediate sole is free from expanded thermoplastic polyurethane.

6. The sole according to claim 5, wherein the intermediate sole is arranged above the first surface region.

7. The sole according to claim 5, wherein the second surface region and the intermediate sole are integrally connected.

8. The sole according to claim 5, wherein at least one of the second surface region and the intermediate sole comprises at least one of foamed ethylene-vinyl acetate, non-expanded thermoplastic polyurethane, rubber, polypropylene, polyamide, polystyrene, and expanded polypropylene.

9. The sole according to claim 1, wherein the first surface region comprises less than about 40% of the sole.

10. A shoe comprising the sole according to claim 1.

11. The sole according to claim 1, wherein at least a second portion of the first surface region is exposed.

12. The sole according to claim 1, wherein the particles have a substantially elliptical or spherical shape.

13. A sole comprising
a first component and a second, separately formed, component, wherein the first component and the second component are combined to form at least a portion of the sole;
wherein the first component comprises at least a first surface region of the sole, and the second component comprises at least a second surface region of the sole;
wherein the first surface region comprises expanded thermoplastic polyurethane in the form of expanded thermoplastic polyurethane particles, wherein adjacent expanded thermoplastic polyurethane particles are directly bonded to one another at their surfaces to form a granular but closed plastic foam structure, wherein the closed plastic foam structure of the first surface region of the sole is free of gaps passing therethrough;
wherein the first surface region comprises greater cushioning properties than the second surface region;
wherein the second surface region is free from expanded thermoplastic polyurethane;
wherein the second surface region is stiffer than the first surface region such that, under shear, the second surface region increases stability of the first surface region;
wherein a portion of an outer perimeter of the first surface region comprises an increased thickness that forms a first portion of an outer rim of the sole; and
wherein at least a first portion of the second surface region is arranged above the first surface region, and at least a second portion of the second surface region is arranged proximate an end of the first surface region.

14. The sole according to claim 13, wherein the first surface region is arranged in at least one of a forefoot region or a heel region.

15. The sole according to claim 13, wherein the first surface region is shaped to extend from at least a toe region through a midfoot region of the sole, wherein a thickness of the first surface region increases from the toe region to the midfoot region.

16. The sole according to claim 14, further comprising an intermediate sole arranged proximate the first surface region and shaped to conform to a surface shape of the first surface region, wherein the intermediate sole is free from expanded thermoplastic polyurethane.

17. The sole according to claim 16, wherein the intermediate sole is arranged above the first surface region.

18. The sole according to claim 16, wherein the second surface region and the intermediate sole are integrally connected.

19. The sole according to claim 16, wherein at least one of the second surface region and the intermediate sole comprises at least one of foamed ethylene-vinyl acetate, non-expanded thermoplastic polyurethane, rubber, polypropylene, polyamide, polystyrene, and expanded polypropylene.

20. The sole according to claim 13, wherein the first surface region comprises less than 40% of the sole.

21. A shoe comprising the sole according to claim 13.

22. The sole according to claim 13, wherein at least a portion of the first surface region is exposed.

23. The sole according to claim 13, wherein the particles have a substantially elliptical or spherical shape.

24. A sole comprising
a first component and a second, separately formed, component, wherein the first component and the second component are combined to form at least a portion of the sole;
wherein the first component comprises at least a first surface region of the sole, and the second component comprises at least a second surface region of the sole;
wherein the first surface region comprises expanded thermoplastic polyurethane in the form of expanded thermoplastic polyurethane particles, wherein adjacent expanded thermoplastic polyurethane particles are directly bonded to one another at their surfaces to form a granular but closed plastic foam structure, wherein the closed plastic foam structure of the first surface region of the sole is free of gaps passing therethrough;
wherein the first surface region comprises greater cushioning properties than the second surface region;
wherein the second surface region is free from expanded thermoplastic polyurethane;
wherein the second surface region is stiffer than the first surface region such that, under shear, the second surface region increases stability of the first surface region;
wherein the first surface region is arranged in a forefoot region or a heel region of the sole; and
wherein the second surface region comprises an intermediate sole arranged proximate the first surface region and shaped to conform to a surface shape of the first surface region, wherein the intermediate sole is free from expanded thermoplastic polyurethane.

25. The sole according to claim 24, wherein a portion of an outer perimeter of the first surface region comprises an increased thickness that forms a first portion of an outer rim of the sole.

26. The sole according to claim 24, wherein the first surface region is shaped to extend from at least a toe region through a midfoot region of the sole, wherein a thickness of the first surface region increases from the toe region to the midfoot region.

27. The sole according to claim 24, wherein the intermediate sole is arranged above the first surface region.

28. The sole according to claim 24, wherein the second surface region and the intermediate sole are integrally connected.

29. The sole according to claim 24, wherein at least one of the second surface region and the intermediate sole comprises at least one of foamed ethylene-vinyl acetate, non-expanded thermoplastic polyurethane, rubber, polypropylene, polyamide, polystyrene, and expanded polypropylene.

30. The sole according to claim 24, wherein the first surface region comprises less than 40% of the sole.

31. A shoe comprising the sole according to claim 24.

32. The sole according to claim 24, wherein at least a portion of the first surface region is exposed.

33. The sole according to claim 24, wherein the particles have a substantially elliptical or spherical shape.

34. A sole comprising
a first component and a second, separately formed, component, wherein the first component and the second component are combined to form at least a portion of the sole;
wherein the first component comprises at least a first surface region of the sole, and the second component comprises at least a second surface region of the sole;
wherein the first surface region comprises expanded thermoplastic polyurethane particles, each expanded thermoplastic polyurethane particle having an outer surface enclosing an internal foam structure, and wherein the first surface region comprises a closed plastic foam structure having adjacent expanded thermoplastic polyurethane particles directly bonded to one another at their surfaces, wherein the closed plastic foam structure of the first surface region of the sole is free of gaps passing therethrough;
wherein the first surface region comprises greater cushioning properties than the second surface region;
wherein the second surface region is free from expanded thermoplastic polyurethane;
wherein the second surface region is stiffer than the first surface region such that, under shear, the second surface region increases stability of the first surface region;
wherein at least a first portion of the first surface region forms a first portion of an outer rim of the sole; and
wherein at least a portion of the second surface region forms a second portion of the outer rim of the sole and at least another portion of the second surface region is arranged above the first surface region.

* * * * *